US011695726B2

(12) United States Patent
Xu

(10) Patent No.: US 11,695,726 B2
(45) Date of Patent: Jul. 4, 2023

(54) IMAGE SHARING METHOD AND MOBILE DEVICE

(71) Applicant: HUAWEI TECHNOLOGIES CO., LTD., Shenzhen (CN)

(72) Inventor: Jingguo Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 17/423,540

(22) PCT Filed: Jan. 24, 2019

(86) PCT No.: PCT/CN2019/073041
§ 371 (c)(1),
(2) Date: Jul. 16, 2021

(87) PCT Pub. No.: WO2020/150979
PCT Pub. Date: Jul. 30, 2020

(65) Prior Publication Data
US 2022/0078154 A1 Mar. 10, 2022

(51) Int. Cl.
*H04L 12/58* (2006.01)
*H04L 51/52* (2022.01)
*G06T 7/55* (2017.01)
*G06T 7/00* (2017.01)
*G06T 7/70* (2017.01)

(52) U.S. Cl.
CPC ............... *H04L 51/52* (2022.05); *G06T 7/55* (2017.01); *G06T 7/70* (2017.01); *G06T 7/97* (2017.01)

(58) Field of Classification Search
None
See application file for complete search history.

(56) References Cited

U.S. PATENT DOCUMENTS

| 2014/0040764 | A1  | 2/2014 | Stoop et al. |
| 2018/0137119 | A1  | 5/2018 | Li et al. |
| 2018/0176570 | A1  | 6/2018 | Rippel et al. |
| 2019/0188222 | A1  | 6/2019 | Li et al. |
| 2021/0227151 | A1* | 7/2021 | Song ..................... H04N 23/62 |
| 2022/0019821 | A1* | 1/2022 | Brickwedde ......... H04N 19/117 |
| 2022/0246085 | A1* | 8/2022 | Otsuka ................. H04N 21/436 |

FOREIGN PATENT DOCUMENTS

| CN | 102647590 A | 8/2012 |
| CN | 104969262 A | 10/2015 |
| CN | 105407142 A | 3/2016 |
| CN | 105447820 A | 3/2016 |

(Continued)

*Primary Examiner* — Natisha D Cox
(74) *Attorney, Agent, or Firm* — Rimon PC

(57) ABSTRACT

An image compression method includes: starting a social media application to enter an interface for inputting a to-be-posted content; when an operation for adding an image is detected, displaying a first image in the interface; and when an operation for posting the first image is detected, in response to the operation, performing differential compression on the first image to obtain a second image, and sending the second image to a server corresponding to the social application. The method enables an electronic device to perform differential compression on the image and post the compressed image on a social media platform.

20 Claims, 57 Drawing Sheets

(56) References Cited

FOREIGN PATENT DOCUMENTS

| | | | |
|---|---|---|---|
| CN | 105612472 | A | 5/2016 |
| CN | 105721872 | A | 6/2016 |
| CN | 106294798 | A | 1/2017 |
| CN | 106682613 | A | 5/2017 |
| CN | 107205163 | A | 9/2017 |
| CN | 107257426 | A | 10/2017 |
| CN | 107908337 | A | 4/2018 |
| KR | 20180055707 | A | 5/2018 |
| WO | 2018032721 | A1 | 2/2018 |

* cited by examiner

IMAGE SHARING METHOD AND MOBILE DEVICE

CROSS-REFERENCE TO RELATED APPLICATIONS

This application is a national stage of International Application No. PCT/CN2019/073041, filed Jan. 24, 2019, which is hereby incorporated by reference in its entirety.

TECHNICAL FIELD

This application relates to the field of terminal technologies, and in particular, to an image sharing method and a mobile device.

BACKGROUND

Functions of a mobile device are continuously being improved. Using a mobile phone as an example, it has become a main communication tool for interpersonal communication. More particularly, social apps (for example, WeChat) in the mobile phone can help a user communicate with another user, and functions (such as WeChat Moments) of the social apps help the user to know about social updates of the other user. Users can also share life experiences (such as a picture or a video) with others by using the social application.

WeChat Moments is another example. In the conventional technology, when a user shares a picture by using WeChat Moments in a mobile phone, the mobile phone sends the picture to a server (for example, a server of WeChat). To save memory, the server compresses the picture and then uploads a compressed picture, and the picture shared by the user via WeChat Moments is the compressed picture. As a result, the picture definition is low, and user experience is poor.

SUMMARY

This application provides an image sharing method and mobile device, to enable uploading a clear picture in a social application.

According to a first aspect, an image compression method is provided. The method may be applied to an electronic device that has a display. The method includes: detecting a first operation for opening a first image; in response to the first operation, displaying the first image on the display; detecting a second operation for triggering differential compression; and in response to the second operation, displaying a second image on the display. The second image is an image obtained by performing differential compression on the first image. The second image includes a first area and a second area. The first area is an area in which at least one target object is located on the second image. The second area is an area other than the first area on the second image. The first area is an area obtained by compressing a third area on the first image in a first compression ratio. The third area is an area in which the at least one target object is located on the first image. The second area is an area obtained by compressing a fourth area on the first image in a second compression ratio. The fourth area is an area other than the third area on the first image. The first compression ratio is less than the second compression ratio. The target object is one or more object types, or the target object is one or more objects. The first operation for opening the first image is an operation of opening a locally stored image. The area in which the at least one target object is located is an area occupied by the target object, for example, an area enclosed by an edge contour of the target object, or an area enclosed by a closed curve including the target object, for example, the area enclosed by the closed curve is larger than the area occupied by the target object. The closed curve may be a rectangle, a circle, a square, an ellipse, an irregular pattern, or the like.

The electronic device may perform the differential compression on different areas in an image. For example, a comparatively small compression ratio is used for the area in which the target object is located on the image, and a comparatively large compression ratio is used for another area. Therefore, a definition attenuation degree of the target object on the image is reduced as much as possible, and the size of a compressed image is comparatively small. When the image is uploaded to a social media platform, the social media platform does not need to compress the image again.

In a possible design, the target object is a preset object, the target object is an object automatically determined by the electronic device based on a plurality of objects on the first image, or the target object is an object determined by the electronic device based on a selection operation performed by a user on the first image.

It should be understood that the target object may be preset, may be automatically identified by the electronic device, or may be selected by the user. This is not limited in this application.

In a possible design, before the detecting a second operation for triggering differential compression, the electronic device further outputs first prompt information. The first prompt information is used to prompt the user to specify the target object on the first image.

It should be understood that the electronic device may prompt the user to specify the target object. The user may select an object of interest based on a requirement of the user. This helps improve user experience.

In a possible design, before the detecting a second operation for triggering differential compression, the electronic device further detects a tap operation performed on the first image, and determines an object corresponding to a position coordinate of the tap operation as the at least one target object; the electronic device detects a circle selection operation performed on the first image, and determines that an object included in an area enclosed in the circle selection operation is the at least one target object; when a specific operation is detected, the electronic device displays a selection box on the first image, and determines that an object included in the selection box is the at least one target object; or when a specific operation is detected, the electronic device displays a number of each object on the first image, and when at least one number is selected, the electronic device determines an object corresponding to the selected at least one number as the at least one target object.

It should be understood that the user may tap or circle to select the target object on the image, move the selection box to select the target object, or tap the number of the target object to select the target object. It can be learned that the user may select the object of interest based on the requirement of the user. This helps improve user experience.

In a possible design, before the detecting a second operation for triggering differential compression, the electronic device further detects an instruction for uploading the first image to a social platform; and outputs second prompt information in response to the instruction, where the second prompt information is used to indicate to perform the differential compression on the first image.

It should be understood that when detecting the instruction for uploading the image to the social platform, the electronic device performs the differential compression on the target object and a background (an object other than the target object on the image) on the image. In this way, the size of a compressed image becomes small. When the image is uploaded to the social platform, the social platform does not need to compress the image again.

In a possible design, the electronic device saves the second image, and displays an identifier on the second image. The identifier is used to indicate that the second image is an image obtained by compressing the first image.

It should be understood that after performing the differential compression on the image, the electronic device may save the compressed image, and display the identifier. The identifier is used to indicate that the image is an image obtained after the differential compression.

In a possible design, after detecting an instruction for uploading the second image to the social platform, the electronic device uploads the second image to the social medial platform.

It should be understood that after the electronic device performs the differential compression on the target object and the background (the object other than the target object on the image) in the image, when the electronic device uploads the compressed image to the social medial platform, the social media platform does not need to compress the image again, that is, the uploaded image is the image compressed by the electronic device.

A second aspect further provides an image compression method, applied to an electronic device that has a display and a camera. The method includes: detecting a first operation for turning on the camera; displaying a viewfinder interface on the display in response to the first operation, where the viewfinder interface includes a preview image, and the preview image includes at least one to-be-shot object; and shooting a first image in response to the second operation. The first image is an image obtained after the differential compression is performed on the preview image. The first image includes a first area and a second area. The first area is an area in which a target object is located on the first image. The second area is an area other than the first area on the first image. The target object is an object in the at least one to-be-shot object. The first area is an area obtained by compressing a third area on the preview image in a first compression ratio. The third area is an area in which the target object is located on the preview image. The second area is an area obtained by compressing a fourth area on the preview image in a second compression ratio. The fourth area is an area other than the third area on the preview image. The first compression ratio is less than the second compression ratio.

It should be understood that when the electronic device shoots an image, the shot image is a compressed image. Compression ratios are different in different areas. For example, a comparatively small compression ratio is used for the area in which the target object is located on the image, and a comparatively large compression ratio is used for another area. Therefore, a definition attenuation degree of the target object on the image is reduced as much as possible, and the size of a compressed image is comparatively small. When the image is uploaded to a social medial platform, the social medial platform does not need to compress the image again.

In a possible design, the target object is a preset target object, the target object is an object automatically determined by the electronic device based on a plurality of objects on the preview image, or the target object is an object determined by the electronic device based on a selection operation performed by a user on the preview image.

It should be understood that the target object may be preset, may be automatically identified by the electronic device, or may be selected by the user. This is not limited in this application.

In a possible design, before the shooting a first image in response to the second operation, the electronic device further outputs first prompt information. The first prompt information is used to prompt the user to specify the target object on the preview image.

It should be understood that the electronic device may prompt the user to specify the target object. The user may select an object of interest based on a requirement of the user. This helps improve user experience.

In a possible design, before the shooting a first image in response to the second operation, the electronic device further detects a tap operation performed on the preview image, and determines an object corresponding to a position coordinate of the tap operation as the at least one target object; the electronic device detects a circle selection operation performed on the preview image, and determines that an object included in an area enclosed in the circle selection operation is the at least one target object; when a specific operation is detected, the electronic device displays a selection box on the preview image, and determines that an object included in the selection box is the at least one target object; or when a specific operation is detected, the electronic device displays a number of each object on the preview image, and when at least one number is selected, the electronic device determines an object corresponding to the selected at least one number as the at least one target object.

It should be understood that the user may tap or circle to select the target object on the preview image, move the selection box to select the target object, or tap the number of the target object to select the target object. It can be learned that the user may select the object of interest based on the requirement of the user. This helps improve user experience.

In a possible design, the electronic device may save the first image and a second image. The second image is an uncompressed image obtained by shooting the preview image.

It should be understood that when the electronic device shoots the image, two images may be obtained. One image is an uncompressed image, and the other is an image after the differential compression.

In a possible design, after detecting an instruction for uploading the first image to the social platform, the electronic device uploads the first image to the social platform.

It should be understood that the image shot by the electronic device is the compressed image, and differential compression is performed on the target object and a background (an object other than the target object on the image) on the image. For example, a comparatively small compression ratio is used for the area in which the target object is located on the image, and a comparatively large compression ratio is used for another area. Therefore, a definition attenuation degree of the target object on the image is reduced as much as possible, and the size of a compressed image is comparatively small. When the compressed image is uploaded to the social platform, the social platform does not need to compress the image again, that is, the uploaded image is the image compressed by the electronic device.

A third aspect further provides an image sharing method, applied to an electronic device that has a display and on which a social application is installed. The method includes:

detecting a first operation for starting the social media application; displaying an initial interface of the social media application; detecting a second operation for entering an interface for inputting a to-be-posted content; displaying the interface for inputting the to-be-posted content; detecting a third operation for adding an image; displaying a first image on the interface for inputting the to-be-posted content, where the first image includes an image saved in the electronic device before the first operation, or a picture shot by starting a camera after the first operation; detecting a fourth operation for posting the first image; and in response to the fourth operation, performing differential compression on the first image to obtain a second image, and sending the second image to a server corresponding to the social application. The second image includes a first area and a second area. The first area is an area in which at least one target object is located on the second image. The second area is an area other than the first area on the second image. The first area is an area obtained by compressing a third area on the first image in a first compression ratio. The third area is an area in which the at least one target object is located on the first image. The second area is an area obtained by compressing a fourth area on the first image in a second compression ratio. The fourth area is an area other than the third area on the first image. The first compression ratio is less than the second compression ratio. The target object includes a person, an animal, a plant, an object, or a building.

It should be understood that when a user uploads an image on a design platform, the electronic device may perform the differential compression on different areas on the image. For example, a comparatively small compression ratio is used for the area in which the target object is located, and a comparatively large compression ratio is used for another area. Therefore, a definition attenuation degree of the target object on the image is reduced as much as possible, and the size of a compressed image is comparatively small. When the image is uploaded to a social media platform, the social media platform does not need to compress the image again.

In a possible design, the target object is a preset object, the target object is an object automatically determined by the electronic device based on a plurality of objects on the first image, or the target object is a target object determined by the electronic device based on a selection operation performed by a user on the first image.

In a possible design, before detecting the fourth operation of posting the first image, the electronic device further outputs first prompt information. The first prompt information is used to prompt the user to specify the target object on the first image.

In a possible design, before detecting the fourth operation of posting the first image, the electronic device further detects a tap operation performed on the first image, and determines an object corresponding to a position coordinate of the tap operation as the at least one target object; the electronic device detects a circle selection operation performed on the first image, and determines that an object included in an area enclosed in the circle selection operation is the at least one target object; when a specific operation is detected, the electronic device displays a selection box on the first image, and determines that an object included in the selection box is the at least one target object; or when a specific operation is detected, the electronic device displays a number of each object on the first image, and when at least one number is selected, the electronic device determines an object corresponding to the selected at least one number as the at least one target object.

In a possible design, the electronic device further saves the second image, and displays an identifier on the second image. The identifier is used to indicate that the second image is an image obtained by compressing the first image.

A fourth aspect further provides an image sharing method, applied to an electronic device that has a display and a camera and on which a social media application is installed. The method includes: detecting a first operation for starting the social media application; displaying an initial interface of the social media application; detecting a second operation for entering an interface for inputting a to-be-posted content; displaying the interface for inputting the to-be-posted content; detecting a third operation for adding a shot image by starting the camera; in response to the third operation, displaying a viewfinder interface on the display, where the viewfinder interface includes a preview image, and the preview image includes at least one to-be-shot object; in response to a fourth operation of confirming photographing, shooting a first image, where the first image is an image obtained by performing differential compression on the preview image; displaying the first image on the interface for inputting the to-be-posted content; detecting a fifth operation for posting the first image; and in response to the fifth operation, sending the first image to a server corresponding to the social application. The first image includes a first area and a second area. The first area is an area in which at least one target object is located on the first image. The second area is an area other than the first area on the first image. The at least one target object is at least one object in the at least one to-be-shot object. The first area is an area obtained by compressing a third area on the preview image in a first compression ratio. The third area is an area in which the at least one target object is located on the preview image. The second area is an area obtained by compressing a fourth area on the preview image in a second compression ratio. The fourth area is an area other than the third area on the preview image. The first compression ratio is less than the second compression ratio.

It should be understood that when a user uploads an image on a social media platform, and the electronic device runs the social media platform, the image is shot by using the camera. The shot image is an image on which the differential compression is performed. Compression ratios are different in different areas. For example, a comparatively small compression ratio is used for the area in which the target object is located, and a comparatively large compression ratio is used for another area. Therefore, a definition attenuation degree of the target object on the image is reduced as much as possible, and the size of a compressed image is comparatively small. When the image is uploaded to the social media platform, the social media platform does not need to compress the image again.

In a possible design, the target object is a preset object, the target object is an object automatically determined by the electronic device based on a plurality of objects on the preview image, or the target object is an object determined by the electronic device based on a selection operation performed by a user on the preview image.

In a possible design, before the detecting a fifth operation for posting the first image, the electronic device further outputs first prompt information. The first prompt information is used to prompt the user to specify the target object on the preview image.

In a possible design, before the detecting a fifth operation of posting the first image, the electronic device further detects a tap operation performed on the preview image, and determines an object corresponding to a position coordinate of the tap operation as the at least one target object; the electronic device detects a circle selection operation performed on the preview image, and determines that an object included in an area enclosed in the circle selection operation is the at least one target object; when a specific operation is detected, the electronic device displays a selection box on the preview image, and determines that an object included in the selection box is the target object; or when a specific operation is detected, the electronic device displays a number of each object on the preview image, and when at least one number is selected, the electronic device determines an object corresponding to the selected at least one number as the at least one target object.

In a possible design, the electronic device further saves the first image and a second image. The second image is an uncompressed image obtained by shooting the preview image.

A fifth aspect further provides a mobile device, including a display, one or more processors, a memory, one or more applications, and one or more programs. The one or more programs are stored in the memory. The one or more programs include an instruction. When the instruction is executed by the mobile device, the mobile device is enabled to perform the method in any one of the first aspect or the possible designs of the first aspect. Alternatively, when the instruction is executed by the mobile device, the mobile device is enabled to perform the method in any one of the third aspect or the possible designs of the third aspect.

A sixth aspect further provides a mobile device, including a display, a camera, one or more processors, a memory, one or more applications, and one or more programs. The one or more programs are stored in the memory. The one or more programs include an instruction. When the instruction is executed by the mobile device, the mobile device is enabled to perform the method in any one of the second aspect or the possible designs of the second aspect. Alternatively, when the instruction is executed by the mobile device, the mobile device is enabled to perform the method in any one of the fourth aspect or the possible designs of the fourth aspect.

A seventh aspect further provides a mobile device. In one embodiment, the mobile device includes modules/units that perform the method in any one of the first aspect or the possible designs of the first aspect. In another embodiment, the mobile device includes modules/units that perform the method in any one of the second aspect or the possible designs of the second aspect. In yet another embodiment, the mobile device includes modules/units that perform the method in any one of the third aspect or the possible designs of the third aspect. Alternatively, the mobile device includes modules/units that perform the method in any one of the fourth aspect or the possible designs of the fourth aspect.

These modules/units may be implemented by hardware, or may be implemented by hardware by executing corresponding software.

An eighth aspect further provides a computer-readable storage medium. The computer-readable storage medium includes programs. In some embodiments, when the programs are run on a mobile device, the mobile device is enabled to perform the method in any one of the first aspect or the possible designs of the first aspect. In some embodiments, when the programs are run on a mobile device, the mobile device is enabled to perform the method in any one of the second aspect or the possible designs of the second aspect. In some embodiments, when the programs are run on a mobile device, the mobile device is enabled to perform the method in any one of the third aspect or the possible designs of the third aspect. Alternatively, when the programs are run on a mobile device, the mobile device is enabled to perform the method in any one of the fourth aspect or the possible designs of the fourth aspect.

According to a ninth aspect, an embodiment of this application further provides a program product. When the program product runs on a mobile device, the mobile device is enabled to perform the method in any one of the first aspect or the possible designs of the first aspect. Alternatively, when the program product runs on a mobile device, the mobile device is enabled to perform the method in any one of the first aspect or the possible designs of the second aspect. Alternatively, when the program product runs on a mobile device, the mobile device is enabled to perform the method in any one of the third aspect or the possible designs of the third aspect. Alternatively, when the program product runs on a mobile device, the mobile device is enabled to perform the method in any one of the fourth aspect or the possible designs of the fourth aspect.

It should be noted that an $X^{th}$ operation in this application may be one operation or a combination of a plurality of operations. The $X^{th}$ operation includes a first operation, a second operation, a third operation, a fourth operation, a fifth operation, or the like.

DESCRIPTION OF EMBODIMENTS

Figure 1:
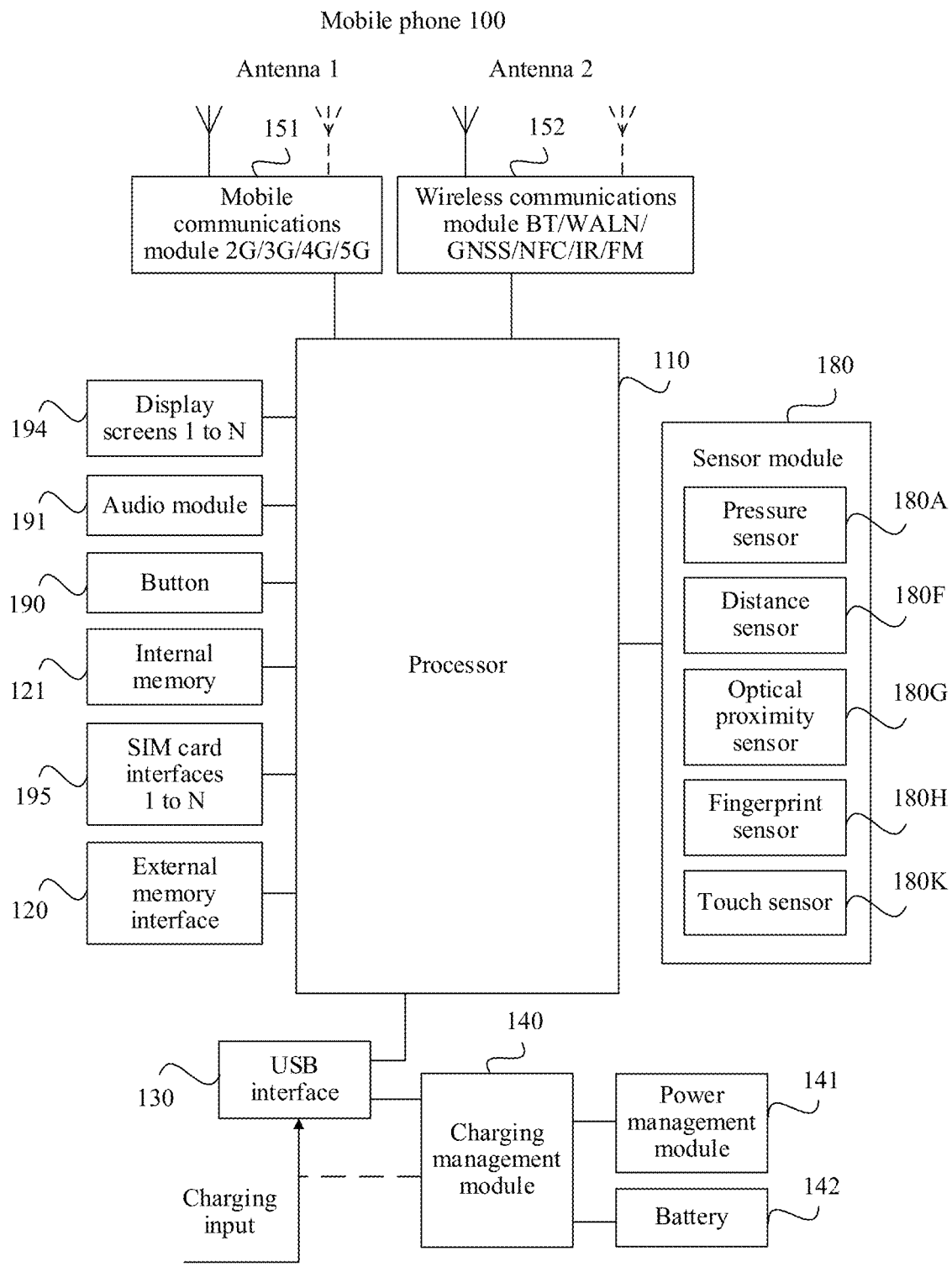
FIG. 1 is a schematic diagram of a structure of a mobile phone according to an embodiment of this application.

The following describes the technical solutions in embodiments of this application with reference to the accompanying drawings in the embodiments of this application.

In the following, some terms in the embodiments of this application are described, to help a person skilled in the art has a better understanding.

An application (application, app for short) program in this application is a software program that can implement one or more specific functions. Generally, a plurality of applications, such as a camera application, a short message application, a multimedia message application, various email applications, WeChat (WeChat), a Tencent chat software (QQ), WhatsApp Messenger, LINE (Line), image sharing (instagram), Kakao Talk, DingTalk, and the like, can be installed on a mobile device. The application mentioned in the following may be an application installed when the mobile device is delivered from a factory, or may be an application (for example, an application sent by another mobile device) downloaded by a user from a network or obtained from another mobile device in a process of using the mobile device.

A social media application mentioned in this application is an application implementing content (for example, a picture or text) sharing. For example, the social media application is Facebook (Facebook), Twitter (twitter), Weibo, WeChat, instagram, Zhihu, linkedin, Douban, Tianya, and Xiaohongshu. Weibo is used as an example. A user may post content such as a picture or a text on a Weibo application, and another Weibo user may browse, on the Weibo application, the content posted by the user. Specifically, the Weibo application is installed on a mobile phone of the user. After the picture is posted by using the Weibo application, the mobile phone sends the picture to a server corresponding to the Weibo application, and the server may send the picture posted by the user to another mobile phone (for example, send the picture to a mobile phone that is currently refreshing Weibo).

A size of an image in this application may include a length of the image and a width of the image. The length and the width are based on an image pixel. A pixel is a minimum imaging unit on an image. One pixel may correspond to one coordinate point in the image. Generally, a size of an image is 1280×768, that is, a quantity of pixels in a horizontal direction of the image is 1028 (namely, a length of the image is 1280), and a quantity of pixels in a vertical direction is 768 (namely, a width of the image is 768).

Generally, a larger quantity of pixels of an image indicates a clearer image. When an image is compressed, the quantity of pixels decreases and the image definition deteriorates. For example, a size of an image is 1280*768. If the image is compressed, and a size of a compressed image is 960*500, a quantity of pixels of the compressed image in a horizontal direction is reduced to 960, and a quantity of pixels of the compressed image in a vertical direction is reduced to 500. Therefore, a definition is reduced.

An image compression ratio in this application is a ratio of a length (or a width) of a raw image to a length (or a width) of a compressed image. For example, a size of a raw image is 1280*768. If an image compression ratio is 2:1, a length of a compressed image is 1280/2=640, and a width of the compressed image is 768/2=348, that is, a size of the compressed image is 640*348. Therefore, when the image compression ratio is 1, that is, the length (or the width) of the raw image is equal to the length (or the width) of the compressed image, that is, the image is not compressed. When the image compression ratio is greater than 1 and is set to a larger value, a compression degree of the image is higher, and definition attenuation is higher. When the image compression ratio is greater than 1 but is set to a smaller value, the compression degree of the image is lower, and the definition attenuation is lower.

In the embodiments of this application, image compression ratios corresponding to the length and the width of the image may be the same or may be different. For example, a compression ratio of a length of an image is 2:1, and a compression ratio of a width of the image is 3:1.

In the embodiments of this application, an $X^{th}$ operation may be one operation or a combination of a plurality of operations. For example, an $X^{th}$ operation includes two or more operations. Specifically, the $X^{th}$ operation may be a first operation, a second operation, a third operation, a fourth operation, a fifth operation, or the like mentioned in this specification.

"A plurality of" in this application indicates two or more. It should be understood that a social media platform in this specification may be one or more servers corresponding to one social media application.

It should be noted that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, if without special explanation. In the descriptions of the embodiments of this application, terms such as "first" and "second" are only used for distinction and description, but cannot be understood as indication or implication of relative importance, and cannot be understood as an indication or implication of a sequence.

The following describes a mobile device, a graphical user interface (GUI) used for the mobile device, and embodiments for using the mobile device. In some embodiments of this application, the mobile device may be a mobile phone, a tablet computer, a notebook computer, a wearable device (such as a smartwatch or smart glasses) having a wireless communication function, or the like. The mobile device includes a device (for example, a processor, an application processor, an image processor, or another processor) that can run an image compression algorithm, and a device (for example, a camera) that can collect an image. An example embodiment of the mobile device includes but is not limited to a device using iOS®, Android®, Microsoft®, or another operating system. The mobile device may also be another portable device, provided that an image is collected and an image compression algorithm is run to compress the image. It should be further understood that in some other embodiments of this application, the mobile device may not be a portable device, but a desktop computer that can collect an image and run an image compression algorithm to compress the image.

Certainly, in some other embodiments of this application, the mobile device may not need to have an image collection capability, provided that the mobile device has a function of running an image compression algorithm to compress an image. For example, the mobile device may receive an image sent by another device, and then run an image compression algorithm to compress the image. In the following, an example in which the mobile device has an image collection function and can run an image compression algorithm is used.

For example, the mobile device is a mobile phone. FIG. 1 is a schematic diagram of a structure of a mobile phone 100.

The mobile phone 100 may include a processor 110, an external memory interface 120, an internal memory 121, a universal serial bus (USB) interface 130, a charging management module 140, a power management module 141, a battery 142, an antenna 1, an antenna 2, a mobile communications module 151, a wireless communications module 152, an audio module 191 (a speaker, a receiver, a microphone, a headset jack, or the like are included and are not shown in the figure), a sensor module 180, a button 190, a display 194, a subscriber identity module (subscriber identification module, SIM) card interface 195, and the like. The sensor module 180 may include a pressure sensor 180A, a distance sensor 180F, an optical proximity sensor 180G, a fingerprint sensor 180H, a touch sensor 180K, and the like (the mobile phone 100 may further include other sensors such as a temperature sensor, an ambient optical sensor, and a gyro sensor, which are not shown in the figure).

It may be understood that the structure shown in this embodiment of this application does not constitute a specific limitation on the mobile phone 100. In some other embodiments of this application, the mobile phone 100 may include more or fewer components than those shown in the figure, combine some components, split some components, or have different component arrangements. The components shown in the figure may be implemented by hardware, software, or a combination of software and hardware.

The following describes the components in the mobile phone 100 shown in FIG. 1.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve centre and a command center of the mobile phone 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a high-speed cache memory. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

The processor 110 can run an image compression algorithm to perform differential compression on an image. For example, the processor 110 integrates a GPU, and the GPU runs an image compression algorithm to compress an image. For example, the processor 110 may receive sensor data sent by a sensor (for example, the touch sensor 180K). The sensor data includes a tap operation performed by a user on an image. The processor 110 determines, based on the tap operation, an object corresponding to the tap operation on the image. The processor 110 runs the image compression algorithm, to compress, in a first compression ratio, a first area in which the object on the image is located, and compress, in a second compression ratio (greater than the first compression ratio), a second area (an area other than the first region on the first image) on the first image, to obtain a compressed image. The display 194 may display the compressed image.

The internal memory 121 may be configured to store computer-executable program code. The executable program code includes an instruction. The processor 110 runs the instruction stored in the internal memory 121, to implement various function applications of the mobile phone 100 and data processing. The internal memory 121 may include a program storage area and a data storage area. The program storage area may store an operating system, an application required by at least one function (for example, a sound playing function or an image playing function), and the like. The data storage area may store data (for example, audio data or an address book) created during use of the mobile phone 100, and the like.

The internal memory 121 may be further configured to store code of the image compression algorithm provided in this embodiment of this application. When the processor 110 gains access to and runs the code of the image compression algorithm, a function of differential image compression (compressing different areas on an image in different compression ratios) is implemented.

The internal memory 121 may include a high-speed random access memory, and may further include a nonvolatile memory, for example, at least one magnetic disk storage device, a flash memory, or a universal flash storage (UFS).

The following describes functions of the sensor module 180.

The pressure sensor 180A is configured to sense a pressure signal, and can convert the pressure signal into an electrical signal. In some embodiments, the pressure sensor 180A may be disposed on the display 194.

The distance sensor 180F is configured to measure a distance. The mobile phone 100 may measure a distance through infrared light or a laser. In some embodiments, in a shooting scenario, the mobile phone 100 may measure a distance by using the distance sensor 180F, to implement fast focusing. In some other embodiments, the mobile phone 100 may further detect, by using the distance sensor 180F, whether a person or an object approaches.

The optical proximity sensor 180G may include a light-emitting diode (LED) and an optical detector, for example, a photodiode. The light-emitting diode may be an infrared light-emitting diode. The mobile phone 100 emits infrared light by using the light-emitting diode. The mobile phone 100 detects infrared reflected light from a nearby object by using the photodiode. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear to make a call, so as to automatically turn off a screen for power saving. The optical proximity sensor 180G may also be configured to automatically unlock and lock the screen in a leather case mode and a pocket mode.

The fingerprint sensor 180H is configured to collect a fingerprint. The mobile phone 100 may use a feature of the collected fingerprint to implement fingerprint unlocking, application access locking, fingerprint photographing, fingerprint call answering, and the like.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor 180K. The touch sensor 180K may transfer the detected touch operation to an application processor, to determine a type of a touch event. Visual output related to the touch operation may be provided by using the display 194. In some other embodiments, the touch sensor 180K may alternatively be disposed on a surface of the mobile phone 100 and is at a location different from that of the display 194.

For example, when the display (for example, the touchscreen) displays an image, after detecting a touch operation (for example, a tap operation) on the image, the touch sensor 180K sends the touch operation to the processor 110. The processor 110 determines a position coordinate corresponding to the touch operation (for example, when the touchscreen is a capacitive touchscreen, the processor 110 determines, based on a capacitance change, the coordinate positions corresponding to the touch operation). In other words, a user taps the position coordinate on the display, and an object corresponding to the position coordinate is an object tapped by the user on the image (or the touch sensor 180K can determine coordinate positions corresponding to the touch operation, and send the touch operation and the coordinate positions to the processor 110, and the processor 110 does not need to determine the coordinate positions corresponding to the touch operation again).

The display 194 is configured to display an image, a video, and the like. The display 194 includes a display panel. The display panel may be a liquid crystal display (LCD), an organic light-emitting diode (OLED), an active-matrix organic light emitting diode or active-matrix organic light emitting diode (AMOLED), a flexible light-emitting diode (FLED), a Miniled, a MicroLed, a Micro-oLed, quantum dot light emitting diodes (QLED), or the like. In some embodiments, the mobile phone 100 may include one or N displays 194, where N is a positive integer greater than 1.

In addition, the mobile phone 100 may implement an audio function, for example, music playing and recording, by using the audio module 191 (the speaker, the receiver, the microphone, or the headset jack), the processor 110, and the like. The mobile phone 100 may receive input of the button 190, and generate button signal input related to a user setting and function control of the mobile phone 100. The SIM card interface 195 of the mobile phone 100 is configured to connect to an SIM card. The SIM card may be inserted into the SIM card interface 195 or plugged from the SIM card interface 195, to implement contact with or separation from the mobile phone 100.

Although not shown in FIG. 1, the mobile phone 100 may further include a camera, for example, a front-facing camera and a rear-facing camera. The mobile phone 100 may further include a motor, configured to generate a vibration prompt (for example, an incoming call vibration prompt). The mobile phone 100 may further include an indicator, for example, an indicator lamp, configured to indicate a charging state or a battery change, or may be configured to indicate a message, a missed call, a notification, or the like.

It can be learned from the foregoing content that, in the conventional technology, when the mobile phone 100 uploads a picture on a social application, the mobile phone 100 cannot compress the picture. The mobile phone 10 sends the picture to the server, the server compresses the picture, and then the server uploads the compressed picture to a network. Currently, the server compresses the image based on a size of the image. For example, when a size of an image is comparatively large, a comparatively large compression ratio is used. When the size of the image is comparatively small, the image may be not compressed or may be compressed in a comparatively small compression ratio. Generally, a larger size of the image indicates a clearer image, but larger storage space is occupied. To ensure that a definition of the image is not very low and occupied storage space is not very large, the server sets a size threshold, for example, 1280*1280, and then compresses the image according to the size threshold. Specifically, the server may compress the image in the following several manners.

Manner 1: When both a length and a width of the image are less than or equal to 1280, a size of the picture remains unchanged. In other words, the server does not compress the image in this case.

Manner 2: When the server determines that a length or a width of the image is greater than 1280, and then determines that a length-width ratio of the image is less than or equal to 2, the server sets a larger value between the length and the width to be equal to 1280, and proportionally compresses a smaller value. For example, if a length of an image is 2000 and a width of the image is 1200, the server sets the length to 1280, and compresses the width according to the following formula:

$$\frac{2000}{1280} = \frac{1200}{x}$$

where x is a value of a width after compression. According to the calculation, x=768. Therefore, a size of a compressed image is 1280*768.

Manner 3: When the server determines that a length and a width of the image are greater than 1280, and the server continues to determine that a length-width ratio of the image is greater than 2, the server sets a smaller value to 1280 and proportionally compresses a larger value. For example, if a length of an image is 3000 and a width of the image is 1400, the server sets the width to 1280, and compresses the length according to the following formula:

$$\frac{3000}{x} = \frac{1400}{1280}$$

where x is a value of a length after compression. According to the calculation, x=2743. Therefore, a size of a compressed image is 2743*1280. Because the length of the compressed image is still greater than 1280, the server may continue to compress the compressed image in the manner 2, until both a length and a width of a compressed image are less than 1280.

It can be seen that, in the conventional technology, when compressing the image, the server compresses the entire image. In an image sharing method provided in the embodiments of this application, when the mobile phone 100 uploads the image on the social media application, the mobile phone 100 may compress the image. For example, the mobile phone 100 may perform differential compression on the image, compress a target object in the image in a comparatively low compression degree, compress another object in the same image in a comparatively high compression degree, and then send the compressed image to the server, so that the compressed image can meet a condition such that the server does not compress the image (in the manner 1, both the length and the width of the image are less than or equal to 1280, which is referred to as an image that meets a condition). In this way, when the mobile phone 100 uploads the compressed image, the server does not need to compress the image again. In this manner, after the mobile phone 100 uploads the compressed image to the social platform, the compression degree of the target object in the image is low, and definition attenuation is comparatively small, thereby improving user experience.

The image sharing method provided in the embodiments of this application may be applied to a plurality of scenarios, for example, the following scenarios:

Scenario 1: album application scenario Generally, an album application includes a plurality of images. The mobile phone 100 may perform differential compression on an image in the album application to obtain another image that meets the condition (refer to the foregoing content). When the compressed image is uploaded to a social platform, a server corresponding to the social platform does not need to compress the image.

Scenario 2: picture shooting scenario. A camera application is used as an example. The mobile phone 100 may use the camera application to shoot an image, and then perform differential compression on the image to obtain a compressed image that meets the condition. When the compressed image is uploaded to a social platform, a server corresponding to the social platform does not need to compress the image.

Scenario 3: social application scenario. WeChat Moments is used as an example. When the mobile phone 100 uploads an image in WeChat Moments, the mobile phone 100 may perform differential compression on the to-be-uploaded image, to obtain a compressed image that meets the condition. When the compressed image that meets the condition is uploaded to WeChat Moments, a server corresponding to WeChat does not need to compress the image.

For ease of understanding, in the following embodiments of this application, an image sharing method in the scenario 1, namely, the album application scenario, in the embodiments of this application is specifically described with reference to the accompanying drawings by using a mobile phone with a structure shown in FIG. 2(a) to FIG. 2(c) as an example.

Figure 2A:
FIG. 2(a) to FIG. 2(c) are a schematic diagram of a graphical user interface on a display of a mobile phone according to an embodiment of this application.
Figure 2B:
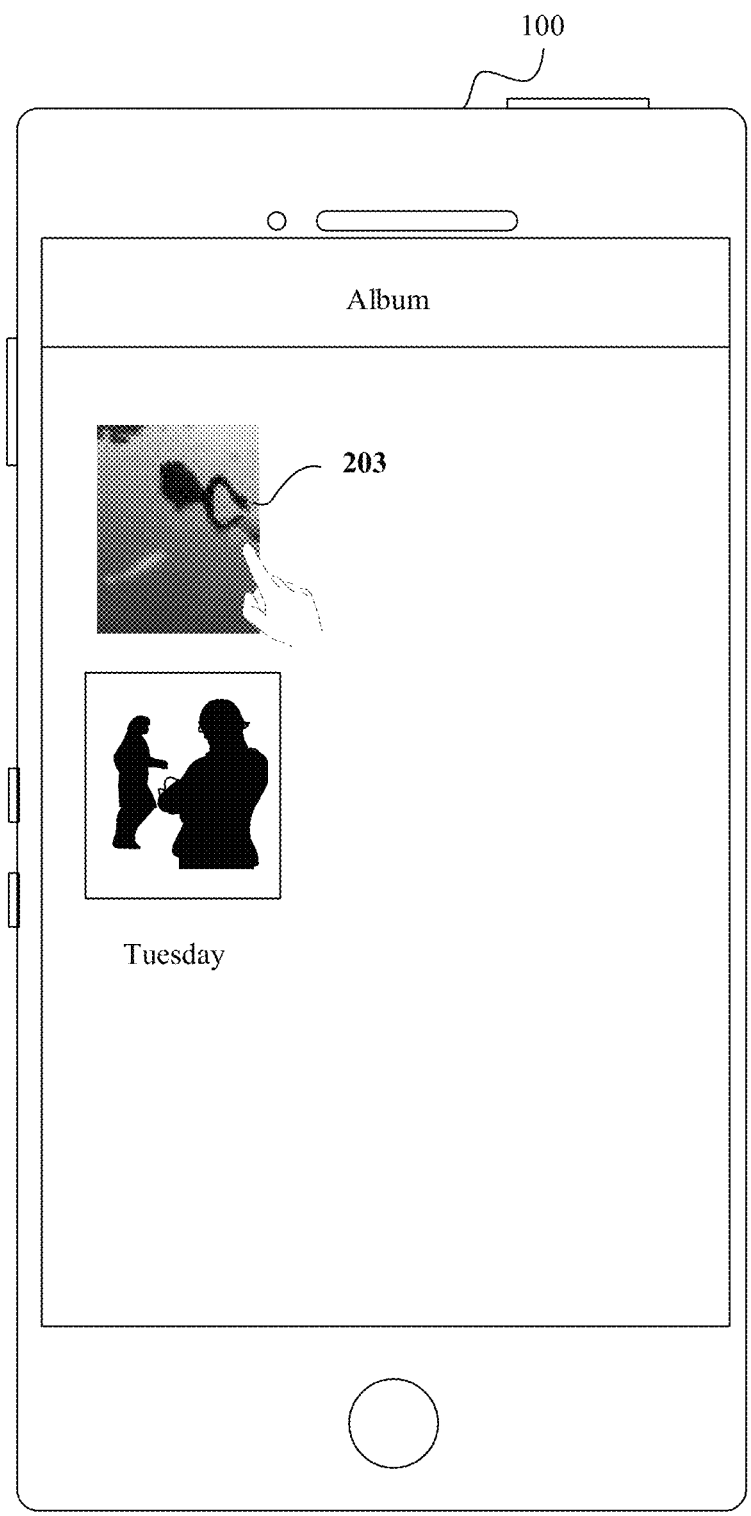

FIG. 2(a) shows a GUI of a mobile phone 100. The GUI is a desktop 201 of the mobile phone. After detecting an operation that a user taps an icon 202 of an album (or a gallery or a photo) application on the desktop 201, the mobile phone 100 may start the album application, and display another GUI shown in FIG. 2(b). The GUI includes thumbnails of a plurality of images. After detecting an operation of tapping an image 203 by the user, the mobile phone 100 displays still another GUI shown in FIG. 2(c). The GUI is a preview interface 204 that includes only the image 203.

Figure 2C:
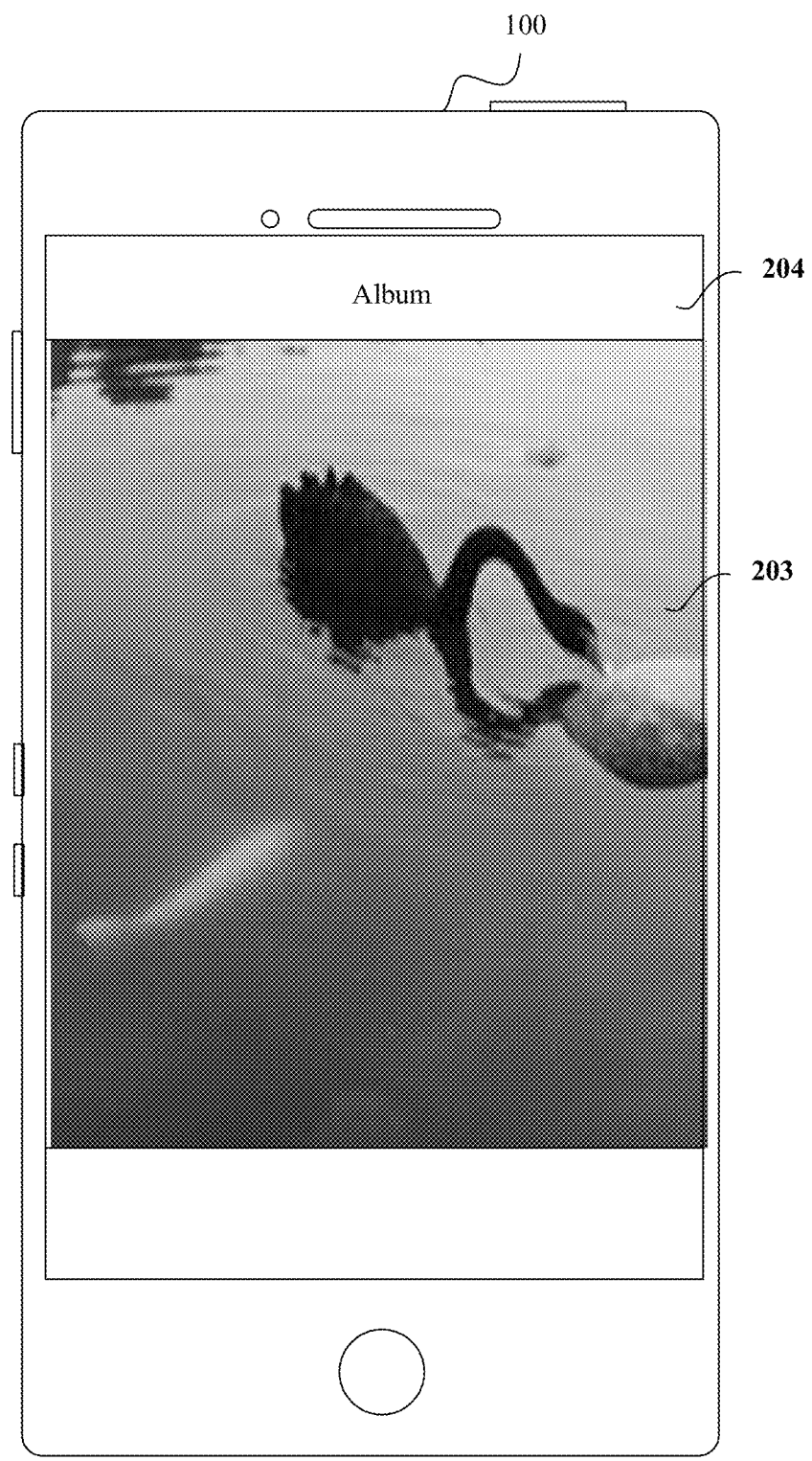

Optionally, in the GUI shown in FIG. 2(c), after the mobile phone 100 detects an operation performed by the user to indicate to perform "intelligent compression" on the image 203, the mobile phone 100 may compress some areas in the image 203 in a comparatively low degree, and compress another part in a comparatively high degree. It should be noted that the "intelligent compression" is merely used as an example herein. However, this name is not limited in this embodiment of this application, and may also be referred to as "differential compression" or the like. It should be understood that differential compression and intelligent compression mentioned in this specification may have a same meaning, and both may be used to perform processing of different compression ratios on different objects (or areas) on an image. Certainly, the name may be XX compression or XX processing, and this is not limited herein.

Figure 3A:
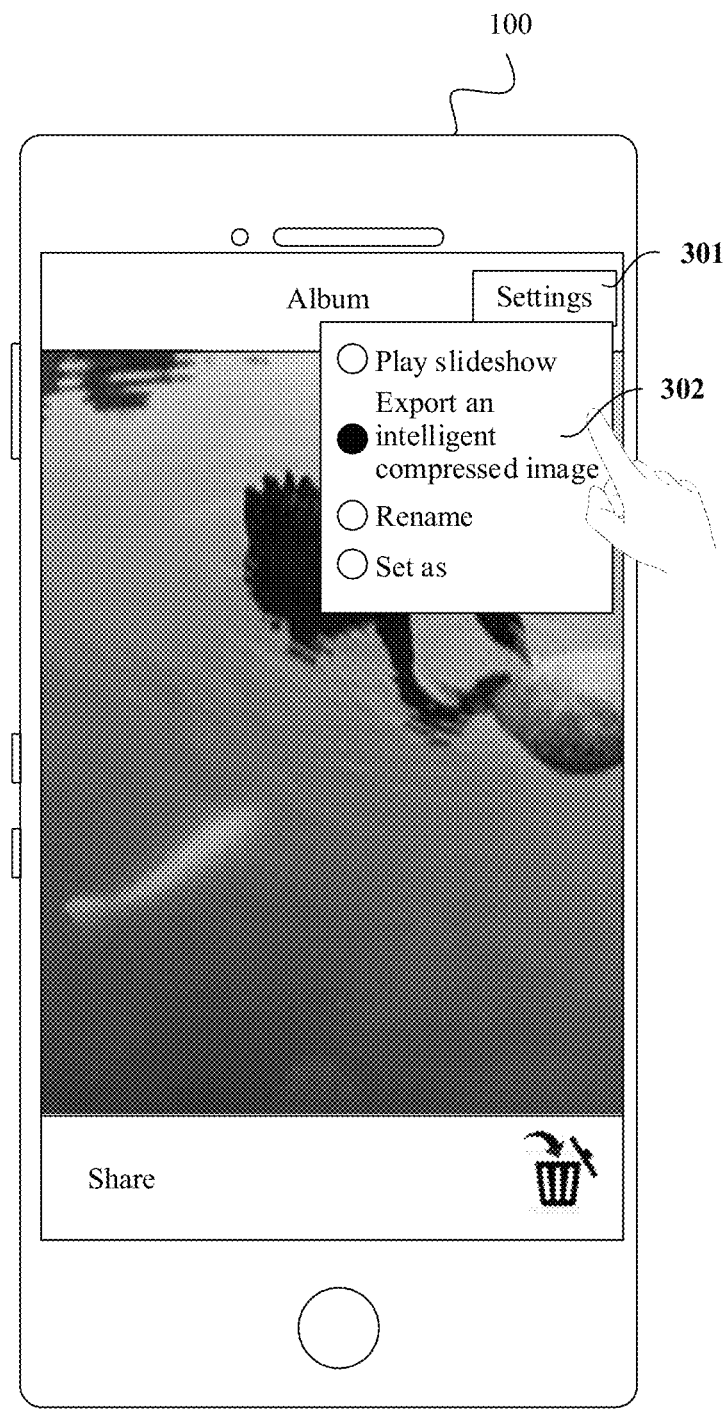
FIG. 3A(a) to FIG. 3A(c) are a schematic diagram of a graphical user interface on a display of a mobile phone according to an embodiment of this application.
Figure 3A:
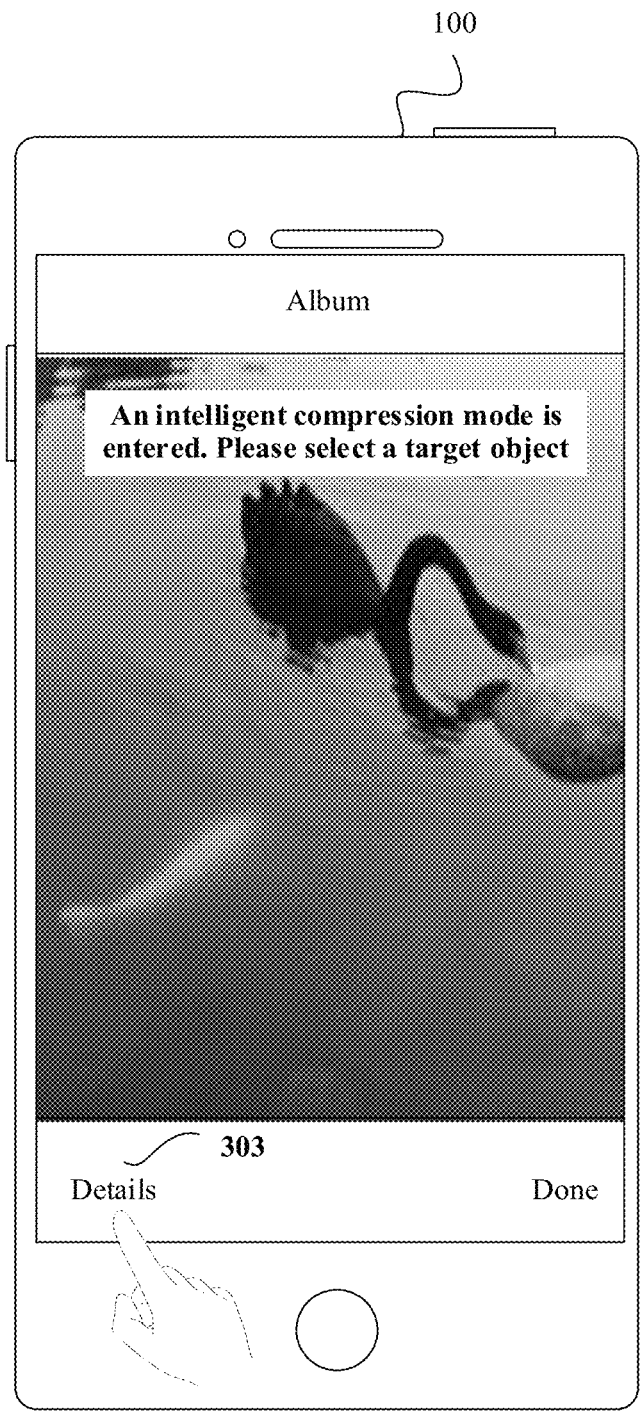
Figure 3A:
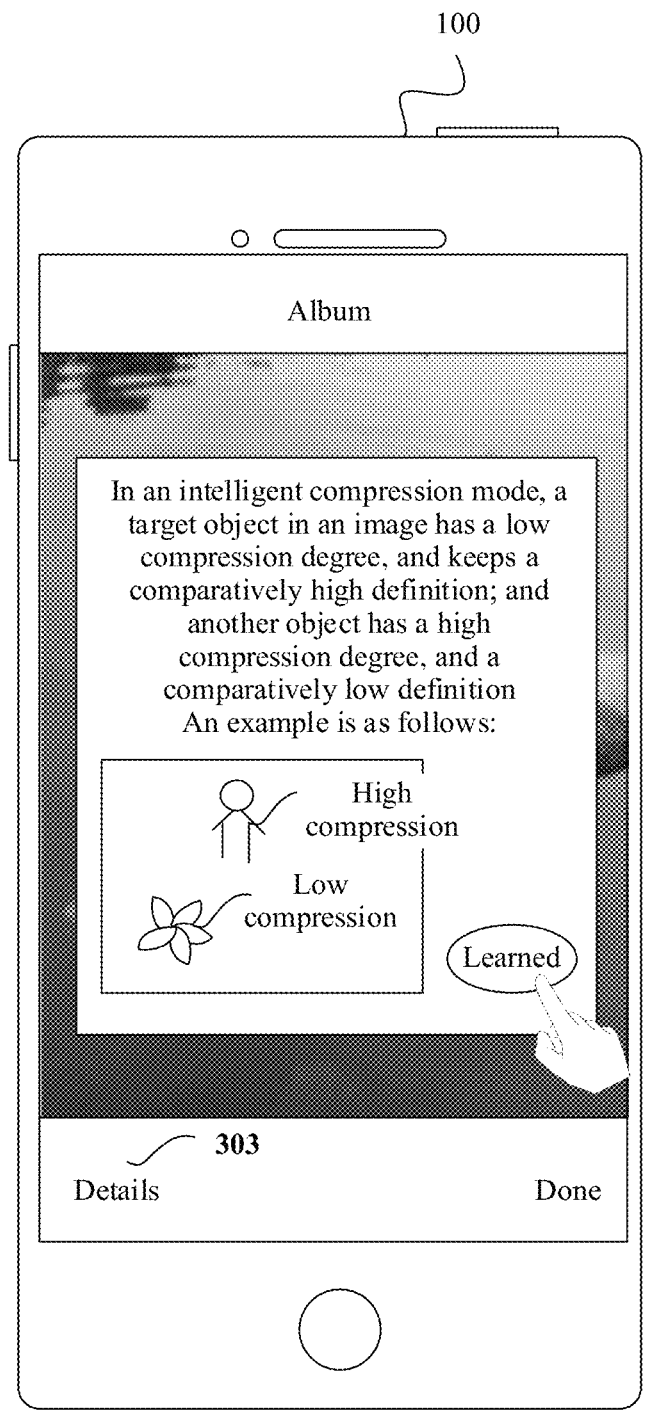

In an embodiment, referring to FIG. 3A(a), when detecting an operation of triggering a setting control 301, a mobile phone 100 displays a plurality of controls, for example, a control used to indicate to play a slideshow, a control 303 used to export an intelligent compressed image, and a control used to indicate to rename. When the mobile phone 100 detects that a user triggers the control 302, the mobile phone 100 enters an intelligent compression mode, as shown in FIG. 3A(b). To help the user understand the intelligent compression mode, when the mobile phone 100 detects that the user triggers a details control 303, the mobile phone 100 displays an interface shown in FIG. 3A(c). The interface displays related information of the intelligent compression model, to help the user understand an intelligent compression function.

Figure 3B:
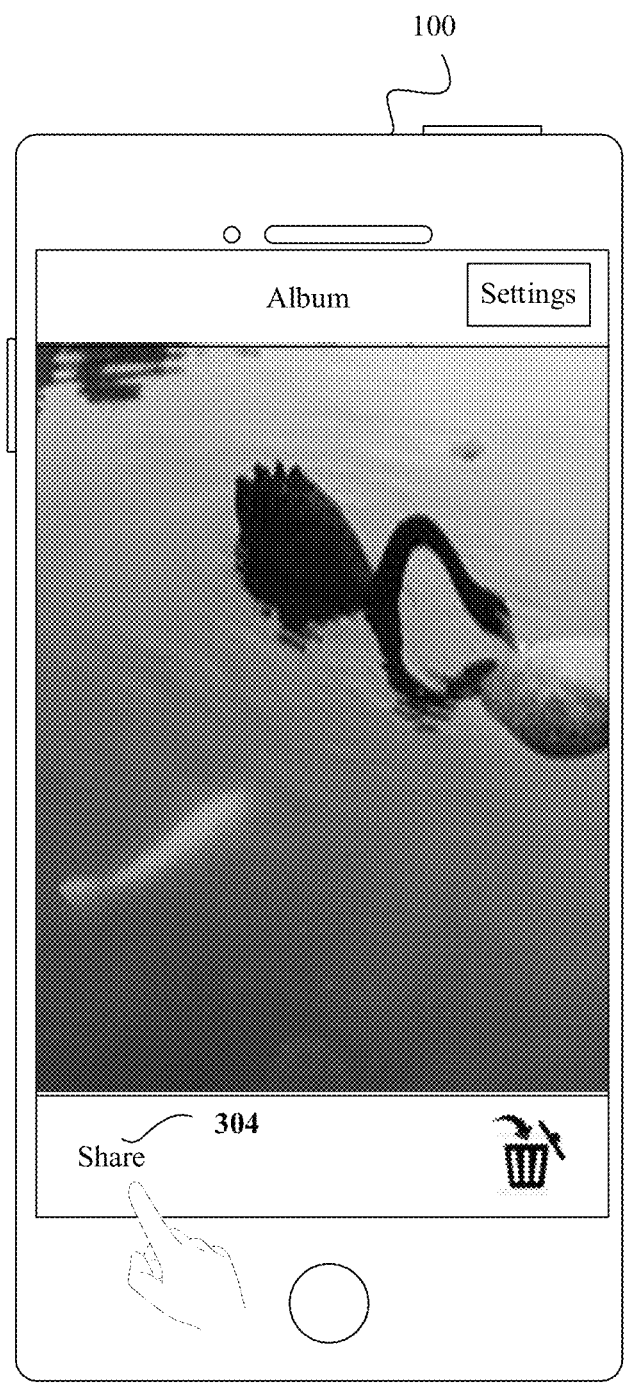
FIG. 3B(a) to FIG. 3B(e) are a schematic diagram of a graphical user interface on a display of a mobile phone according to an embodiment of this application.
Figure 3B:
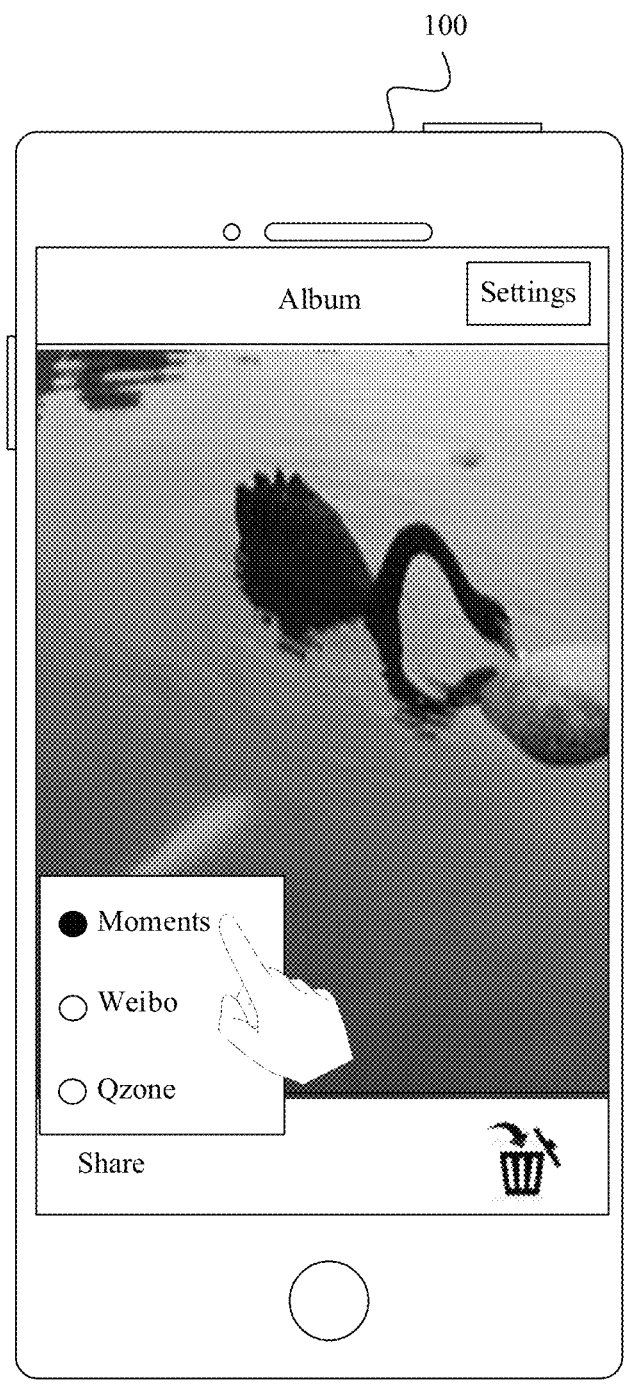
Figure 3B:
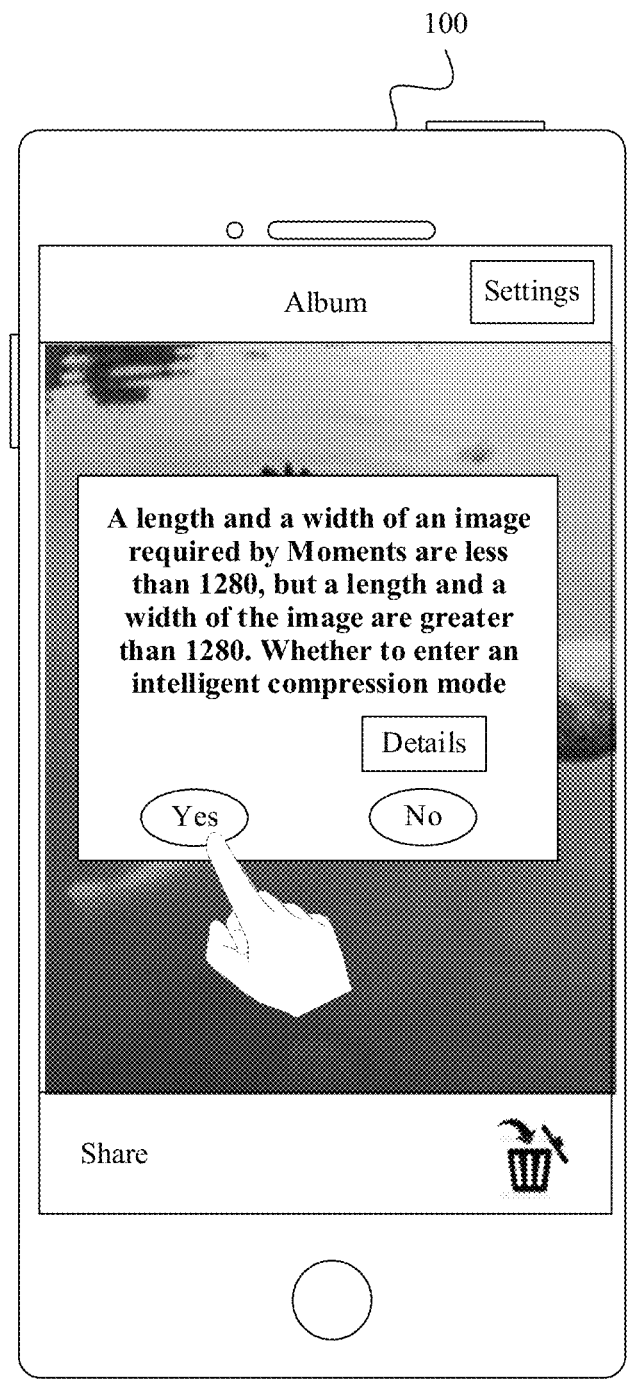
Figure 3B:
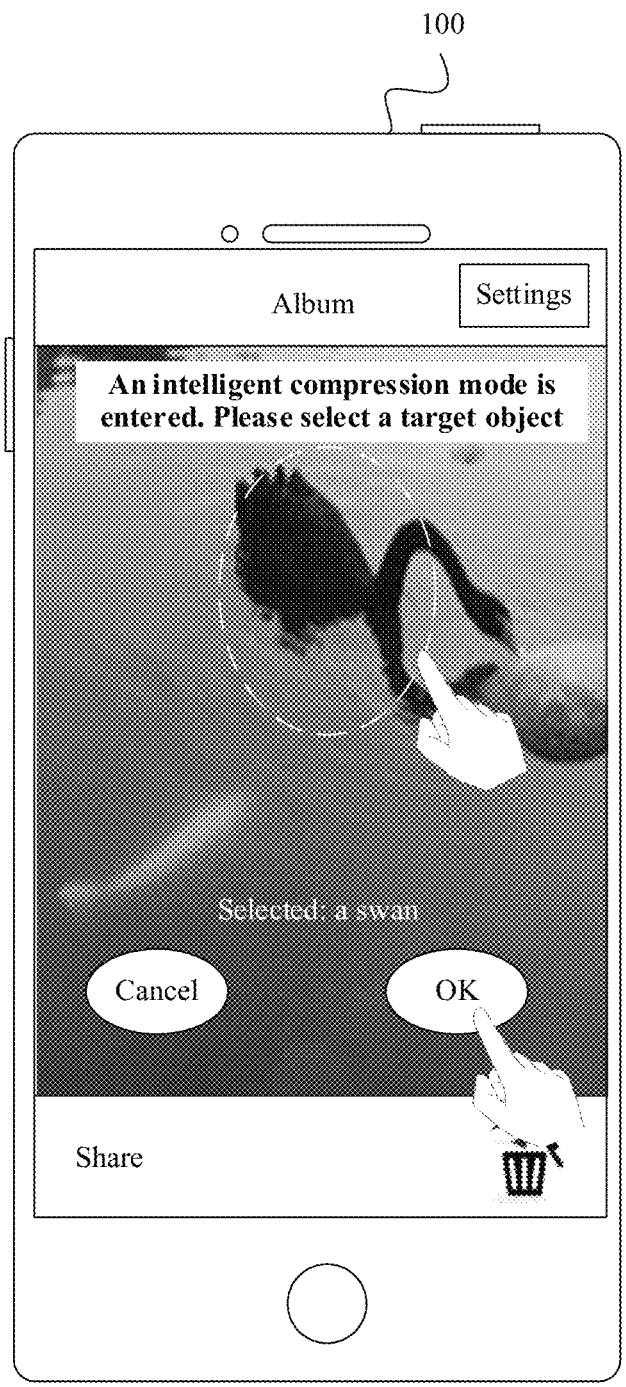
Figure 3B:
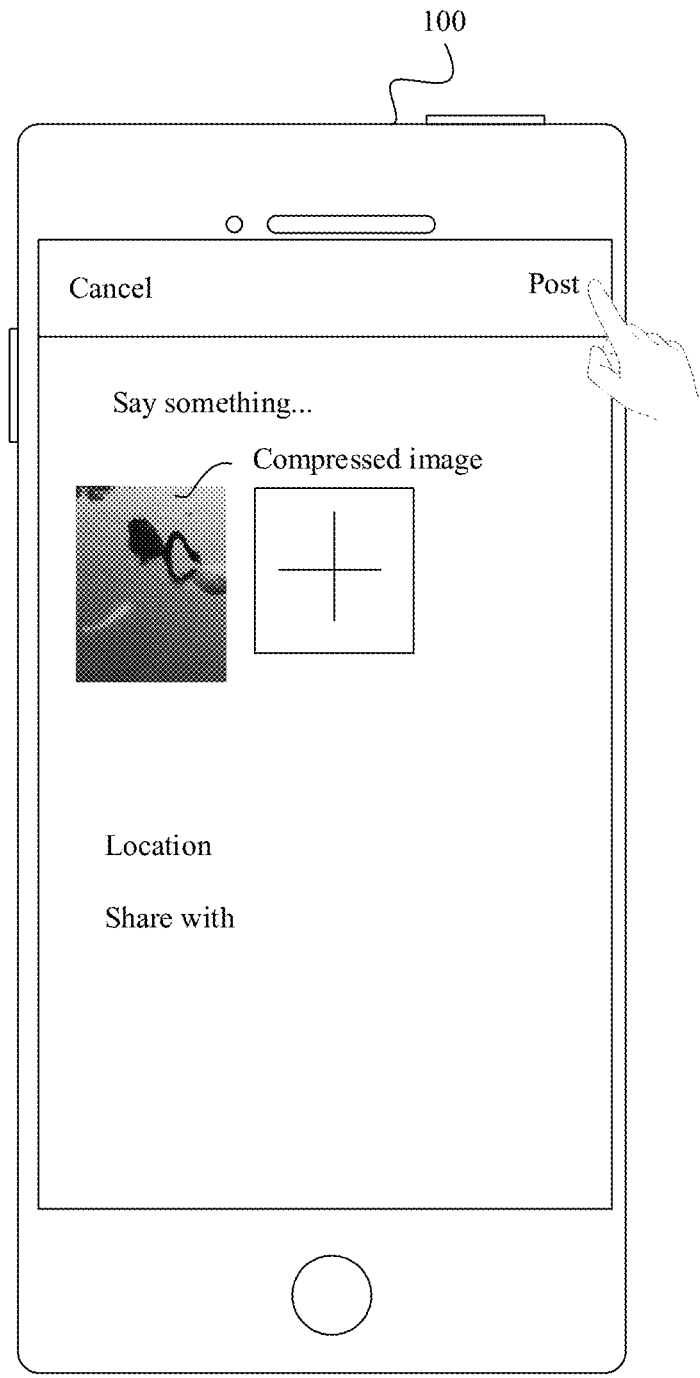

In some other embodiments, when opening an image in an album, the mobile phone 100 displays an interface shown in FIG. 3B(a). When detecting an operation used to trigger a share control 304, the mobile phone 100 displays a plurality of controls (for example, a Moments control, a Weibo control, and a Qzone control), as shown in the interface in FIG. 3B(b). When detecting an operation used to trigger the Moments control, the mobile phone 100 displays an interface shown in FIG. 3B(c), and prompt information that "a length and a width of an image uploaded in Moments need to be less than 1280, but a length and a width of the image are greater than 1280. Whether to enter an intelligent compression mode" is displayed on the interface. If the user triggers a details control, the mobile phone 100 may display related information about intelligent compression, for example, the interface shown in FIG. 3B(c). If the user triggers a "Yes" control, the mobile phone 100 enters an intelligent compression mode, and displays an interface shown in FIG. 3B(d). The mobile phone 100 determines, on the interface, a target object selected by the user (for example, when the mobile phone 100 detects a circle drawing operation of the user, an object in an area enclosed by the circle drawing operation is the target object). When the mobile phone 100 detects an operation of triggering an OK control, the mobile phone 100 displays an interface shown in FIG. 3B(e), that is, a Moments interface.

In the embodiment shown in FIG. 3B, when detecting an indication that the user selects the image to upload to the social platform, the mobile phone 100 may determine whether the image meets a condition of an uncompressed image of the social media platform (the mobile phone). If the condition is not met, the mobile phone 100 prompts to enter the intelligent compression mode. In the intelligent compression mode, the target object may have a comparatively high definition, and another object may have a comparatively low definition, so that the social media platform does not need to compress the image again.

FIG. 3A(a) to FIG. 3A(c) and FIG. 3B(a) to FIG. 3B(e) merely list two implementations in which the mobile phone 100 enters the intelligent compression mode. The mobile phone 100 may further enter the intelligent compression mode in another manner. For example, when the mobile phone 100 detects an operation of long pressing the image 203 or double tapping an area on the image 203 in the interface shown in FIG. 3(a), the mobile phone 100 enters an intelligent compression mode. Alternatively, when the mobile phone 100 detects a user's operation of sliding along a preset track, or when the mobile phone 100 detects voice command used to indicate to enter an intelligent compression mode, the mobile phone 100 enters an intelligent compression mode, or the like. This is not limited in this embodiment of this application.

After entering the intelligent compression mode, the mobile phone 100 may determine a target object in the image 203. The mobile phone 100 may determine the target object in the image 203 in a plurality of manners.

In some embodiments, the target object may be specified by the user.

Figure 4A:
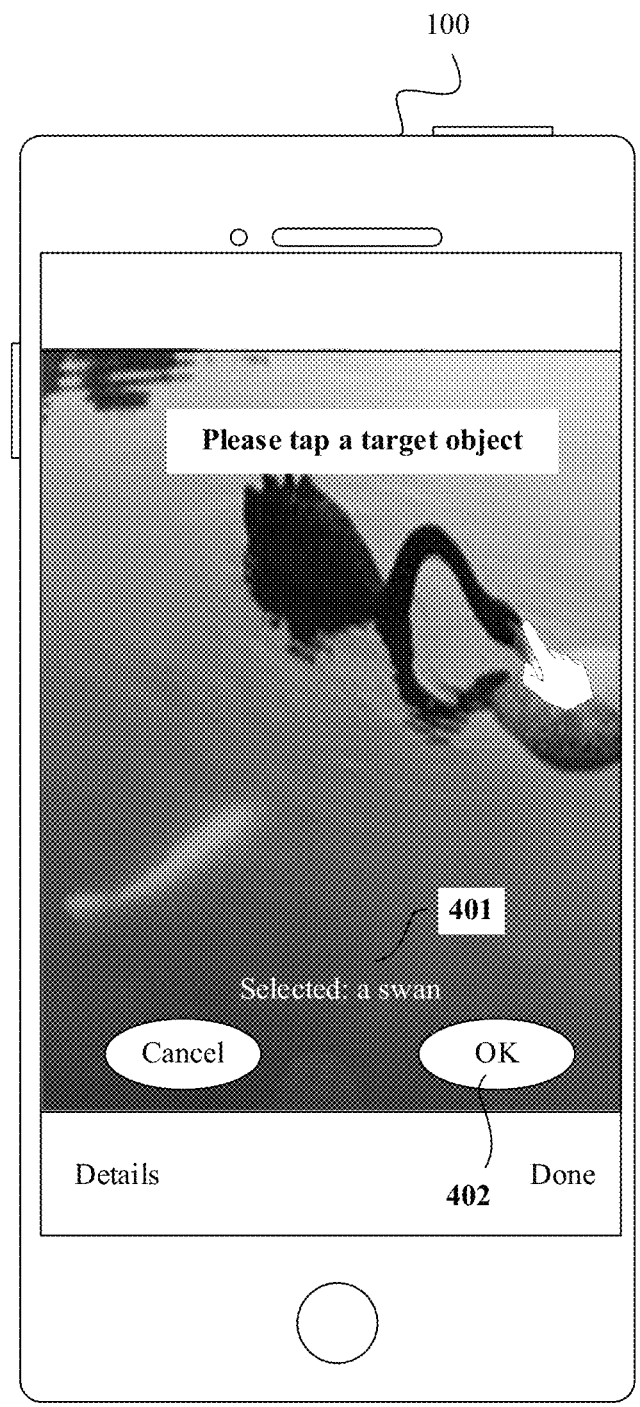
FIG. 4(a) and FIG. 4(b) are a schematic diagram of a graphical user interface on a display of a mobile phone according to an embodiment of this application.

Example 1: Referring to FIG. 4(a), the mobile phone 100 displays text information "Please tap a target object in the image". After detecting a tap operation of a user on the image 203, the mobile phone 100 determines the target object based on the tap operation. Assuming that the user taps a swan in the image 203, the mobile phone 100 determines that the swan is the target object.

Figure 4B:
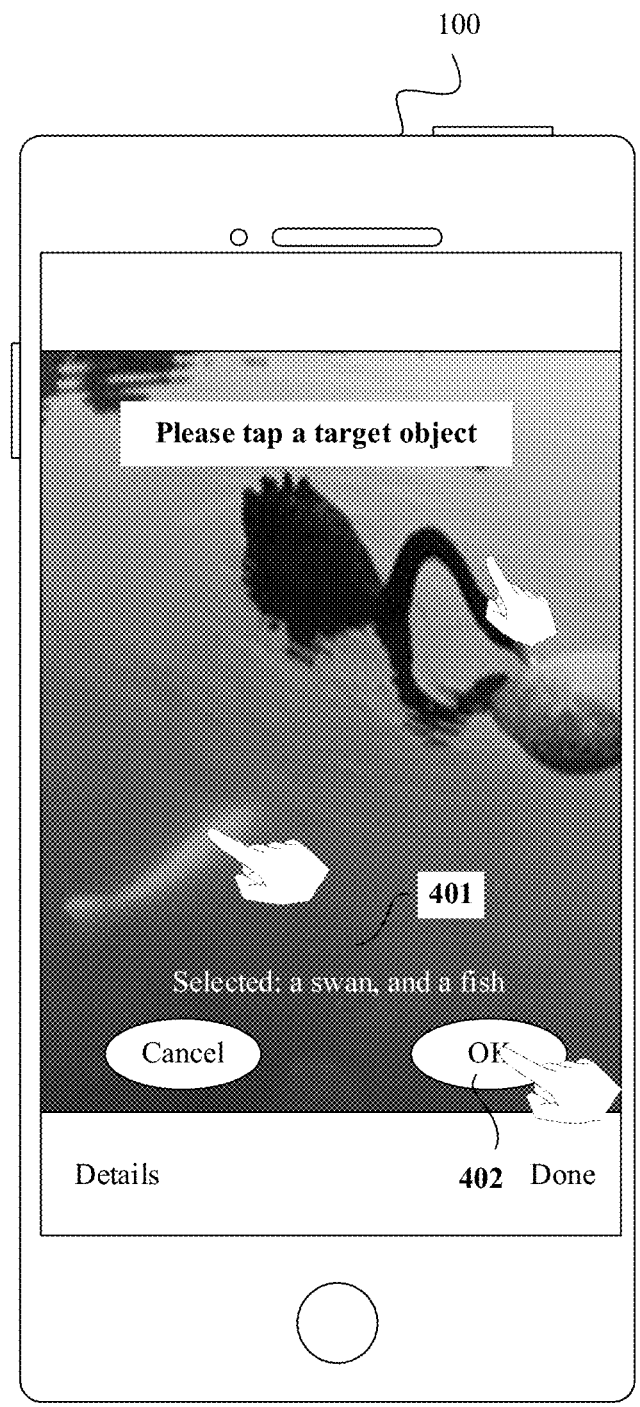

For ease of prompting the user of the selected target object, the mobile phone 100 may display identification information of the selected target object. For example, refer to identification information 401 in FIG. 4(a). It should be noted that if the user taps a target object, the identification information 401 includes identification information of the target object. When the user continues to tap another target object, identification information of the other target is added to the identification information 401. It can be learned by comparing FIG. 4(a) with FIG. 4(b) that, when the user taps only the swan, the identification information 401 includes only the swan, and when the user continues to tap a fish, the fish is added to the identification information 401.

Certainly, after the user selects a plurality of target objects, if the user wants to delete one target object, the user may tap (tap or double tap) the target object again, and the identification information of the target object may be deleted in the identification information 401. When the mobile phone 100 detects an operation on an OK button 402, the mobile phone 100 determines that an object included in the identification information 401 is the target object.

Figure 5A:
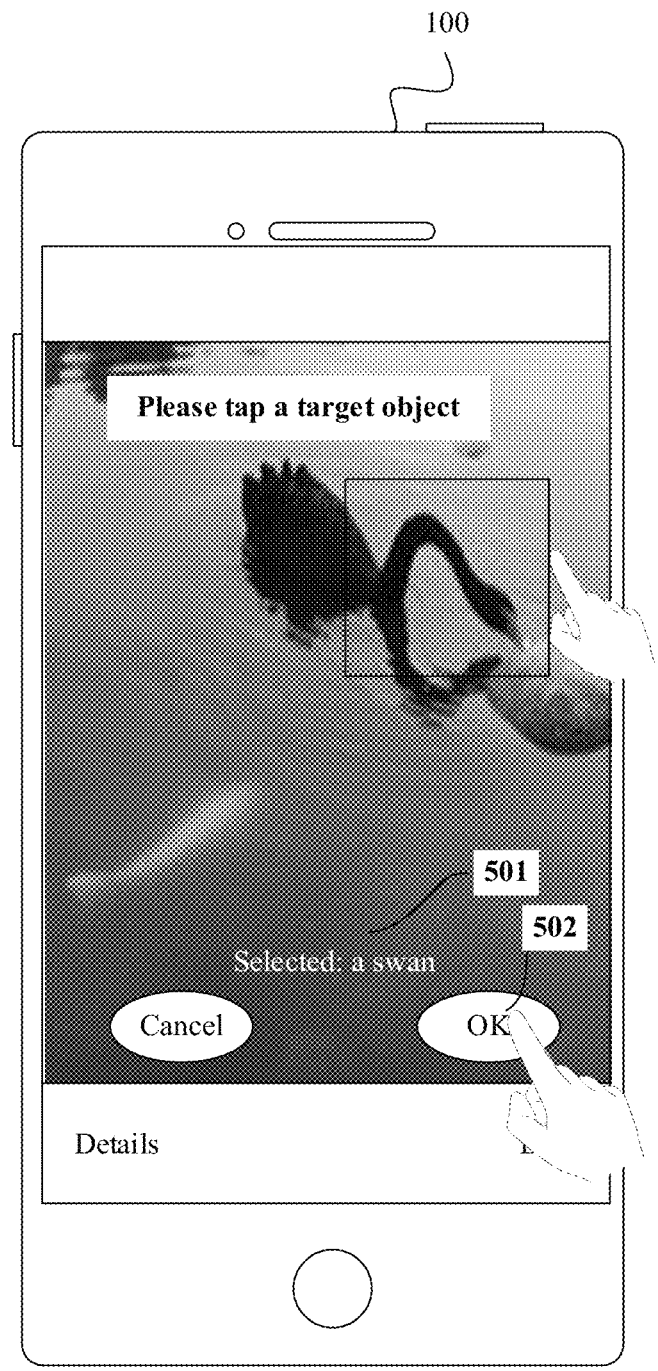
FIG. 5(a) and FIG. 5(b) are a schematic diagram of a graphical user interface on a display of a mobile phone according to an embodiment of this application.

Example 2: Referring to FIG. 5(a), the mobile phone 100 displays a selection box and prompt information "Please move the selection box to select a target object". The mobile phone 100 determines an object included in the selection box as the target object. A position of the selection box can be moved and the size of the selection box can be changed.

Figure 5B:
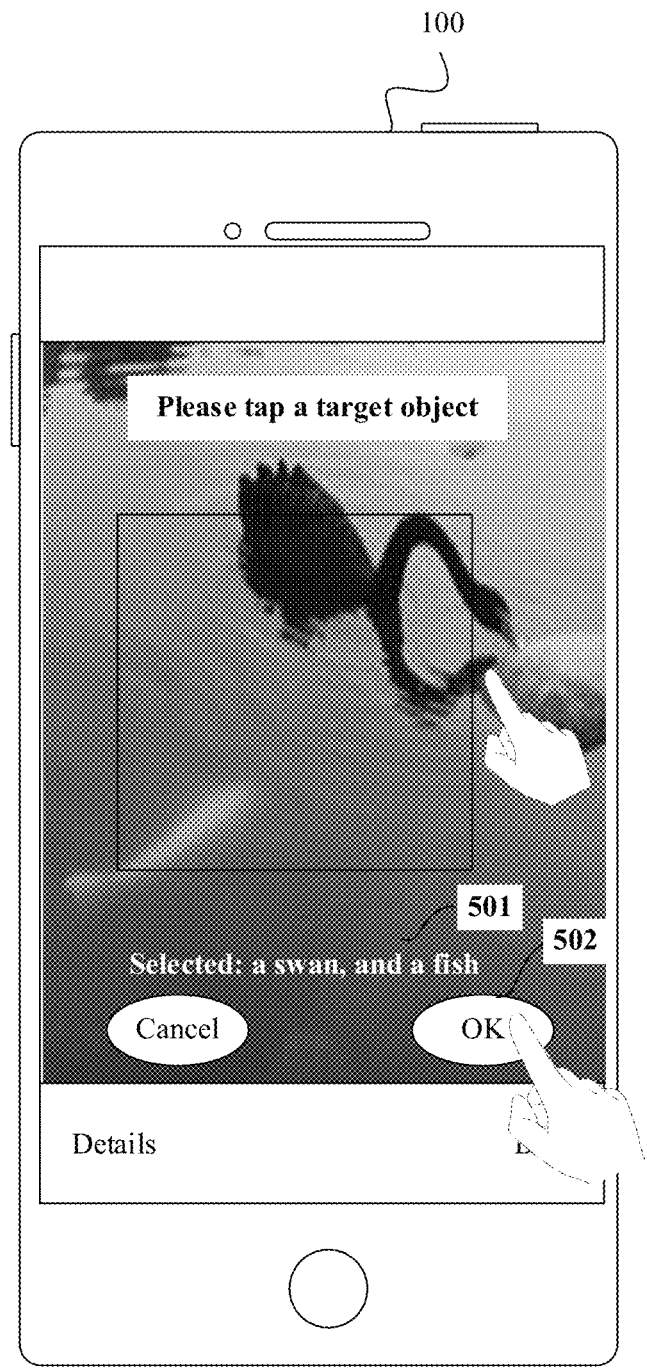

Specifically, when the selection box includes a part of an area of an object (for example, a part of a body of a swan included in the selection box in FIG. 5(a) and FIG. 5(b)), the mobile phone 100 may determine the proportion of an area in which the object is located in the selection box in the entire area of the object. If the proportion is greater than a preset proportion, it is determined that the selection box includes the object.

Certainly, for ease of prompting the user of the selected target object, the mobile phone 100 may display identification information 501 of the selected target object. For example, when the mobile phone 100 detects that the selection box is enlarged, the number of objects included in the selection box increase, and the number of objects included in the identification information 501 increase. Likewise, the user may also delete the target object (for example, reduce the size of the selection box). When the mobile phone 100 detects an operation on an OK button 502, the mobile phone 100 determines that an object included in the identification information 501 is the target object.

Figure 6A:
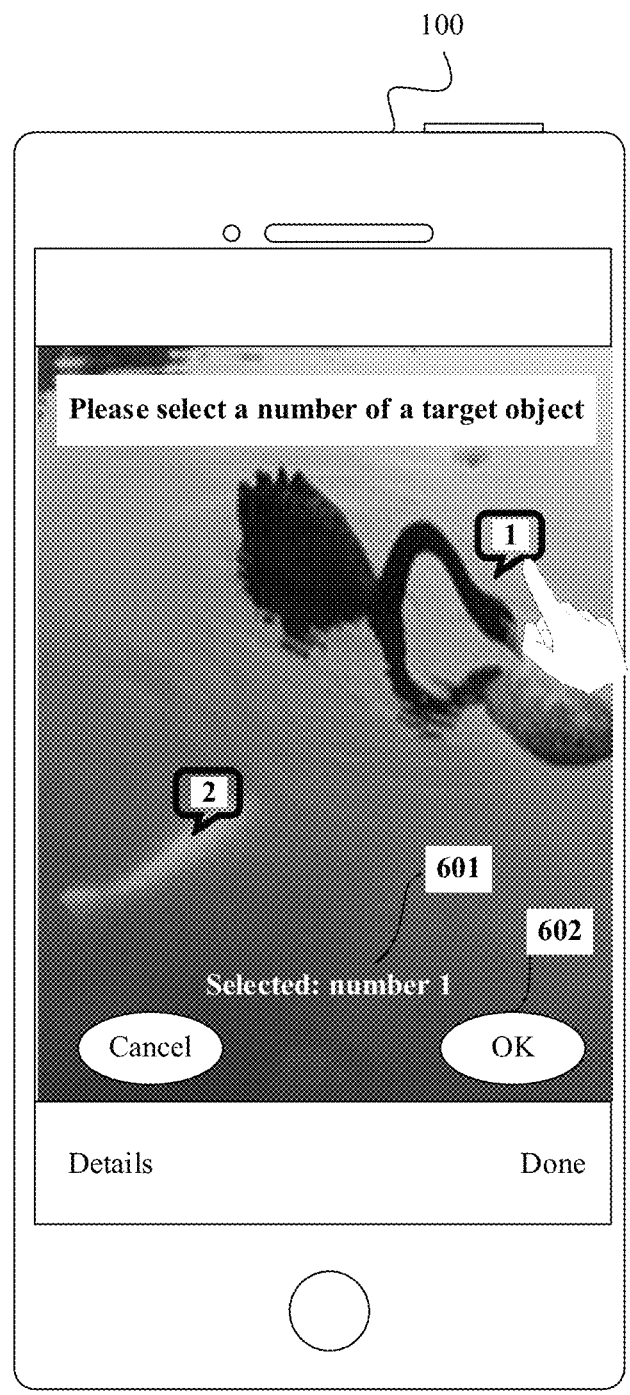
FIG. 6(a) and FIG. 6(b) are a schematic diagram of a graphical user interface on a display of a mobile phone according to an embodiment of this application.
Figure 6B:
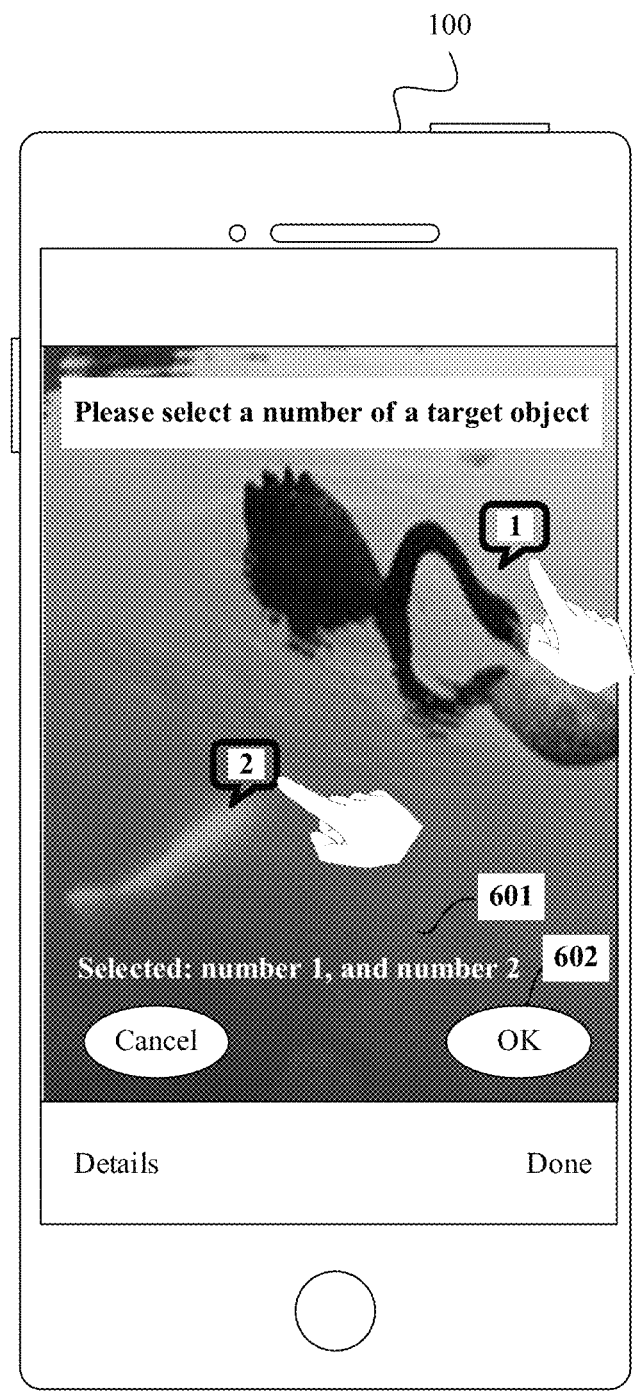

Example 3: Referring to FIG. 6(a), the mobile phone 100 identifies an object included in an image 203, and displays a number for each identified object. When the mobile phone 100 detects an operation of selecting a number by a user, the mobile phone 100 determines that the object corresponding to the number is the target object.

Certainly, the mobile phone 100 may display identification information 601 of the selected target object. For example, after the mobile phone 100 detects that a user selects an object whose number is 1, the identification information 601 includes the number 1. After the user continues to select an object whose number is 2, the number 2 is added to the identification information 602. Likewise, the user may also delete the target object (for example, taps the object whose number is 1 again, and deletes the number 1 in the identification information 601). When the mobile phone 100 detects an operation on an OK button 602, the mobile phone 100 determines that an object corresponding to a number included in the identification information 601 is the target object.

Figure 7A:
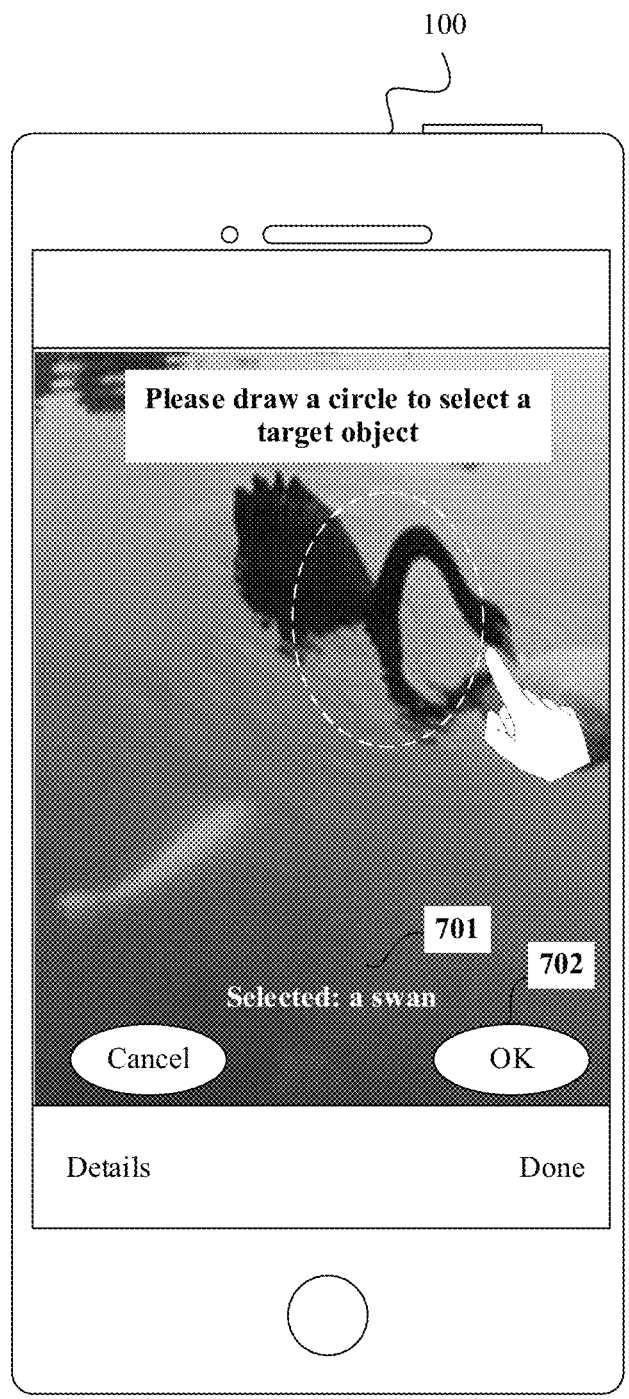
FIG. 7(a) to FIG. 7(d) are a schematic diagram of a graphical user interface on a display of a mobile phone according to an embodiment of this application.
Figure 7B:
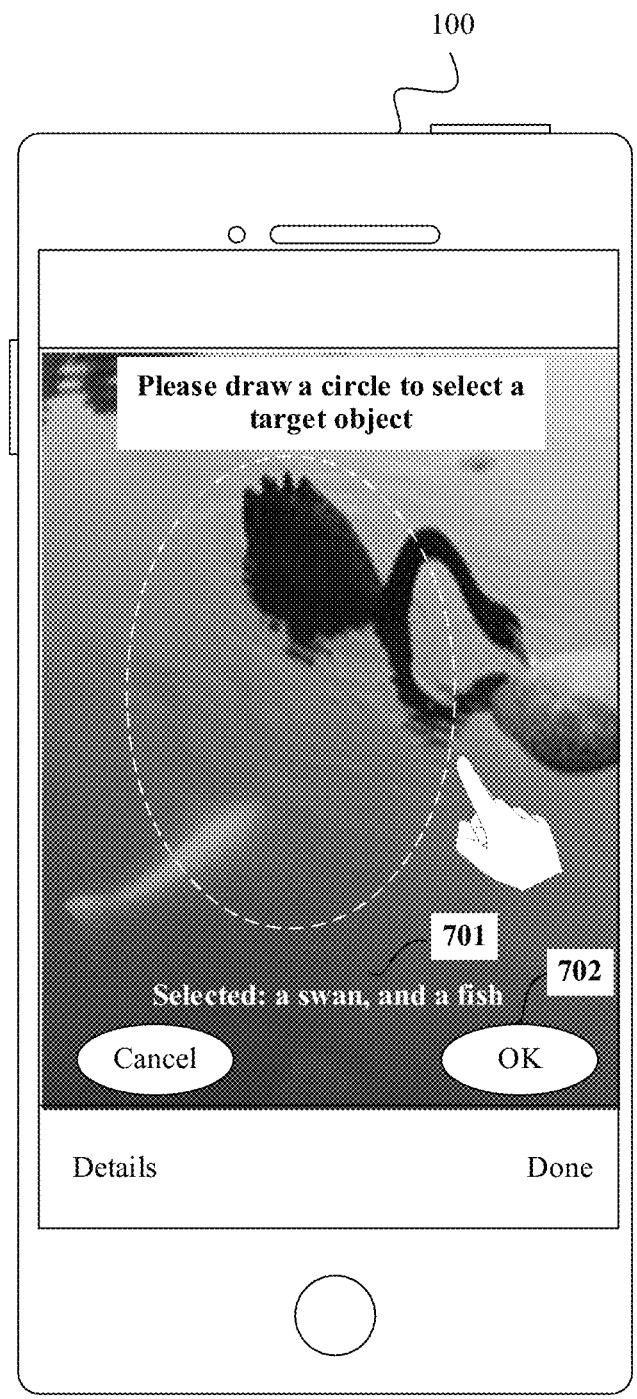

Example 4: Referring to FIG. 7(a), after detecting a circle drawing operation performed by the user on the image 203, the mobile phone 100 determines that an object in an area enclosed by a track of the circle drawing operation is the target object. Certainly, a size and a display position of the area enclosed by the track of the circle drawing operation performed by the user may change. For example, compare FIG. 7(a) with FIG. 7(b). When the area enclosed by a track of a circle drawing operation is enlarged, the number of objects in the area increase, for example, a fish is added to identification information 701. Certainly, the user may also delete the target object (for example, reduce a size of a selection box), and delete and remove, from the identification information 701, identification information of the target object in the selection box.

Figure 7C:
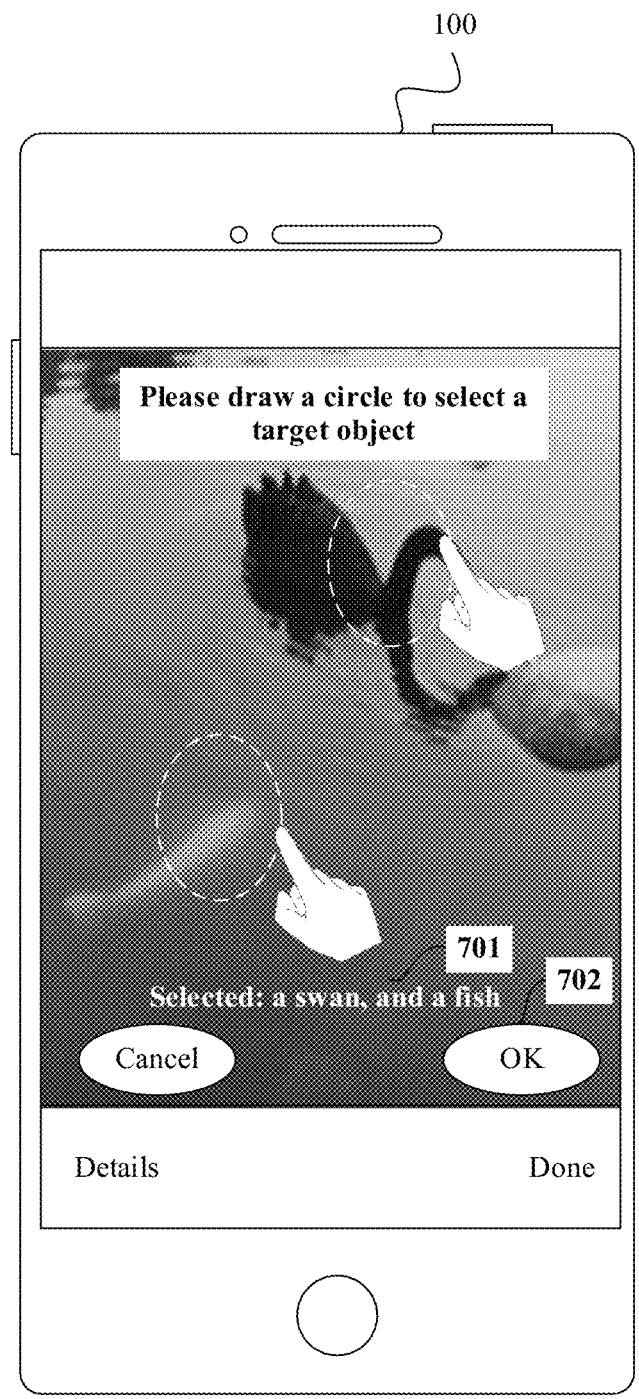
Figure 7D:
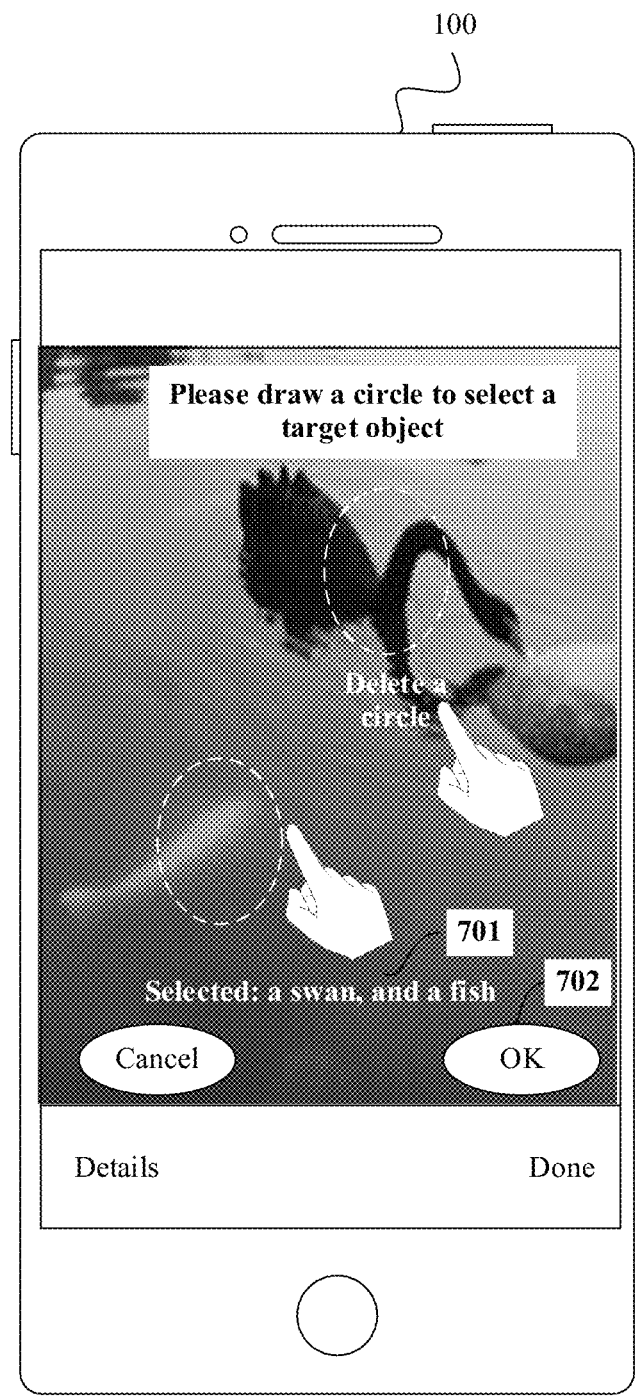

Certainly, referring to FIG. 7(c), a user may alternatively perform a plurality of circle drawing operations on a first frame of image, and an object in an area enclosed by each circle drawing operation is the target object. The user may also delete the target object. For example, as shown in FIG. 7(d), a circle in a drawing is long pressed to delete the circle.

In an example, the mobile phone 100 may further automatically select a target object. For example, the mobile phone 100 presets an object type to which the target object belongs. When the mobile phone 100 identifies an object in an image as belonging to the preset object type, the object is identified as the target object. For example, the mobile phone 100 presets that the object types of the target object include "person", "animal", "plant", "object", "building", and the like. The mobile phone 100 identifies that an object in the image 203 belongs to the animal type, and therefore the object is identified as the target object.

For example, the mobile phone 100 identifies that an image includes two objects (namely, persons), and both objects belong to the preset "person" type. Therefore, both objects are target objects. Certainly, the target object may alternatively be a plurality of object types. For example, the mobile phone 100 identifies that two objects included in an image respectively belong to different preset object types (for example, the "person" type and the "animal" type). Therefore, both objects are target objects.

Certainly, the mobile phone 100 may preset a priority order of a plurality of object types. For example, the "person" type has a higher priority than the "animal" type, and the priority of animal is higher than that of building. For example, assuming that an image 404 includes a person, an animal, and a building, the object whose object type has the highest priority, e.g., person, is the target object, or two objects (for example, the person and the animal) with the highest priority are the target objects. For another example, if an image 404 does not include a person, but includes an animal and another object, the animal which is the highest priority included in the image 404 is the target object.

Optionally, if the mobile phone 100 is configured to automatically identify the target object, the mobile phone 100 may fail to identify the target object. For example, the image does not include the object type preset by the mobile phone 100. In this case, the mobile phone 100 may perform further processing based on an image size.

For example, if both a length and a width of the image are less than or equal to 1280, the mobile phone 100 may not compress the image. In other words, the mobile phone 100 sends the image to a server, and the server does not compress the image either. Refer to the manner 1.

For another example, if a length or a width of the image is greater than 1280, and a length-width ratio of the image is less than or equal to 2, the mobile phone 100 may increase the length-width ratio of the image. This is because when determining that the length or the width of the image is greater than 1280, the server determines whether the length-width ratio of the image is less than or equal to 2. See Manner 2 described above. If the length-width ratio of the image is less than or equal to 2, the server may choose to compress the image. Therefore, the mobile phone 100 may increase the length-width ratio of the image (for example, greater than 2). In this case, when the mobile phone 100 sends the image to the server, the server determines that the length-width ratio of the image does not meet a condition of less than or equal to 2, and therefore does not compress the image.

For another example, when the length and the width of the image are greater than 1280, and the length-width ratio of the image is greater than 2, the mobile phone 100 may reduce the length-width ratio of the image (for example, reduce the length-width ratio to less than or equal to 2). This is because when determining that the length and the width of the image are greater than 1280, the server determines whether the length-width ratio of the image is greater than 2. See Manner 3 described above. If the length-width ratio of the image is greater than 2, the server compresses the image. Therefore, the mobile phone 100 may reduce the length-width ratio of the image, so that the length-width ratio of the image is less than or equal to 2. In this way, when the mobile phone 10 sends the image to the server, the server does not compress the image.

In another example, the mobile phone 100 may further determine the target object based on a display position, a display area, and the like of the object. For example, an object located in the middle of an image is identified as a target object, or an object that occupies a comparatively large area in an image is identified as a target object.

After determining the target object(s), the mobile phone 100 may use different image compression manners for the target object and another object, so that both a length and a width of a compressed image are less than 1280. In this way, when the mobile phone 100 uploads the compressed image to a social media platform, the server does not need to compress the image (refer to the Manner 1) again.

Figure 8A:
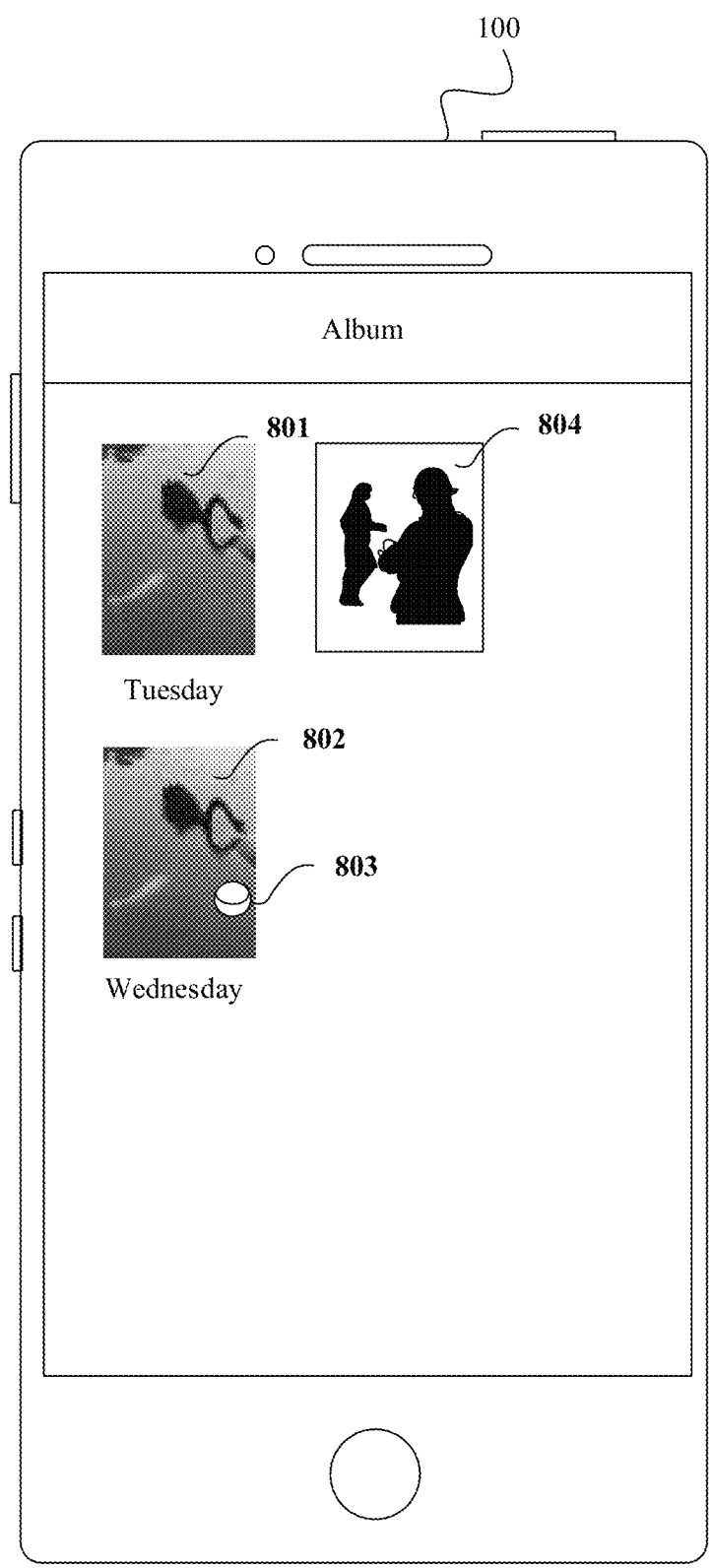
FIG. 8A is a schematic diagram of a graphical user interface on a display of a mobile phone according to an embodiment of this application.

Optionally, after compressing the image, the mobile phone 100 may store the compressed image. Referring to FIG. 8A, the mobile phone 100 displays a display interface of an album application, and three raw images, namely, an image 801, an image 804, and an image 802, are displayed on the display interface. The image 802 is an image obtained after differential compression is performed on the image 801. The mobile phone 100 may display an icon 803 in a display position of the image 802. The icon 803 is used to indicate that the image 802 is an image obtained after intelligent compression. As shown in the example of FIG. 8A, the raw image 801 and the raw image 804 are shot on Monday, and the date of obtaining the image 802 by intelligently compressing the raw image 801 is Wednesday. Therefore, a date corresponding to the image 802 in FIG. 8A is Wednesday. It should be noted that the icon 803 in FIG. 8A is merely an example, and does not constitute a limitation.

Figure 8B:
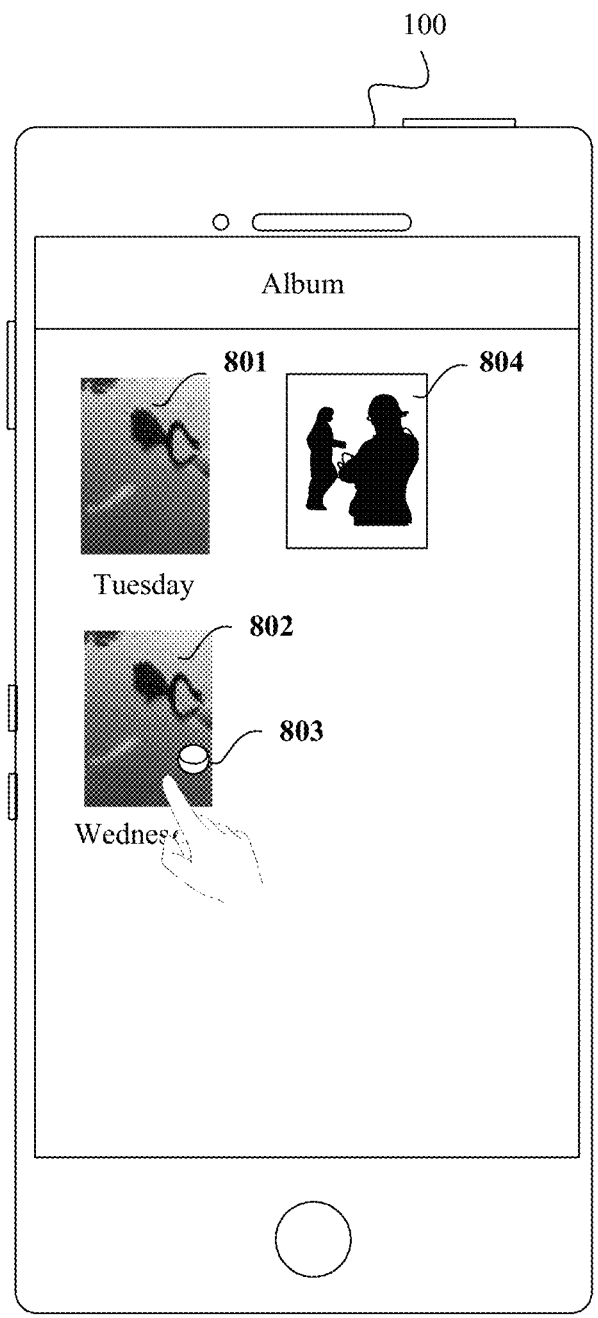
FIG. 8B(a) to FIG. 8B(c) are a schematic diagram of a graphical user interface on a display of a mobile phone according to an embodiment of this application.
Figure 8B:
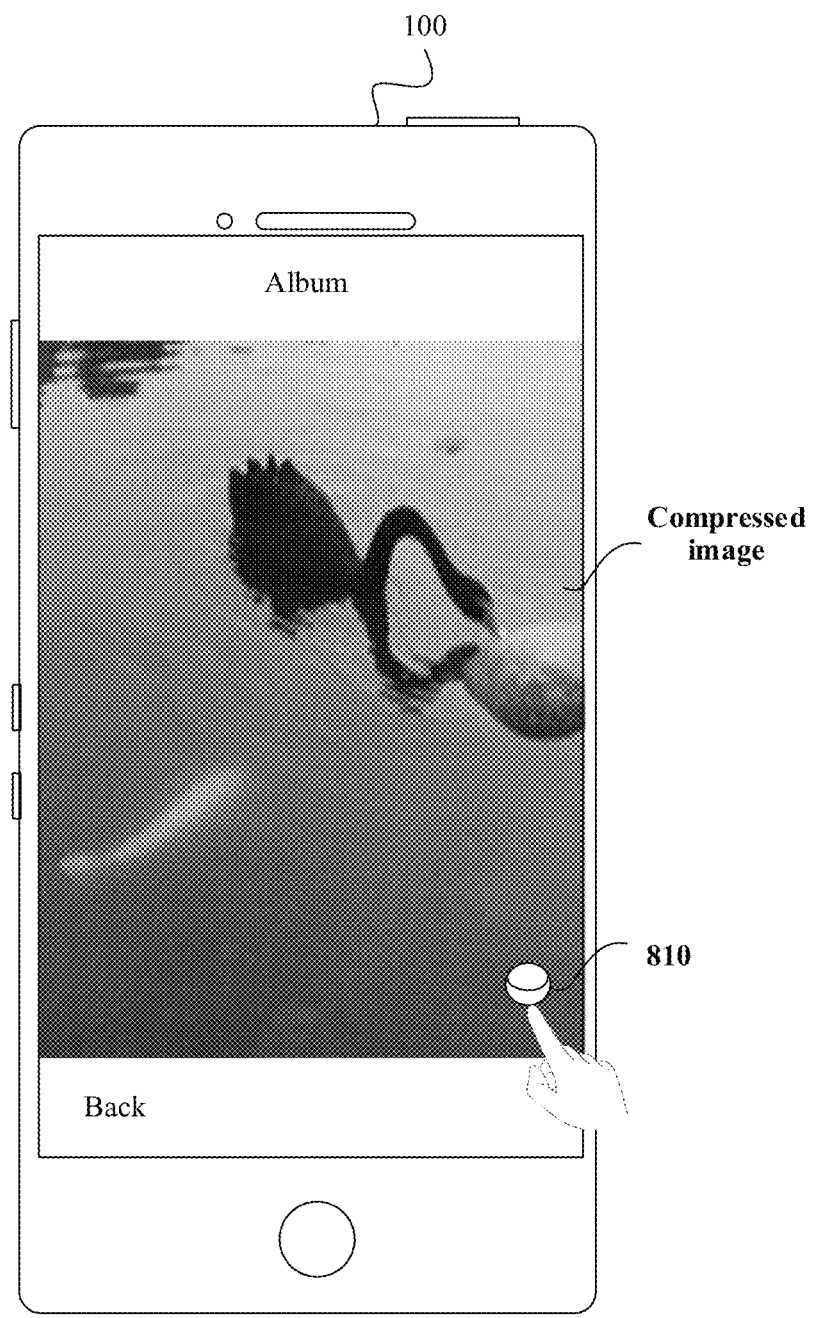
Figure 8B:
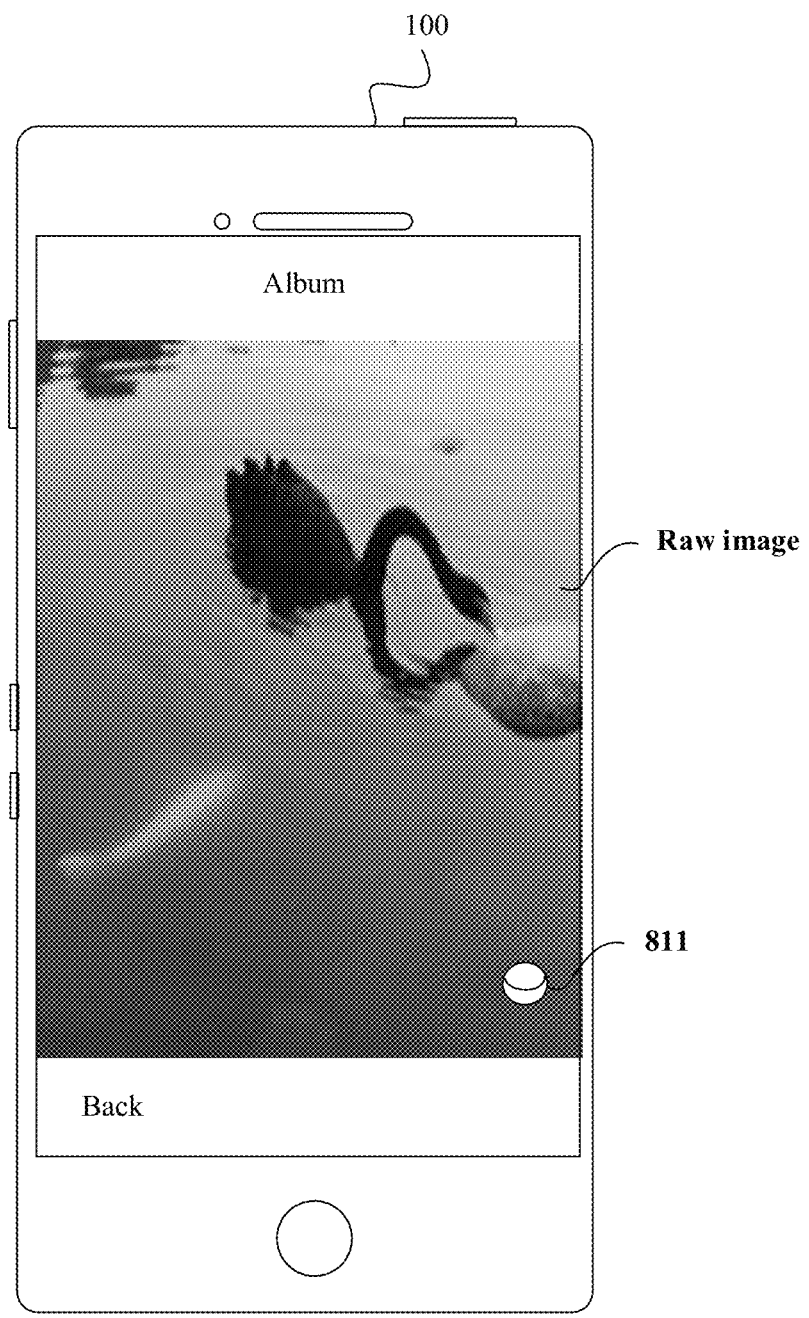

It should be noted that, to help a user compare a compressed image with a raw image, when the mobile phone 100 displays the compressed image and detects a preset operation, the mobile phone 100 may display a raw image corresponding to the compressed image. For example, referring to FIG. 8B(a), the mobile phone 100 detects an operation of tapping an image 802 (a compressed image) by the user, and displays an interface shown in FIG. 8B (b). The interface includes a control 810. When the mobile phone 100 detects an operation of triggering the control 810 by the user, a raw image corresponding to the image 802, namely, an uncompressed image, is displayed. When the mobile phone 100 detects again the operation of triggering the control 810 by the user, the mobile phone 100 switches to the image 802.

The following describes an image compression process provided in the embodiments of this application.

Figure 9:
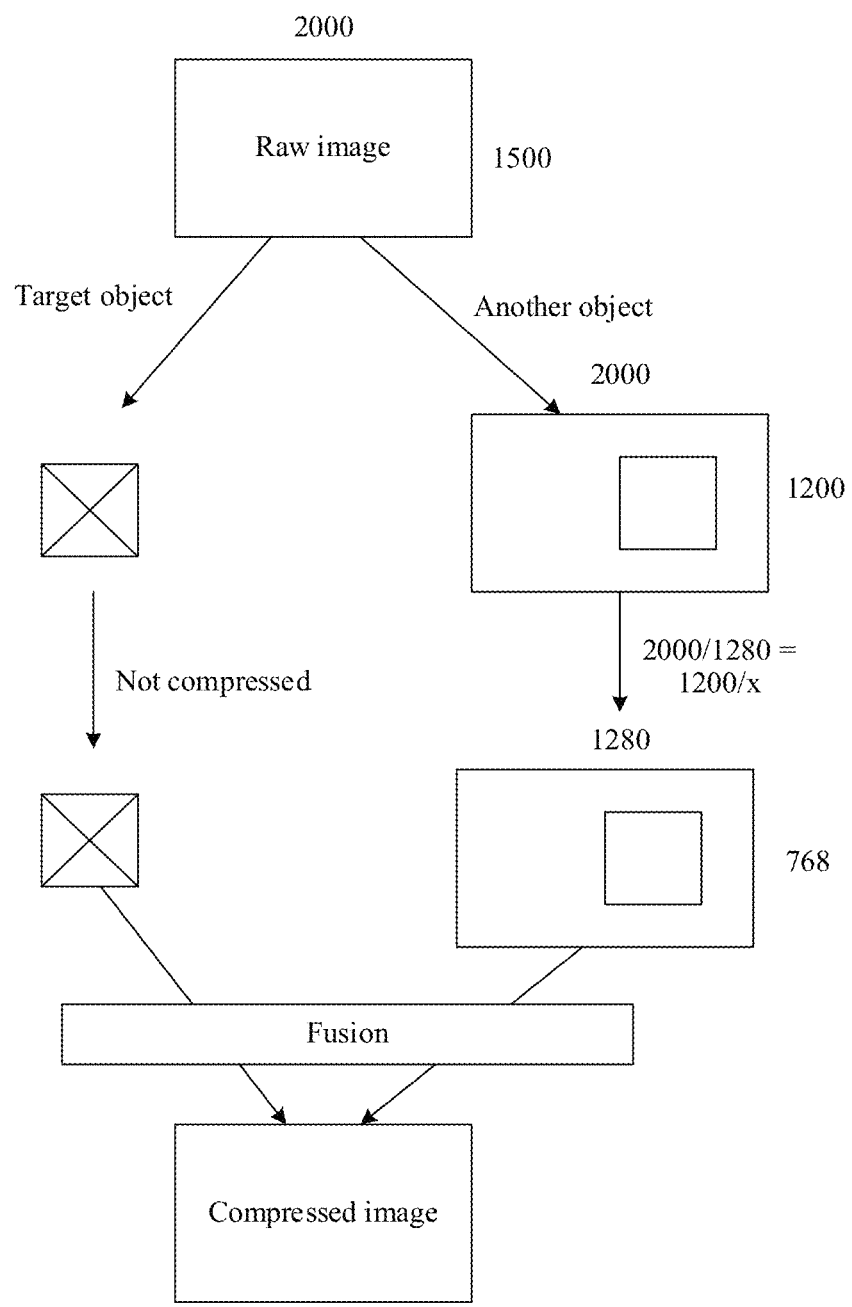
FIG. 9 is a schematic diagram of performing differential compression on a target object and a background according to an embodiment of this application.

Referring to FIG. 9, a mobile phone 100 splits a target object and another object (for example, all other objects except the target object, or the object referred to as a background) from a raw image. The mobile phone 100 may separately compress the target object and the background in the foregoing three manners, and then fuse a compressed target object and a compressed background to obtain a new image.

In an example, it can be learned from the foregoing content that a larger compression ratio indicates a less clear image. Therefore, after splitting the target object and the other object, the mobile phone 100 may not compress or may compress as few target objects as possible. For example, the target object is compressed in a first compression ratio, and the background is compressed in a second compression ratio. The first compression ratio is less than the second compression ratio. The first compression ratio may be 1. In other words, the target object is not compressed. For example, if both a length and a width of a target object are less than 1280, the mobile phone 100 may not compress the target object, but compress only another object. For a compression manner for the other object, refer to the Manner 2 or Manner 3, so that both a length and a width of the fused image are less than 1280. In this way, when the mobile phone 100 sends the fused image to a server, the server does not compress the image again.

In another example, if a length or a width of a target object split by the mobile phone 100 is greater than 1280, and a length-width ratio of the target object is greater than or equal to 2, the mobile phone 100 may compress the target object in a comparatively small compression ratio, and compress another object in a comparatively large compression ratio. In this way, both a length and a width of a fused image are less than 1280.

Certainly, the mobile phone 100 may further compress the target object and the background in another compression manner, provided that a compression degree of the target object relative to the background is comparatively low, and both the length and the width of the compressed image are less than 1280. In this way, when the mobile phone 100 sends the fused image to a server, the server does not compress the image again.

In some other embodiments, an album application in the mobile phone 100 may include a cloud album. In other words, an image in the cloud album is an image stored in the cloud, and the image in the cloud album in the mobile phone 100 is displayed as a thumbnail. The image sharing method provided in the embodiments of this application may be applied to the thumbnail in the cloud album. FIG. 3A(a) to FIG. 3A(c) are used as an example. It is assumed that an image displayed in FIG. 3A(a) is a thumbnail in a cloud album. When the mobile phone 100 detects an operation triggering exporting an intelligent compression image option 302, the mobile phone 100 downloads the image, to obtain a raw image of the image, and displays an interface shown in FIG. 3A(b). This is because a definition of the thumbnail stored in the cloud album is comparatively low. If the thumbnail is compressed directly, the definition will be lower. Therefore, the raw image may be downloaded and differential compression can be performed on the raw image.

The foregoing embodiment describes an intelligent image compression process of an image 404 performed by the mobile phone 100, in a scenario 1 (namely, an album application scenario). The following describes how the mobile phone 100 obtains an image after intelligent compression, in a scenario 2 (namely, a picture shooting scenario).

Figure 10A:
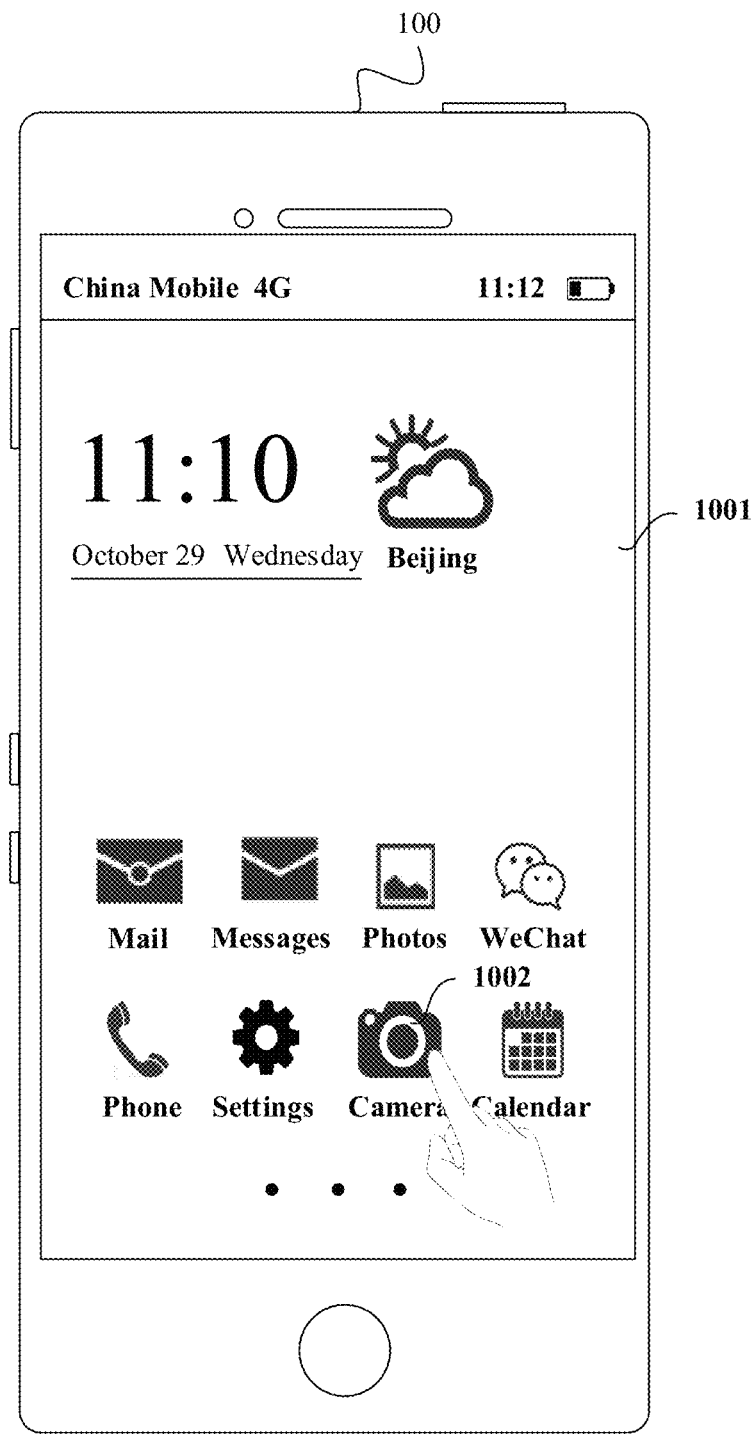
FIG. 10(a) and FIG. 10(b) are a schematic diagram of a graphical user interface on a display of a mobile phone according to an embodiment of this application.
Figure 10B:
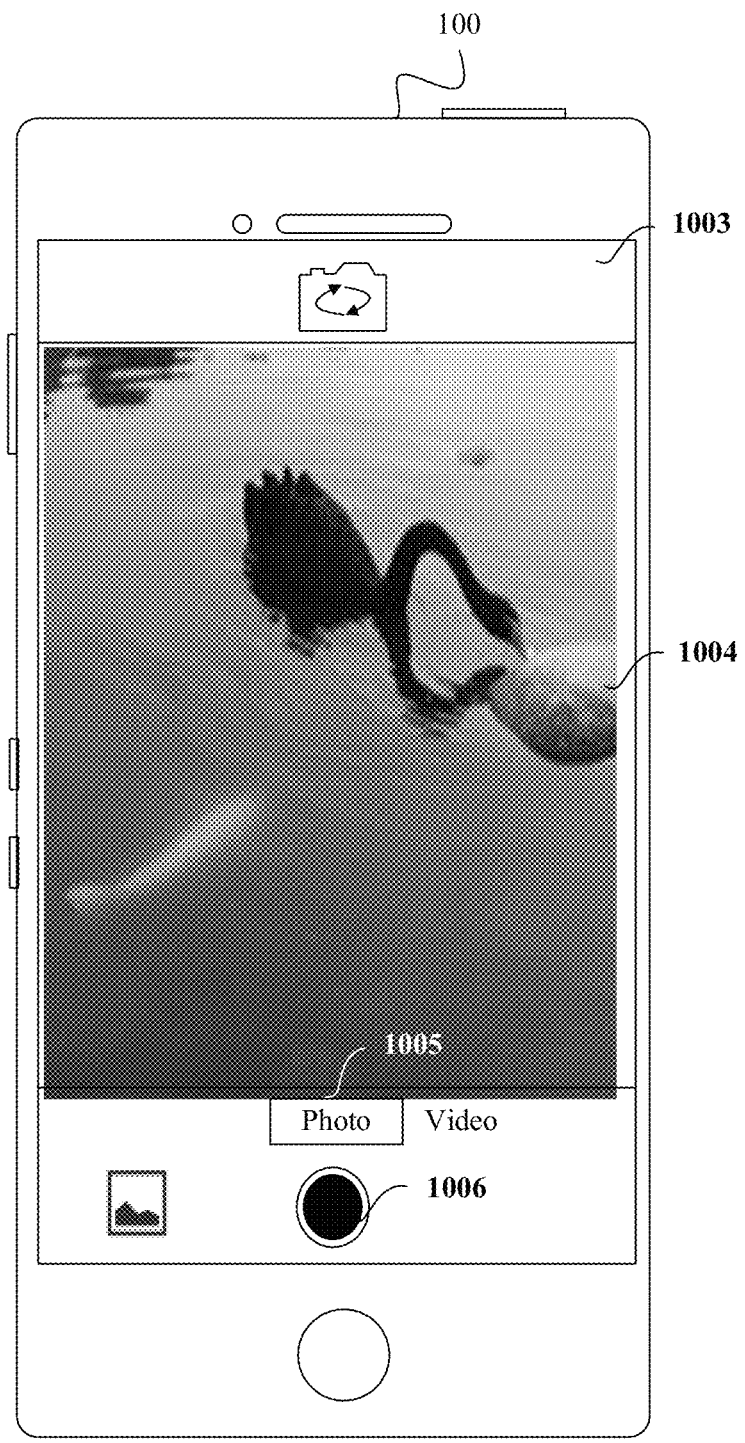

FIG. 10(a) shows a GUI of a mobile phone 100. The GUI is a desktop 1001 of the mobile phone. After detecting an operation that a user taps an icon 1002 of a camera application on the desktop 1001, the mobile phone 100 may start the camera application, and display another GUI shown in FIG. 10(b). The GUI includes an image shooting preview interface 1003. The preview interface 1003 includes a photo option 1005 and a video option. When the photo option 1005 is selected, the mobile phone 100 enters a photographing mode, and the preview interface 1003 includes a preview image 1004. When the video option is selected, the mobile phone 100 starts to record a video. Positions of the photo option 1005 and the video option shown in FIG. 10(b) are merely examples, and do not constitute a limitation on this application. The photo option 1005 and the video option may be set in any blank area based on a design requirement.

In some embodiments, the mobile phone 100 is provided with a plurality of shooting modes. When receiving an instruction for entering an image sharing mode on the interface shown in FIG. 10(b), the mobile phone 100 enters the image sharing mode. In the image sharing mode, both a length and a width of an image shot by the mobile phone 100 are less than 1280, and when the image is uploaded to a social media platform, a server corresponding to the social media platform does not compress the image again. It should be understood that the image sharing mode represents a mode different from common photo modes. In other words, the processing is performed on a target object and a non-target object in different compression ratios, and the image sharing mode may also be referred to as an XX mode. This is not limited herein.

The mobile phone 100 may receive, in a plurality of manners, the instruction for entering the image sharing mode. The following are several examples.

Figure 11A:
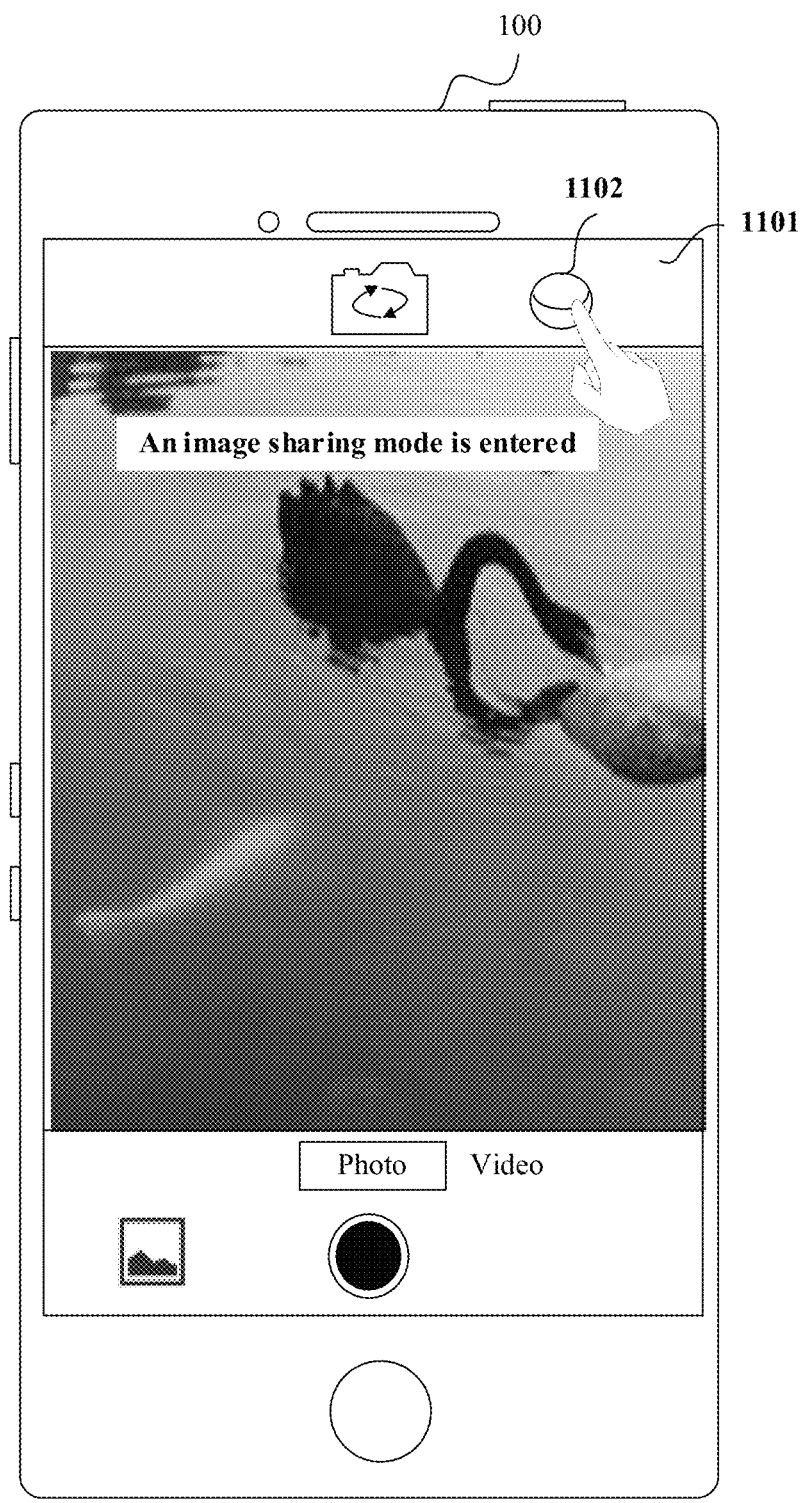
FIG. 11(a) to FIG. 11(c) are a schematic diagram of a graphical user interface on a display of a mobile phone according to an embodiment of this application.

Example 1: Referring to FIG. 11(a), the mobile phone 100 displays a preview interface 1101, and the preview interface 1101 includes an icon 1102. When the icon 1102 is triggered, the mobile phone 100 enters the image sharing mode. The mobile phone 100 displays prompt information that the image sharing mode is entered.

Figure 11B:
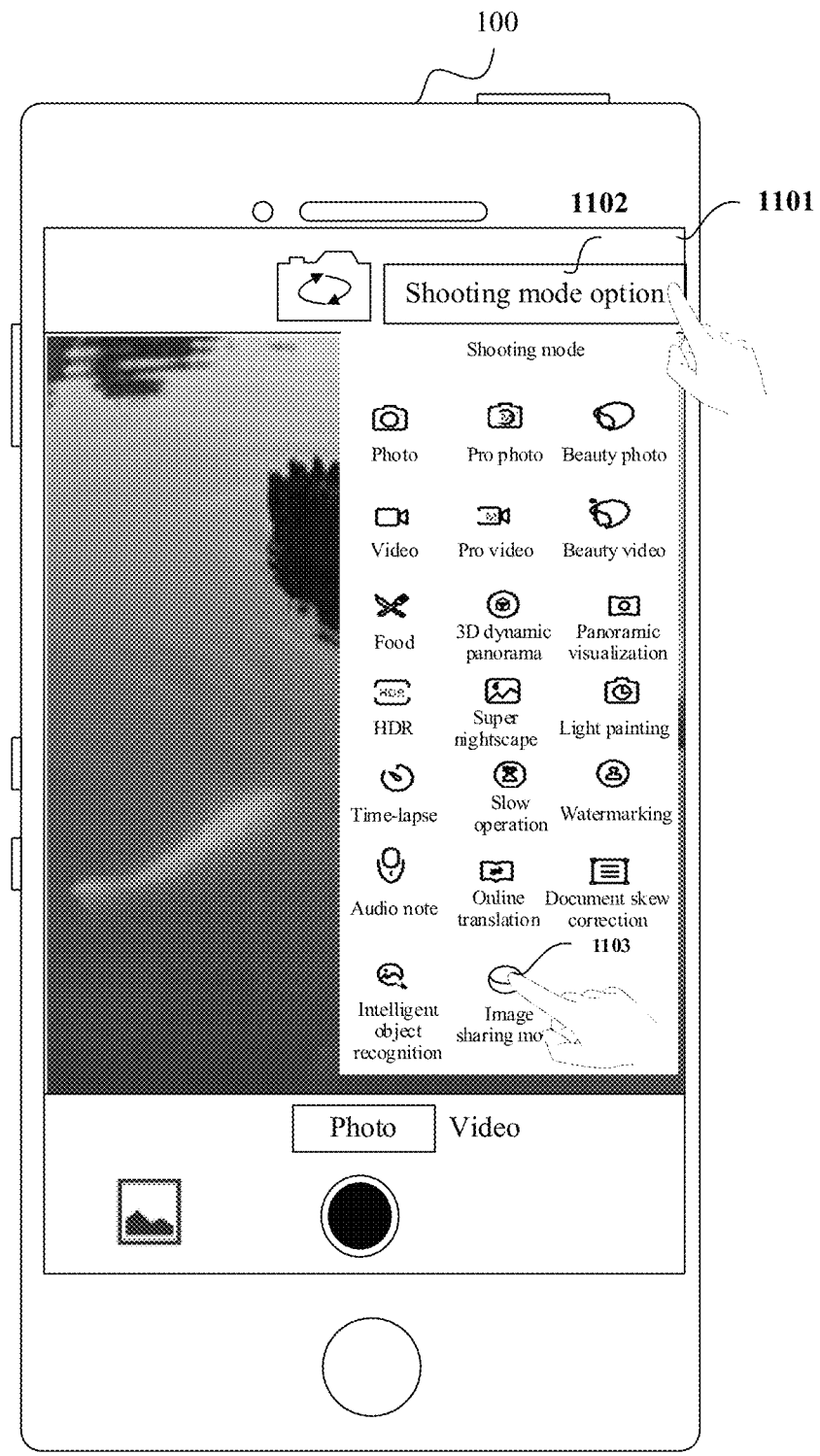

Example 2: Referring to FIG. 11(b), the mobile phone 100 displays a preview interface 1101, and the preview interface 1101 includes a shooting mode option 1102. When detecting an operation of triggering the shooting mode option 1102, the mobile phone 100 displays a plurality of shooting modes. When detecting an operation of selecting an image sharing mode 1103, the mobile phone 100 enters the image sharing mode.

Figure 11C:
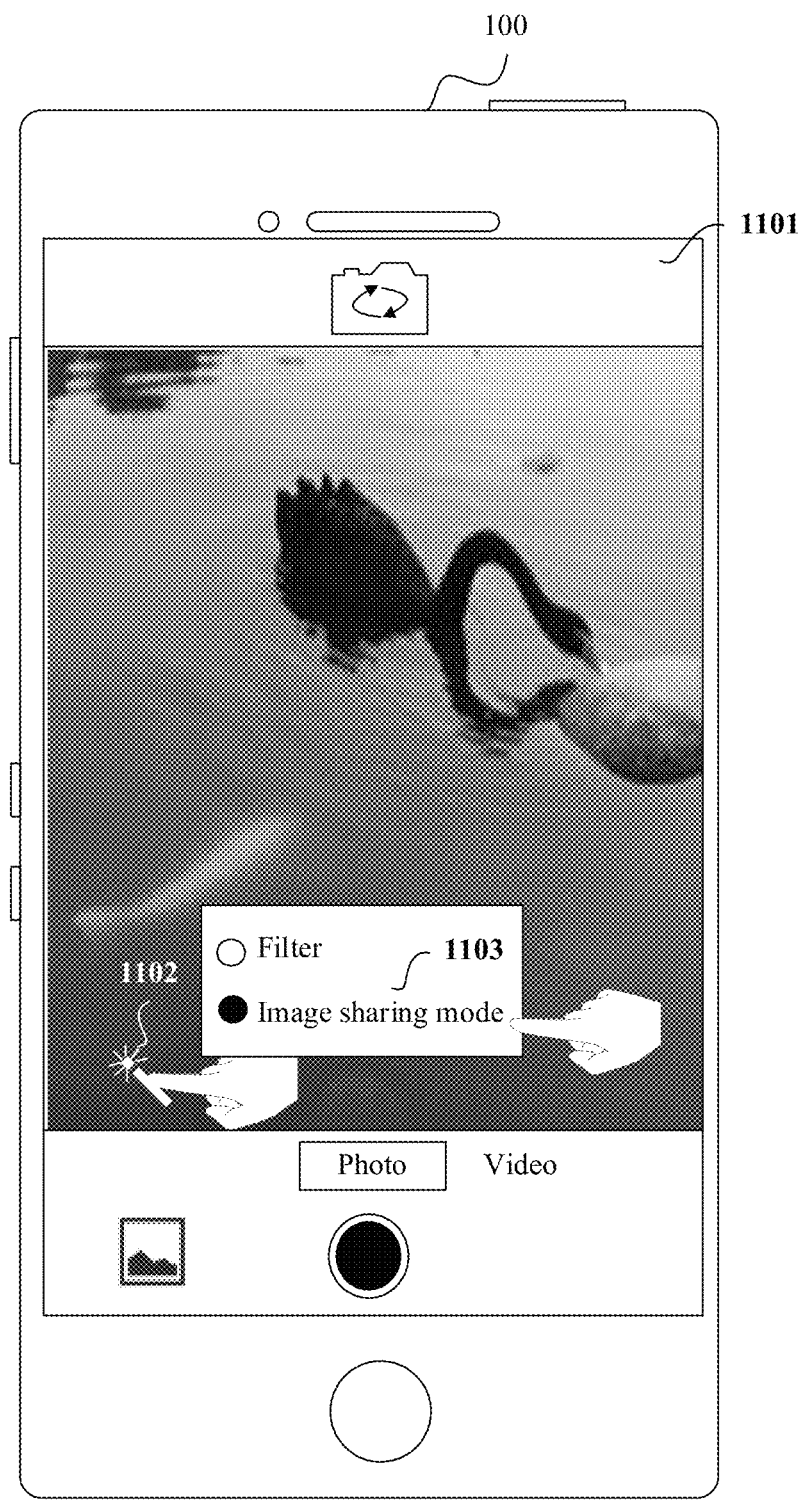

Example 3: Referring to FIG. 11(c), the mobile phone 100 displays a preview interface 1101, and the preview interface 1101 includes a magic stick control 1102. When detecting an operation of triggering the magic stick control 1102, the mobile phone 100 displays a control used to indicate a filter and a control 1103 used to indicate an image sharing mode. The mobile phone 100 enters the image sharing mode when detecting an operation of triggering the control 1103 used for image sharing and shooting.

Figure 12A:
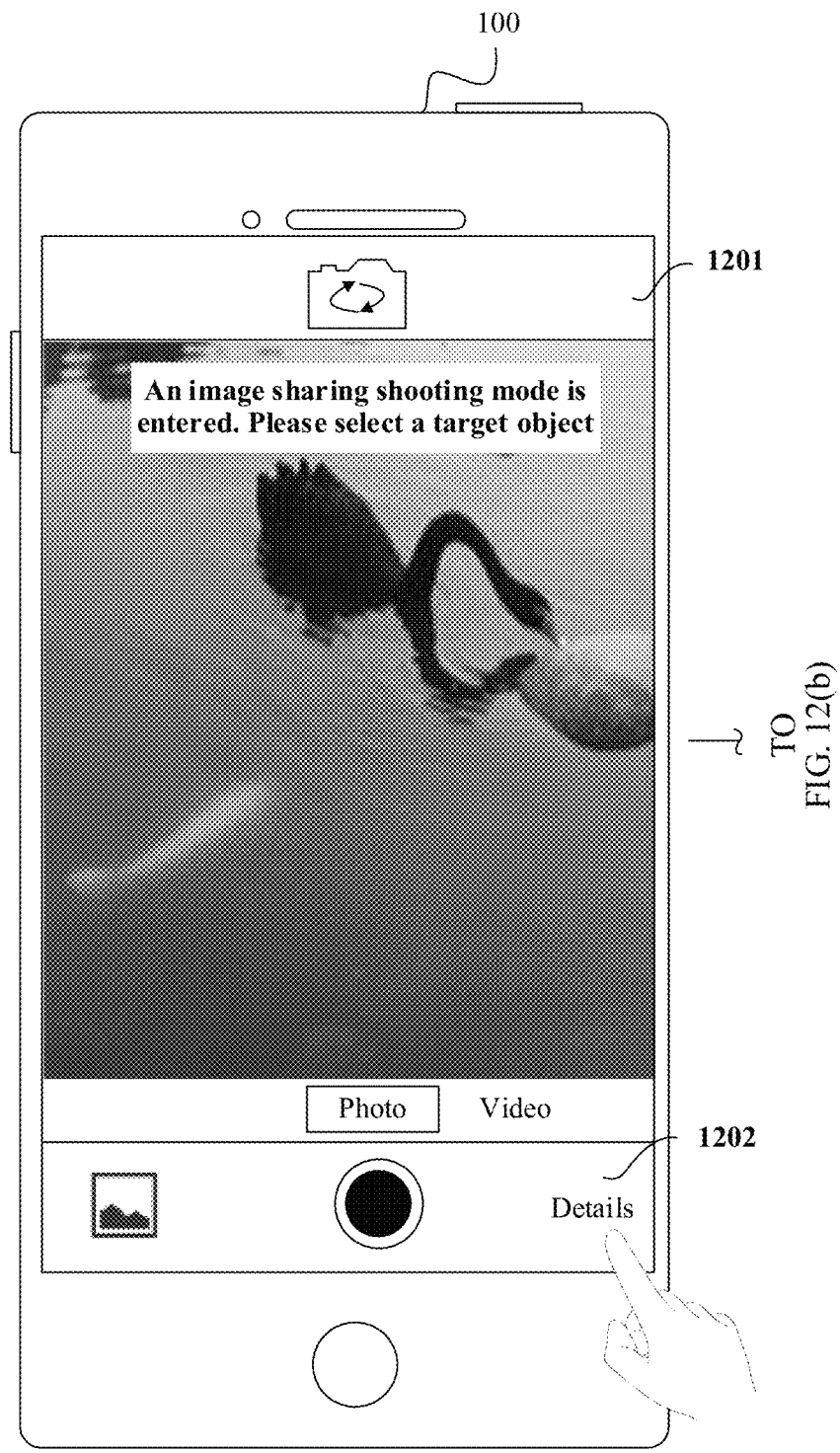
FIG. 12(a) and FIG. 12(b) are a schematic diagram of a graphical user interface on a display of a mobile phone according to an embodiment of this application.
Figure 12B:
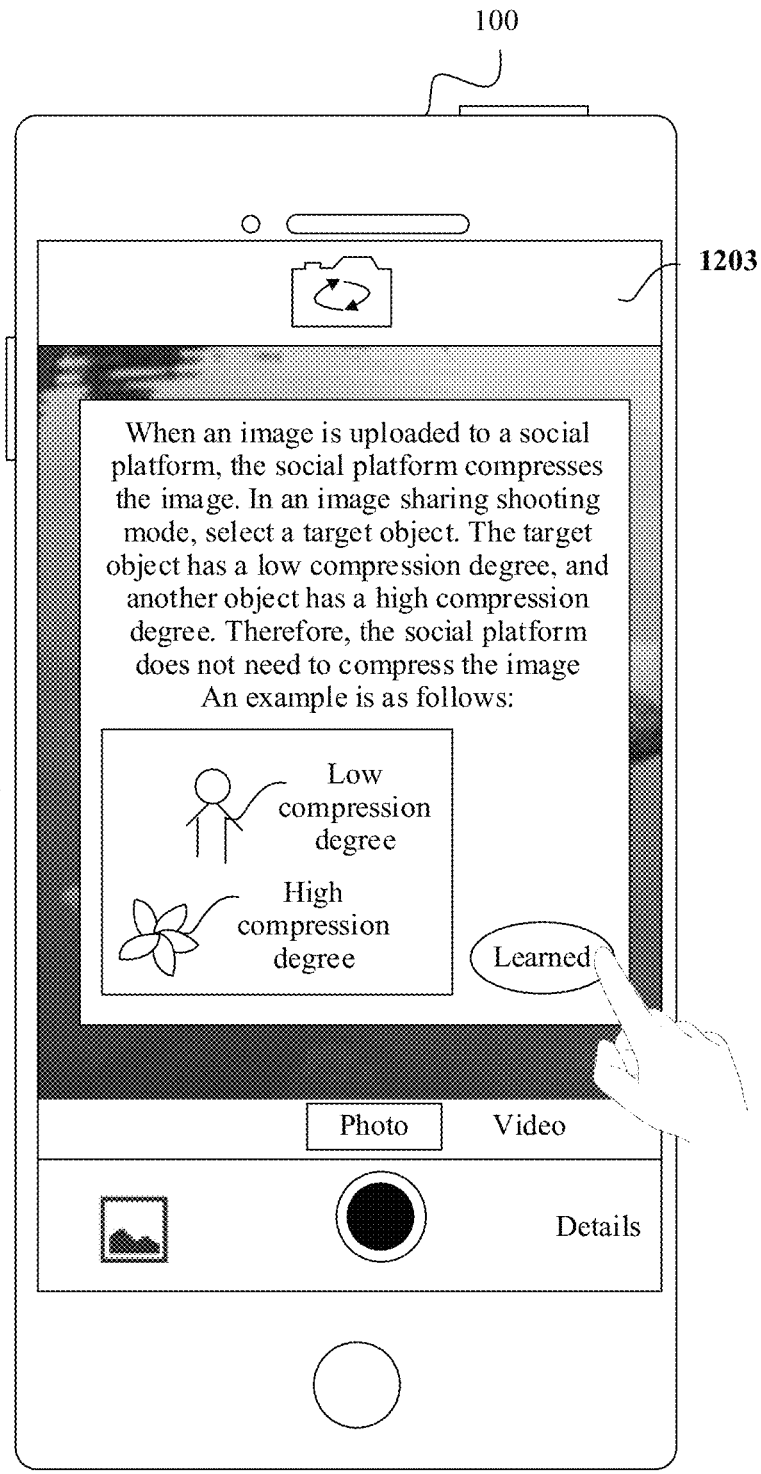

In some embodiments, referring to FIG. 12(a), after entering the image sharing mode, the mobile phone 100 displays an interface 1201 shown in FIG. 12(a), and displays prompt information "An image sharing mode is entered. Please select a target object" on the interface 1201. The interface 1201 includes a details control 1202. When the details control 1202 is triggered, the mobile phone 100 displays an interface 1203 shown in FIG. 12(b). The interface 1203 includes indication of related information about the image sharing mode, to help a user understand an image sharing mode function. When the user taps a "Learned" control, the mobile phone 100 returns to the interface 1201.

In some embodiments, the target object may be specified by a user.

Figure 13A:
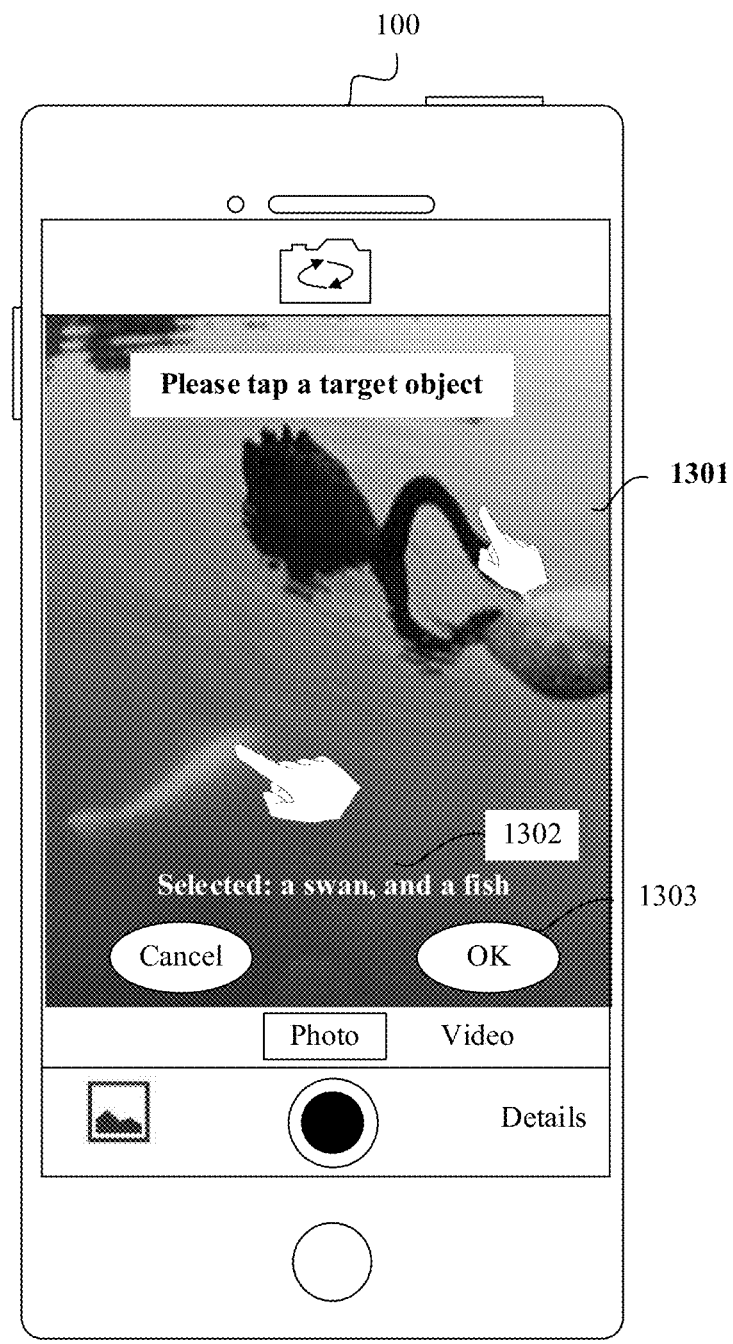
FIG. 13(a) to FIG. 13(c) are a schematic diagram of a graphical user interface on a display of a mobile phone according to an embodiment of this application.

For example, referring to FIG. 13(a), the mobile phone 100 displays text information "Please tap a target object in the image". It is assumed that the user taps a swan in a preview image 1301, and the mobile phone 100 may display identification information 1302 "Selected: Swan". In this case, the user may continue to tap another object in the preview interface 1301. It is assumed that the user continues to tap a fish, and the mobile phone 100 may add "fish" to the identification information 1302. Certainly, after the user selects a plurality of target objects, if the user wants to delete one target object, the user may tap (tap or double-tap) the target object again, and identification information of the target object may be deleted in the identification information 1302. When the mobile phone 100 taps an OK control 1303, the mobile phone 100 determines that the swan and the fish in the identification information 1302 are target objects.

Figure 13B:
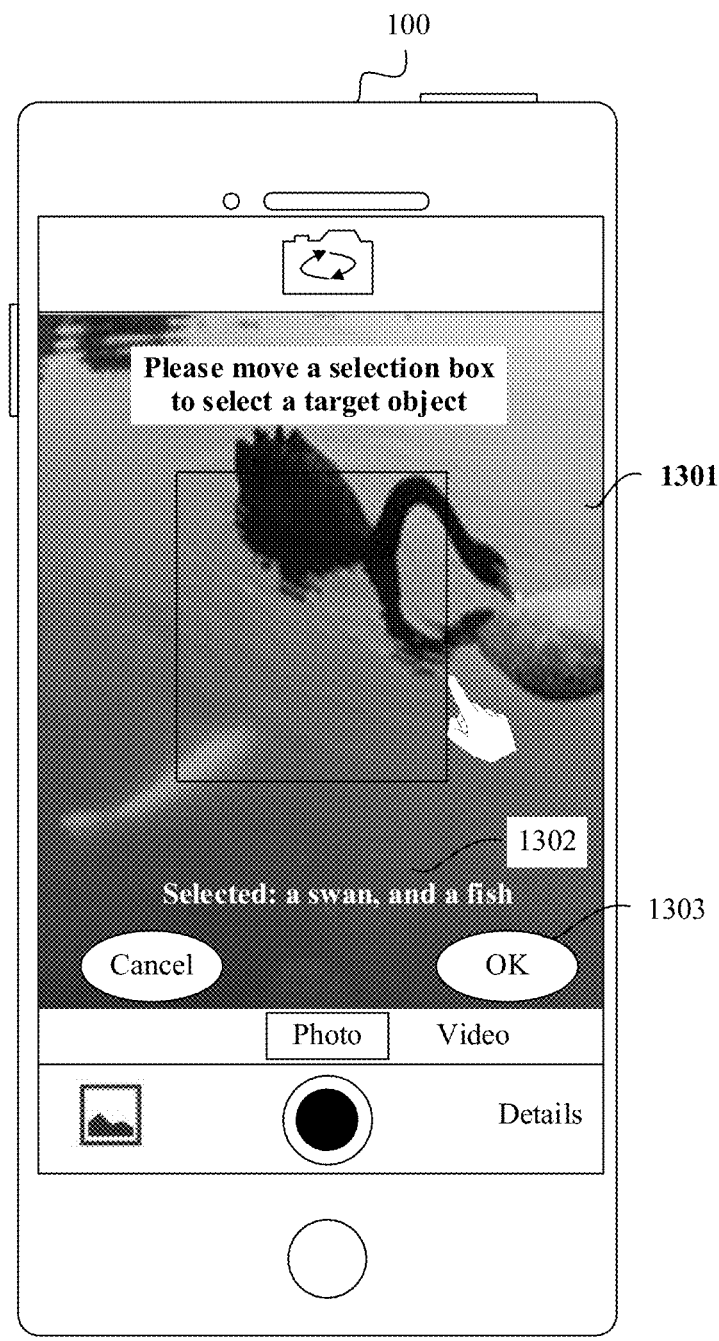

For another example, referring to FIG. 13(b), the mobile phone 100 displays a selection box and prompt information "Please move a selection box to select a target object". The mobile phone 100 determines all objects included in the selection box as the target objects. Assuming that the selection box includes two objects: a swan and a fish, identification information 1302 displayed by the mobile phone 100 includes "swan" and "fish". When the selection box is enlarged, a quantity of objects included in the selection box may increase, and the objects included in the identification information 1302 increase. Certainly, after selecting a plurality of target objects, if the user wants to delete one target object, the user may reduce the selection box. Identification information of the object removed from the selection box may be deleted from the identification information 1302. When detecting an operation of triggering an OK control 1303, the mobile phone 100 determines that an object included in the identification information 1302 is the target object.

Figure 13C:
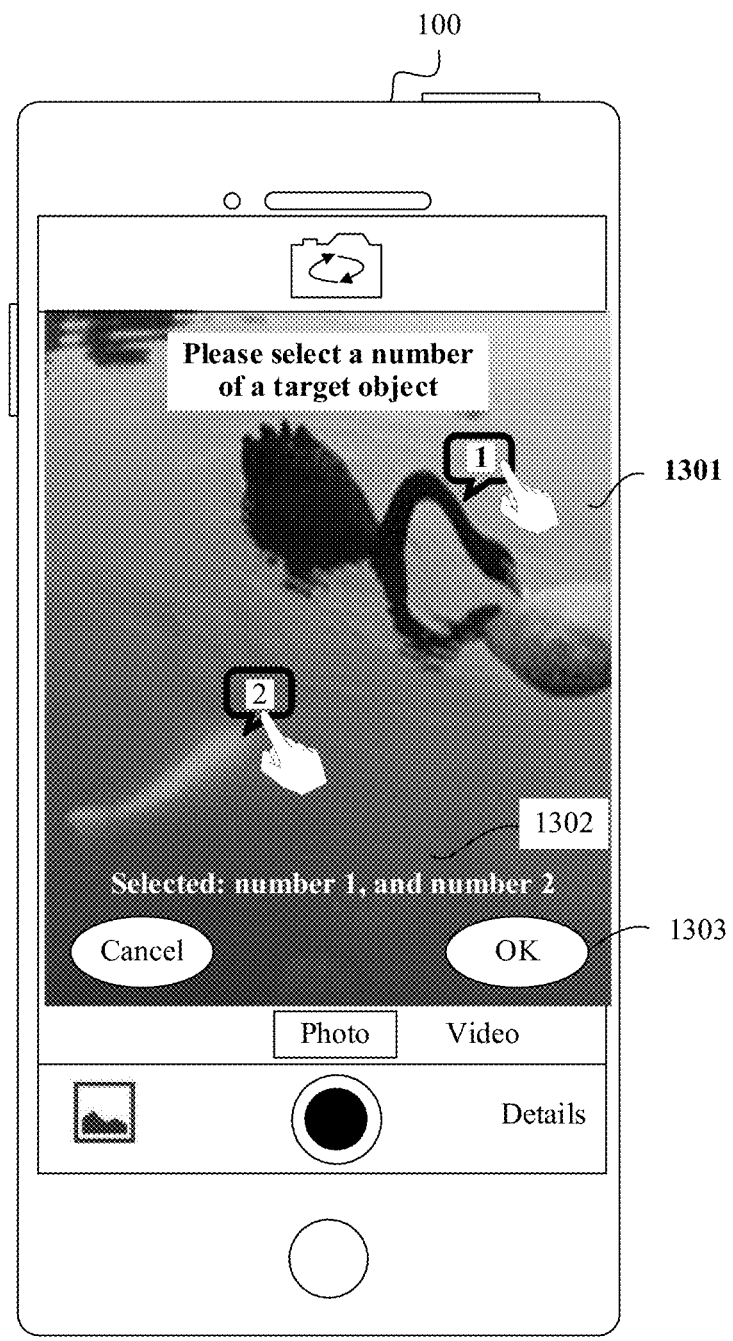

For another example, referring to FIG. 13(*c*), when the mobile phone 100 detects that a user selects an object whose number is 1, identification information 1302 displayed on the mobile phone 100 includes the number 1. When the mobile phone 100 continues to select an object whose number is 2, the mobile phone 100 adds the number 2 to the identification information 1302. Certainly, after the user selects a plurality of target objects, if the user wants to delete one target object, the user may tap (tap or double tap) the number of the target object again, and the number may be deleted in the identification information 1302. When detecting an operation of triggering an OK control 1303, the mobile phone 100 determines that an object included in the identification information 1302 is the target object. In this example, the mobile phone 100 may identify each object in a preview image 1301 in advance, and does not set a number for each object, to facilitate selection of the user.

In some other embodiments, the target object may be identified by the mobile phone 100 according to a preset policy. For example, object types such as "person", "animal", and "building" are preset in the mobile phone 100. If the mobile phone 100 identifies that one or more objects in a preview image belong to the preset object types, the mobile phone 100 determines that the one or more objects are the target objects. The preset object types in the mobile phone 100 may be set before the mobile phone 100 is delivered from a factory, or may be customized by a user.

It should be understood that the preview image may include a comparatively large quantity of object types. Therefore, the mobile phone 100 may set a priority order of a plurality of object types. For example, the priority of person is higher than that of animal, and the animal is prior to a building. For example, if a preview image includes a person, an animal, and a building, an object (for example, a person) with the highest priority is the target object, or two objects (for example, the person and the animal) with the highest priority are the target objects. For another example, if a preview image does not include a person, but includes an animal and another object, the animal which has the highest priority included in a raw image is the target object.

Certainly, the mobile phone 100 may select the target object in another manner. For example, an object in the middle in a preview image is determined as the target object, a person in a preview image is considered as the target object by default, or an object that occupies the largest area in a preview image is considered as the target object.

After the mobile phone 100 determines the target object in the preview image, if detecting an operation that a user triggers a shooting button, after differential compression is performed, the mobile phone 100 shoots an image used for sharing. The image may be used for sharing on a social media platform (the social media platform does not need to compress the image). It should be understood that there are two differential compression manners. In a first manner, a first compression coding algorithm is performed on image data of the target object in the preview image, and a second compression coding algorithm is performed on image data of a non-target object in the preview image, to obtain an image. It should be understood that, the first compression coding algorithm is different from the second compression coding algorithm. A definition of an image obtained by applying the first compression coding algorithm is greater than a definition of an image obtained by applying the second compression coding algorithm. In a second manner, a normal raw image is first obtained, and after the differential compression is performed, a compressed image is obtained.

The following describes the second manner. For example, referring to FIG. 9, in a process in which the mobile phone 100 shoots an image used for sharing, the mobile phone 100 may first obtain the raw image, and then obtain a compressed image according to a procedure shown in FIG. 9.

Figure 14:
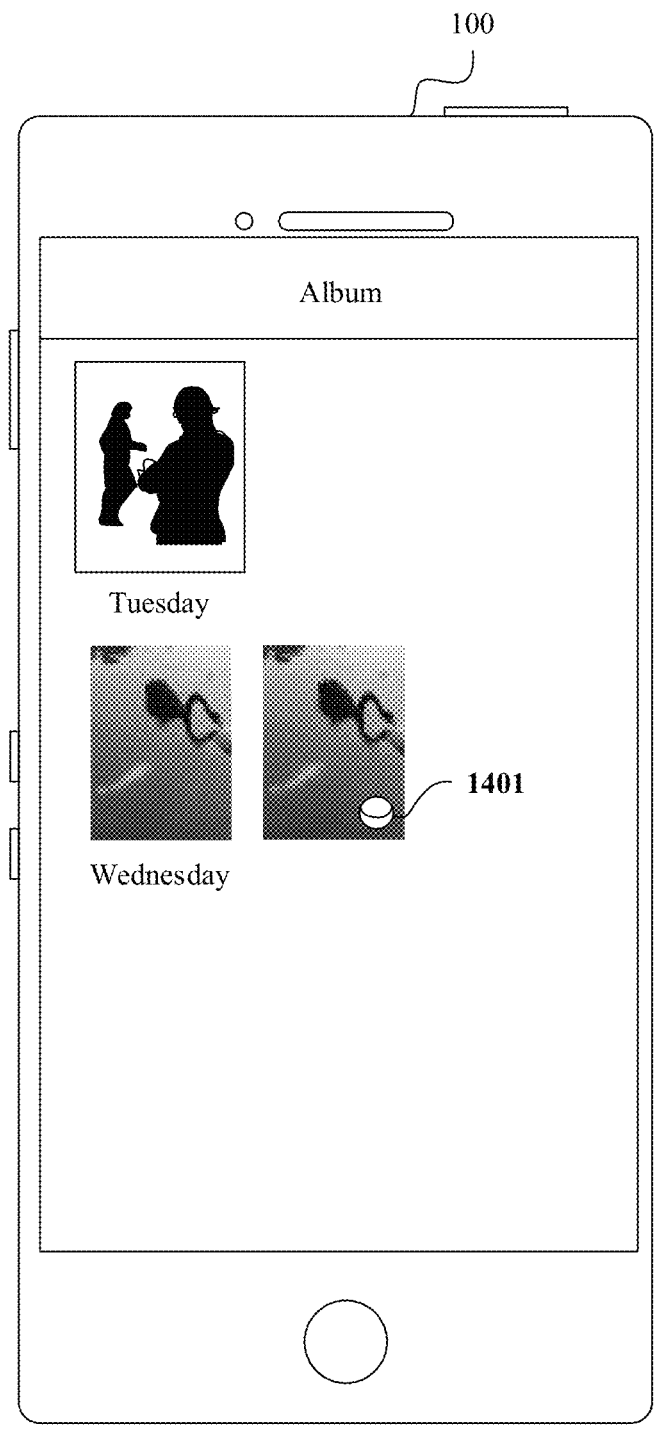
FIG. 14 is a schematic diagram of a graphical user interface on a display of a mobile phone according to an embodiment of this application.
Figure 15A:
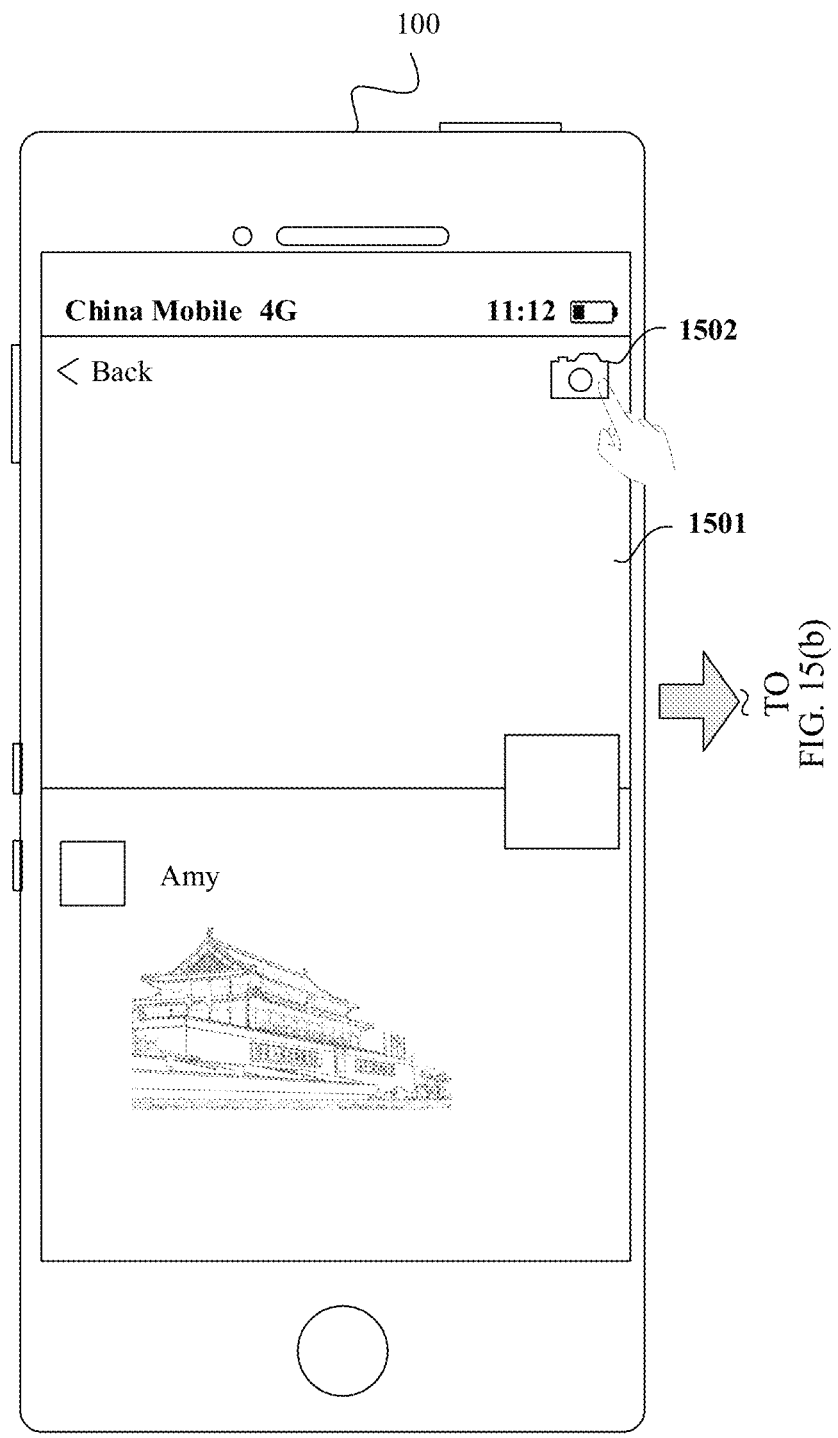
FIG. 15(a) to FIG. 15(f) are a schematic diagram of a graphical user interface on a display of a mobile phone according to an embodiment of this application.
Figure 15B:
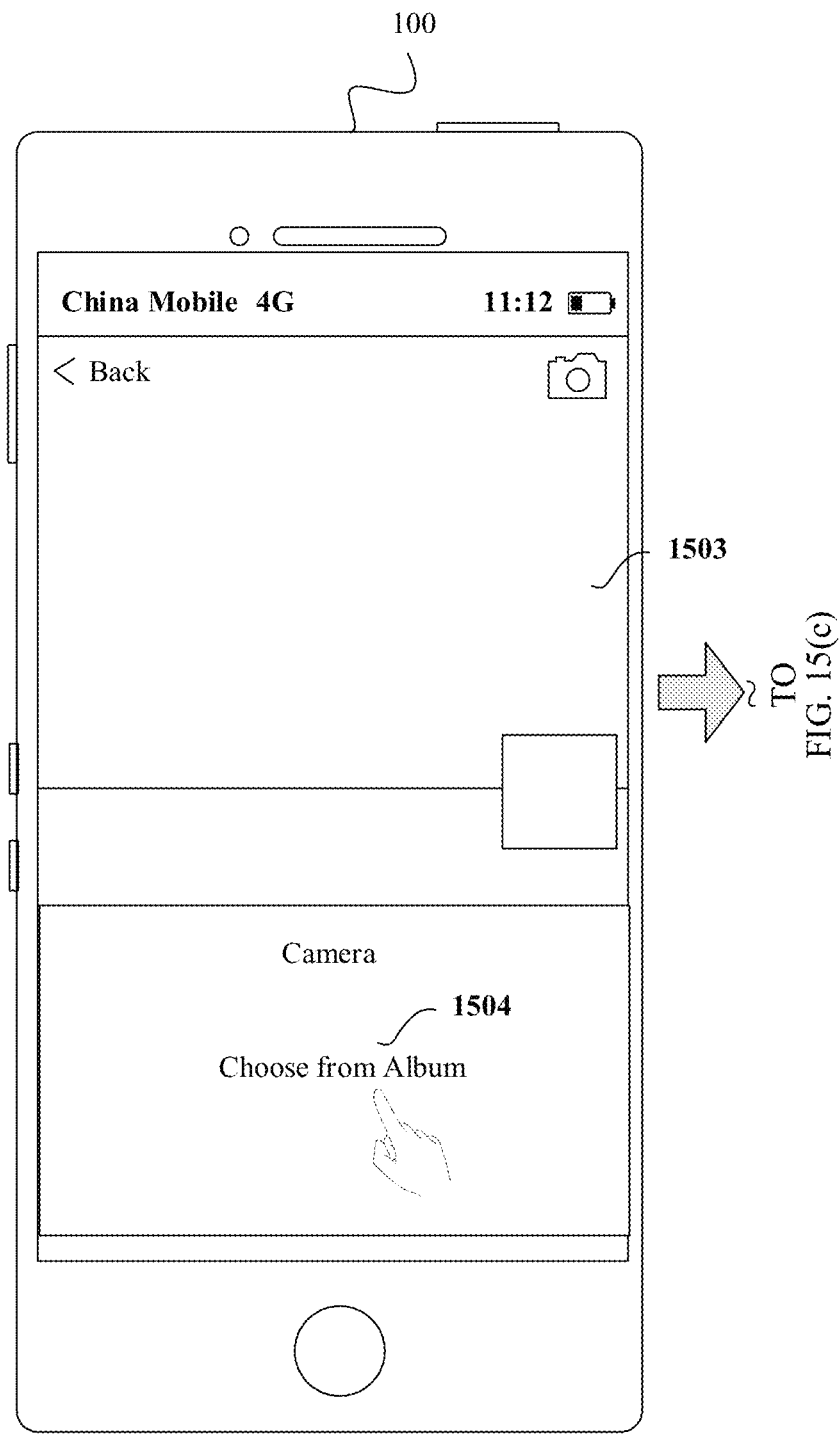
Figure 15C:
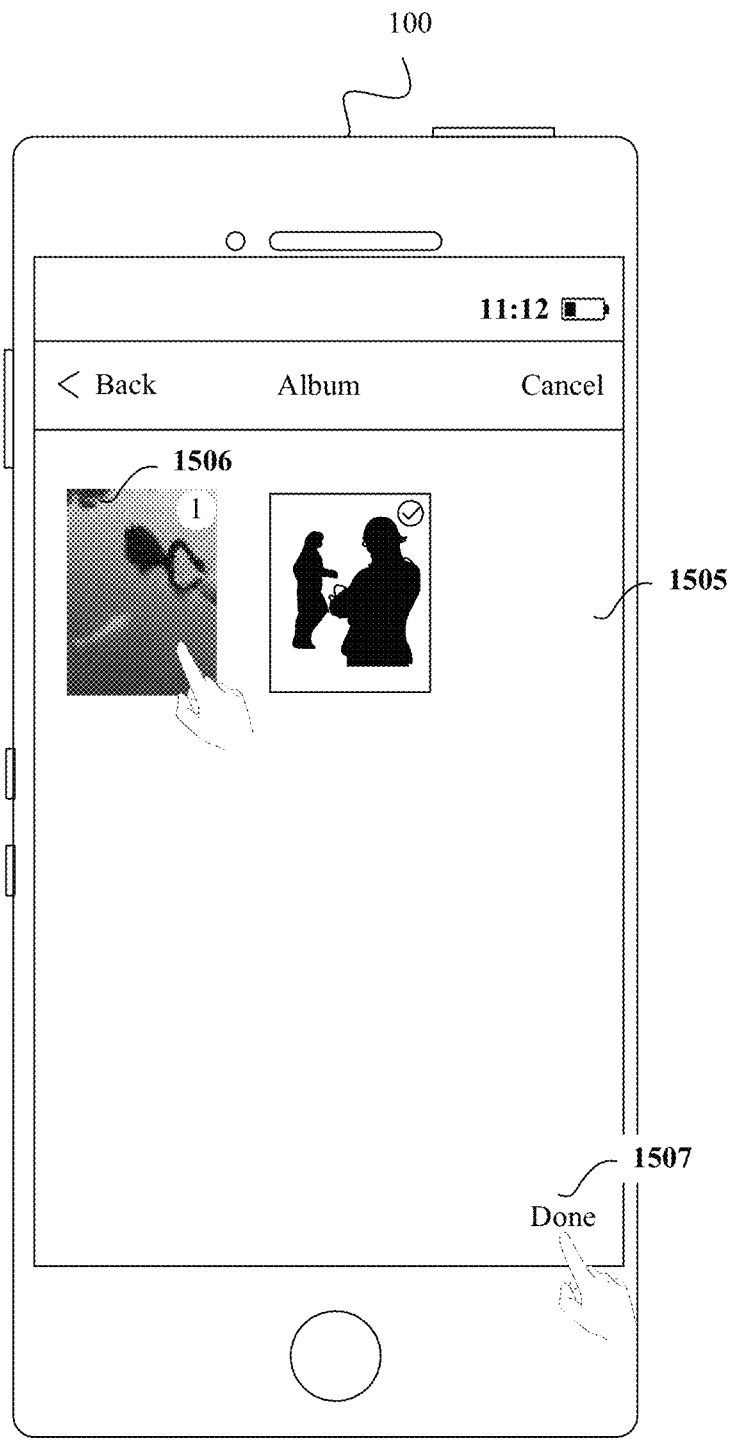
Figure 15D:
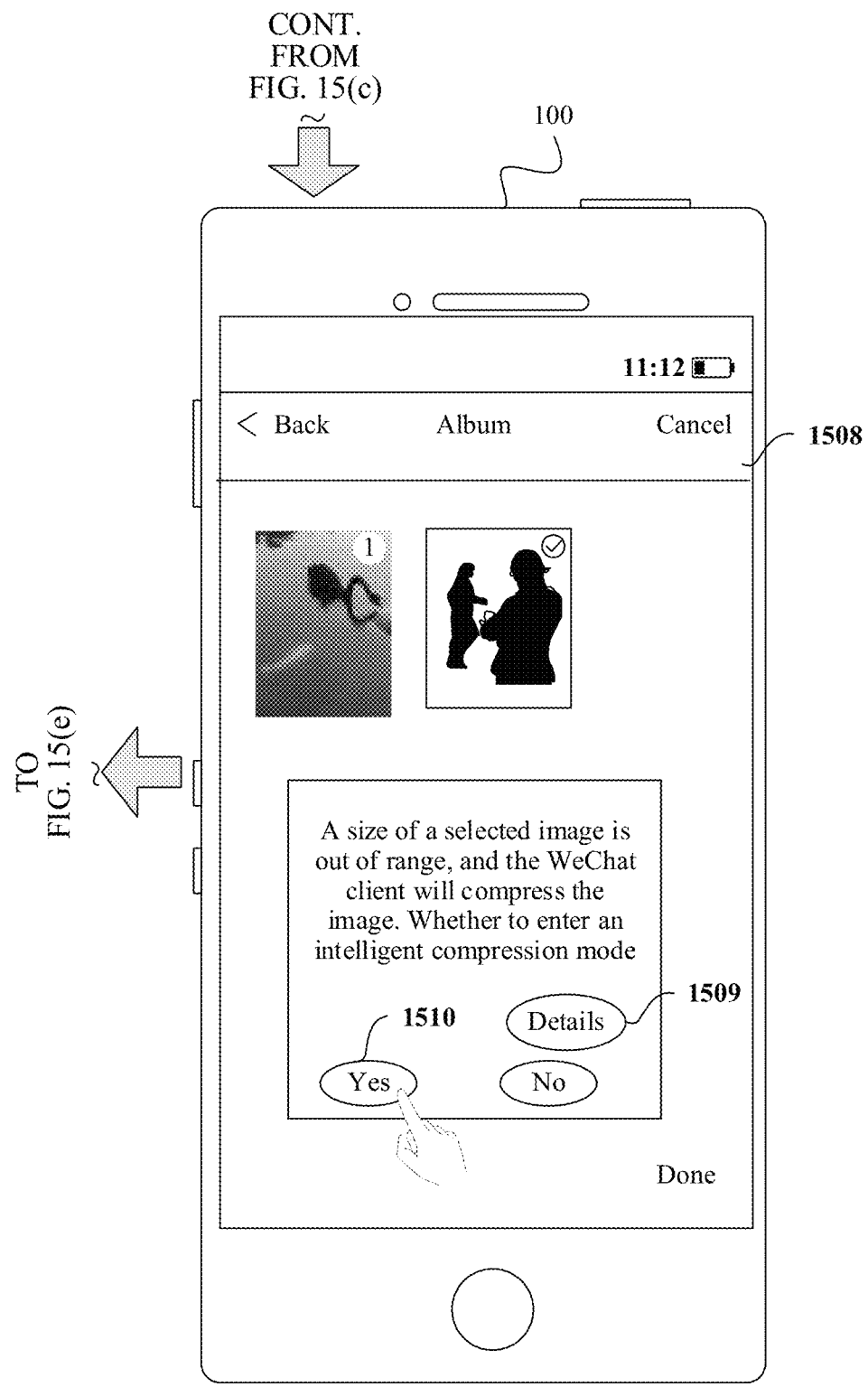
Figure 15E:
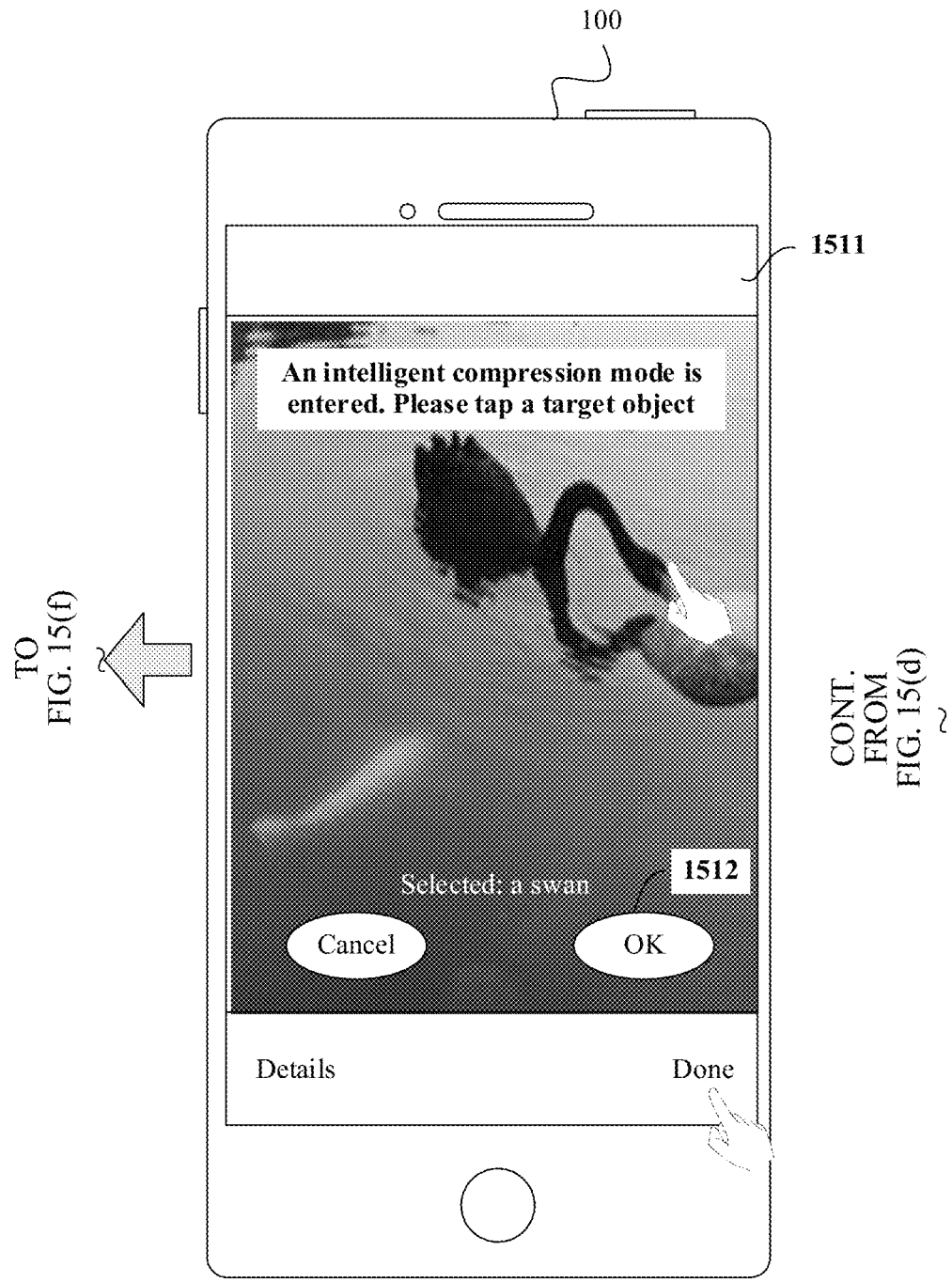
Figure 15F:
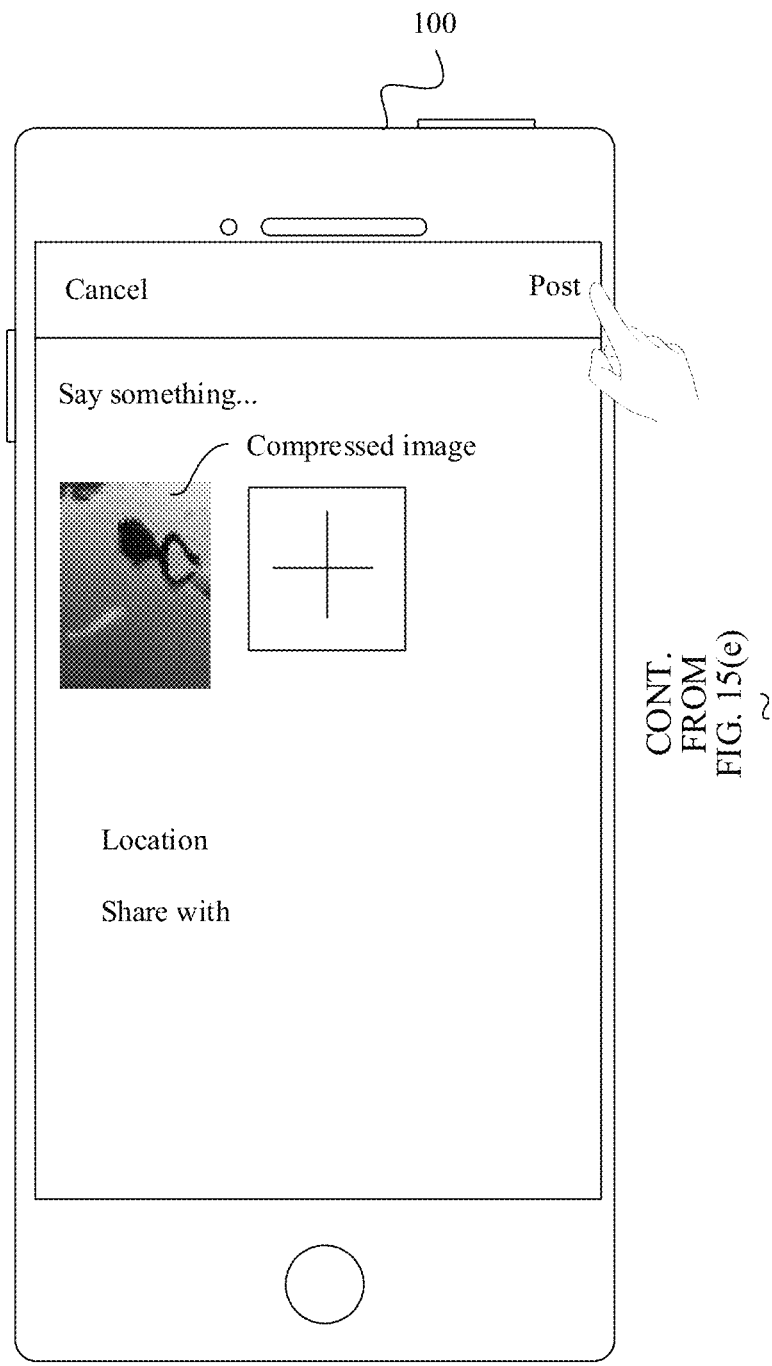

Certainly, the mobile phone 100 may shoot two images. One image is an uncompressed image, and the other image is a compressed image. Referring to FIG. 14, the mobile phone 100 stores two images. An icon 1401 is disposed on one image, and the icon 1404 is used to indicate that the image is a compressed image. It should be understood that, assuming that the images are shot on Wednesday, the storage time of the two images are the same.

The foregoing embodiment describes a process in which the mobile phone 100 shoots and obtains the compressed image in the scenario 2 (namely, a camera application scenario). The following describes how the mobile phone 100 uploads an image after intelligent compression to a social media platform in a scenario 3 (namely, a social media platform).

In some embodiments, referring to FIG. 15(*a*), the mobile phone 100 displays an interface 1501 of WeChat Moments, and the interface 1501 includes a camera control 1502. When detecting an operation for triggering the camera control 1502, the mobile phone 100 displays an interface 1503 shown in FIG. 15(*b*). When the mobile phone 100 detects that a user triggers a "choose from album" control 1504 in the interface 1503, the mobile phone 100 displays an interface 1505 shown in FIG. 15(*c*). The interface 1504 includes a plurality of images in the album. It is assumed that the mobile phone 100 selects an image 1506. When the mobile phone 100 detects an operation for triggering a done control 1507, the mobile phone 100 displays an interface 1508 shown in FIG. 15(*d*), and prompt information "A size of a selected image is out of range, and the WeChat client compresses the image after the image is uploaded. Whether to enter an intelligent compression mode" in the interface 1508. When detecting an operation of triggering a details control 1509, the mobile phone 100 may display related information of the intelligent compression mode (for example, the interface shown in FIG. 12(*b*)). When the mobile phone 100 detects an operation of triggering a "yes" control 1510, the mobile phone 100 displays an interface 1511 shown in FIG. 15(*f*). The mobile phone 100 detects, in the interface 1511, indication used to select a target object. When detecting an operation of triggering an OK control 1512, the mobile phone 100 displays an interface shown in FIG. 15(*f*).

In some other embodiments, referring to FIG. 15(*b*), if the mobile phone 100 detects an operation that a user triggers a "camera" control, the mobile phone 100 starts a camera and displays a viewfinder interface. For example, the viewfinder interface is an interface shown in FIG. 13(a), FIG. 13(b), or FIG. 13(c). FIG. 13(a) is used as an example. When the mobile phone 100 detects an operation that a user triggers a photo button in the interface 1301, the mobile phone 100 displays the interface shown in FIG. 15(f).

Figure 16A:
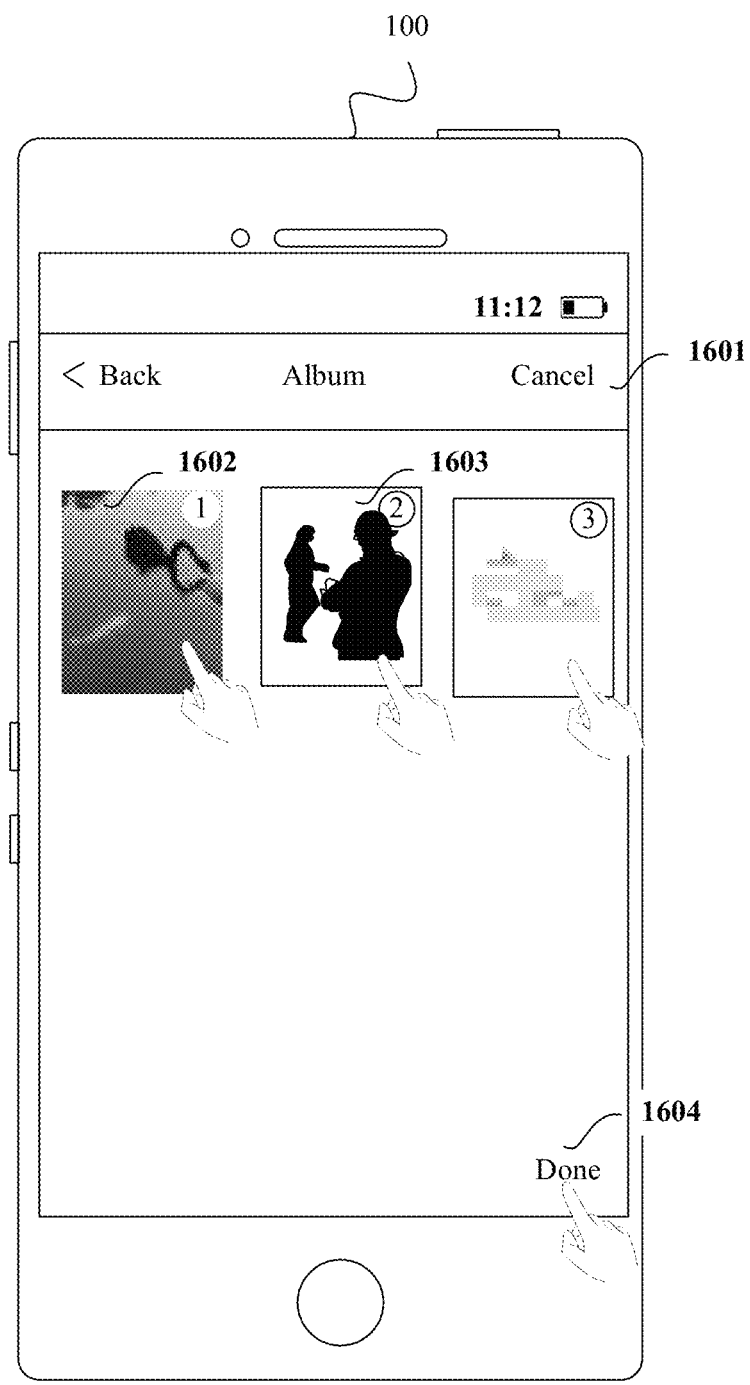
FIG. 16(a) to FIG. 16(e) are a schematic diagram of a graphical user interface on a display of a mobile phone according to an embodiment of this application.
Figure 16B:
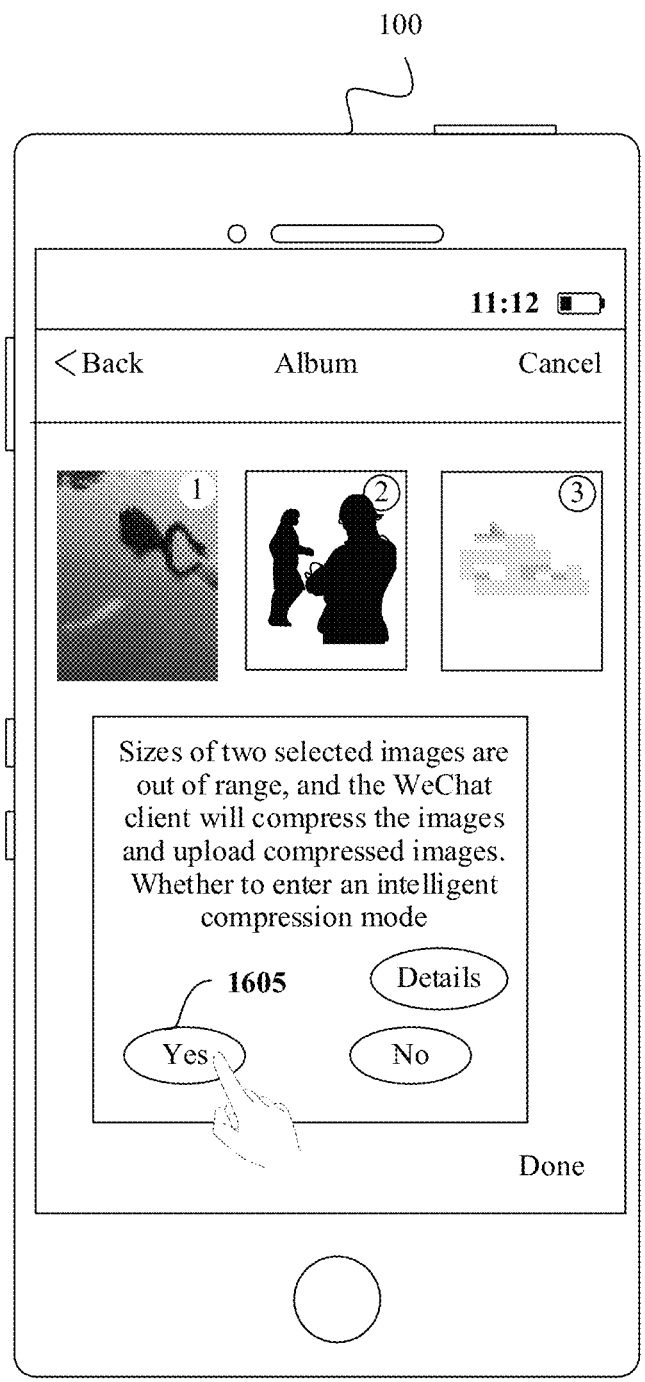

In some other embodiments, referring to FIG. 16(a), the mobile phone 100 displays an interface 1601 (for a process of opening WeChat Moments and displaying the interface 1601, refer to FIG. 15(a) to FIG. 15(f), and details are not described herein again). The interface 1601 includes a plurality of images. After the mobile phone 100 detects an operation for selecting the plurality of images (in the figure, three images are selected as an example), the mobile phone 100 displays an interface shown in FIG. 16(b), and prompt information is displayed in the interface. The prompt information is used to inform a user that the sizes of two of the three images selected by the user are out of range. When detecting an operation of triggering a "yes" control 1605, the mobile phone 100 displays an interface shown in FIG. 16(c). In other words, the mobile phone 100 displays a first image in the two images. The user may select a target object on the first image. When detecting an operation for triggering an OK control 1606, the mobile phone 100 switches to a next image. Referring to FIG. 16(d), the user may continue to select a target object in the next image. When detecting an operation that the user triggers an OK control 1607, the mobile phone 100 displays an interface shown in FIG. 16(e).

In the embodiment shown in FIG. 16(a) to FIG. 16(e), switching between (c) and (d) is as follows: After the mobile phone 100 selects the target object from the first image, the mobile phone 100 automatically switches to another image. In some other embodiments, the mobile phone 100 may alternatively switch the image in another manner. For example, when detecting a left-slide operation of the user in the interface shown in FIG. 16(c), the mobile phone 100 displays the interface shown in FIG. 16(d). In this manner, although the mobile phone 100 has not selected a target object on a first image, the mobile phone 100 may also manually switch to another image, and select a target object on the other image.

Figure 16C:
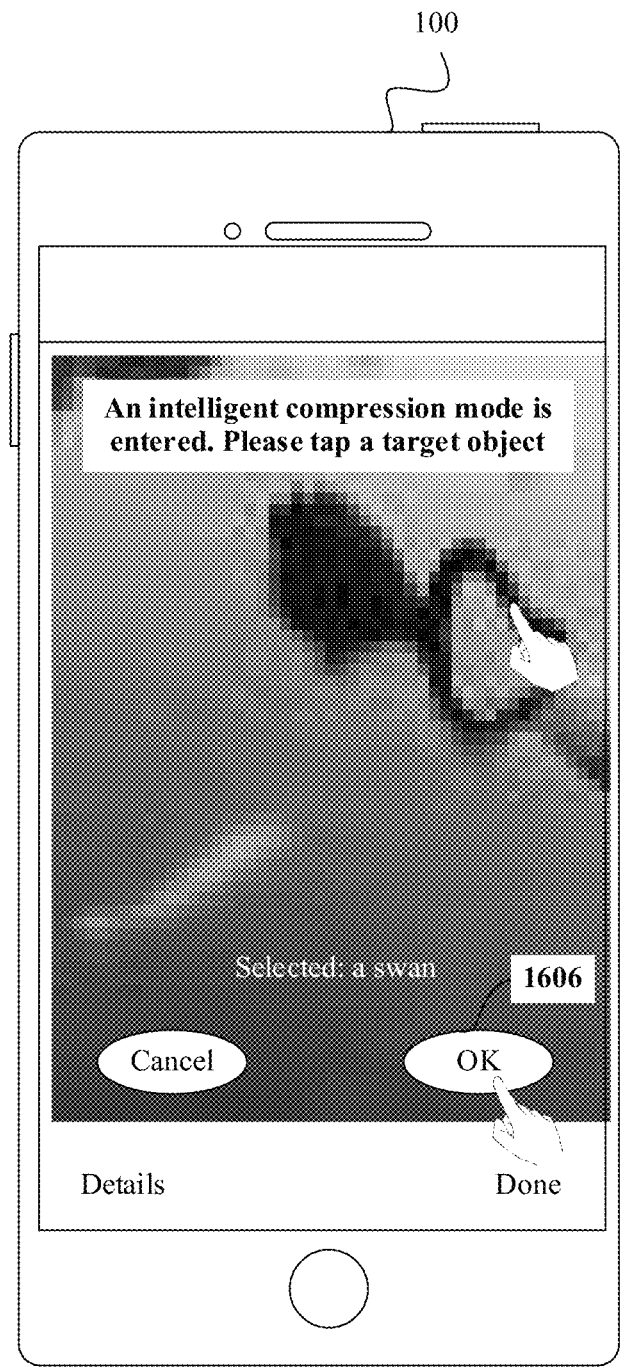
Figure 16D:
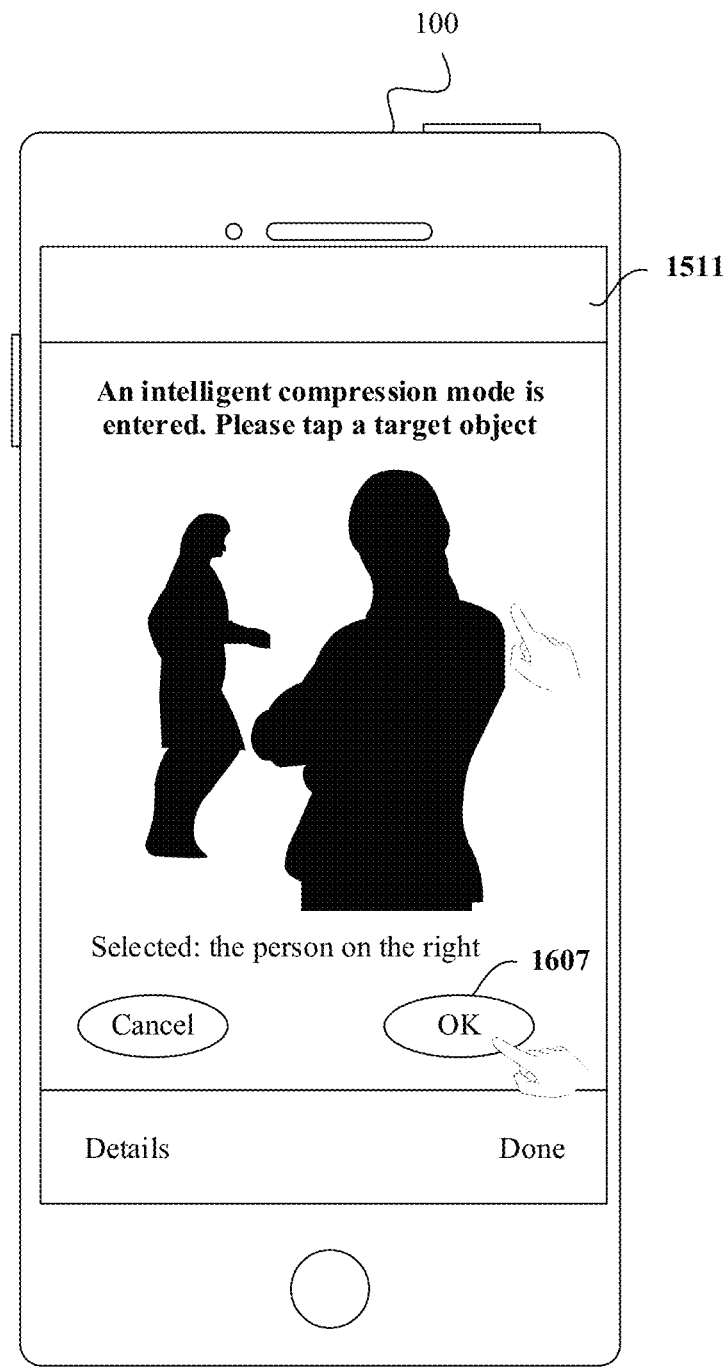
Figure 16E:
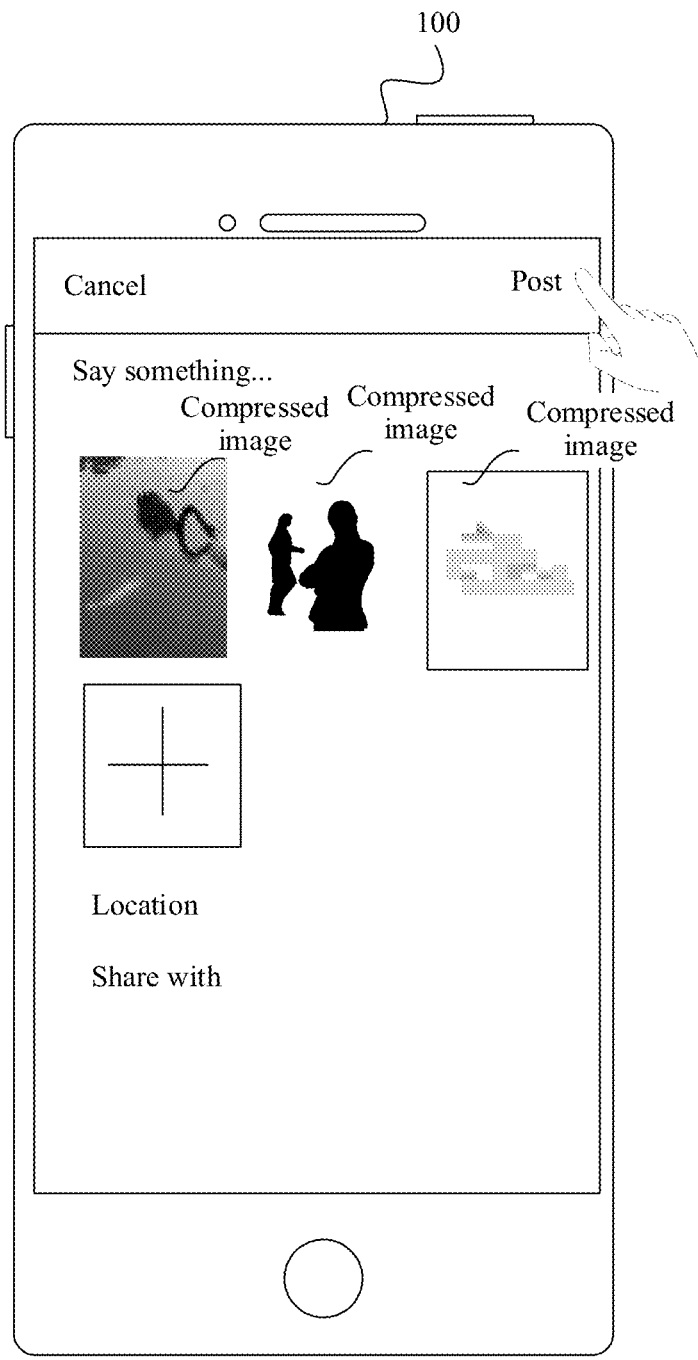

It should be noted that, in FIG. 16(c), the mobile phone 100 displays the prompt information to prompt the user to tap the target object. Actually, there may also be another manner of specifying a target object, for example, the manners of specifying the target object shown in FIG. 5(a) and FIG. 5(b), FIG. 6(a) and FIG. 6(b), and FIG. 7(a) to FIG. 7(d). In other words, the implementations may be used in any combination.

Figure 17A:
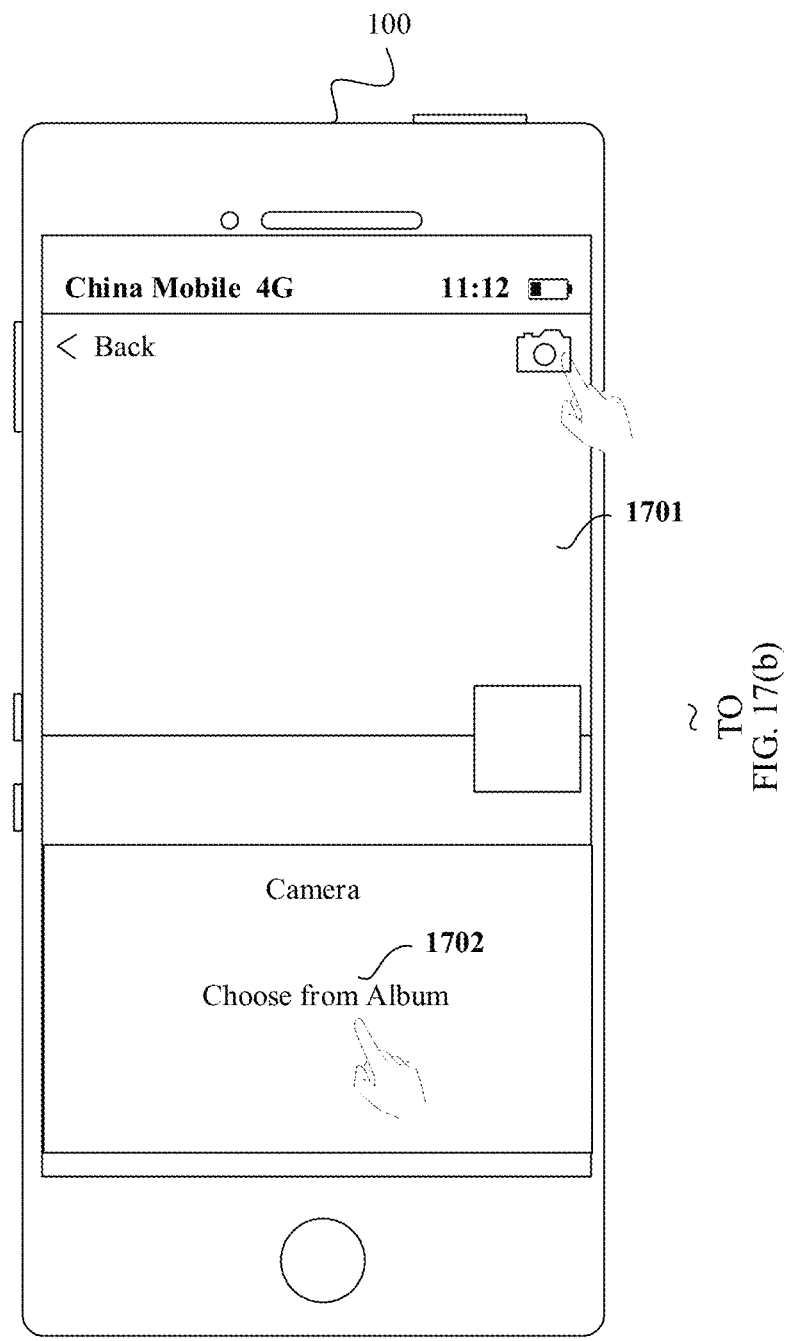
FIG. 17(a) to FIG. 17(e) are a schematic diagram of a graphical user interface on a display of a mobile phone according to an embodiment of this application.

In some other embodiments, the mobile phone 100 may automatically select a target object in the image, and perform differential compression on the target object and a background in the image. For example, still referring to FIG. 17(a), after detecting that a user taps a "choose from album" control 1702, the mobile phone 100 may display an interface shown in FIG. 17(b). When the mobile phone 100 detects an operation that the user selects an image 1704, the mobile phone 100 may identify a target object in the image 1704, and then perform differential compression on the target object and a background. Therefore, an image in FIG. 17(c) is a compressed image. Certainly, after detecting the operation that the user selects the image 1704, the mobile phone 100 may determine whether a size of the image 1704 exceeds a preset standard. If the size of the image 1704 exceeds the preset standard, the mobile phone 100 identifies a target object, and performs differential compression. If the size of the image 1704 does not exceed the preset standard, the mobile phone 100 does not need to perform compression.

Therefore, in this embodiment, when detecting an instruction for uploading a picture on a social platform, the mobile phone 100 automatically identifies the target object, performs differential compression on the target object and a background, and then uploads a compressed image to the social platform. There is no need for the user to select whether to enter an intelligent compression mode, and there is no need for the user to select the target object. The mobile phone 100 performs an intelligent compression process by default.

Figure 17B:
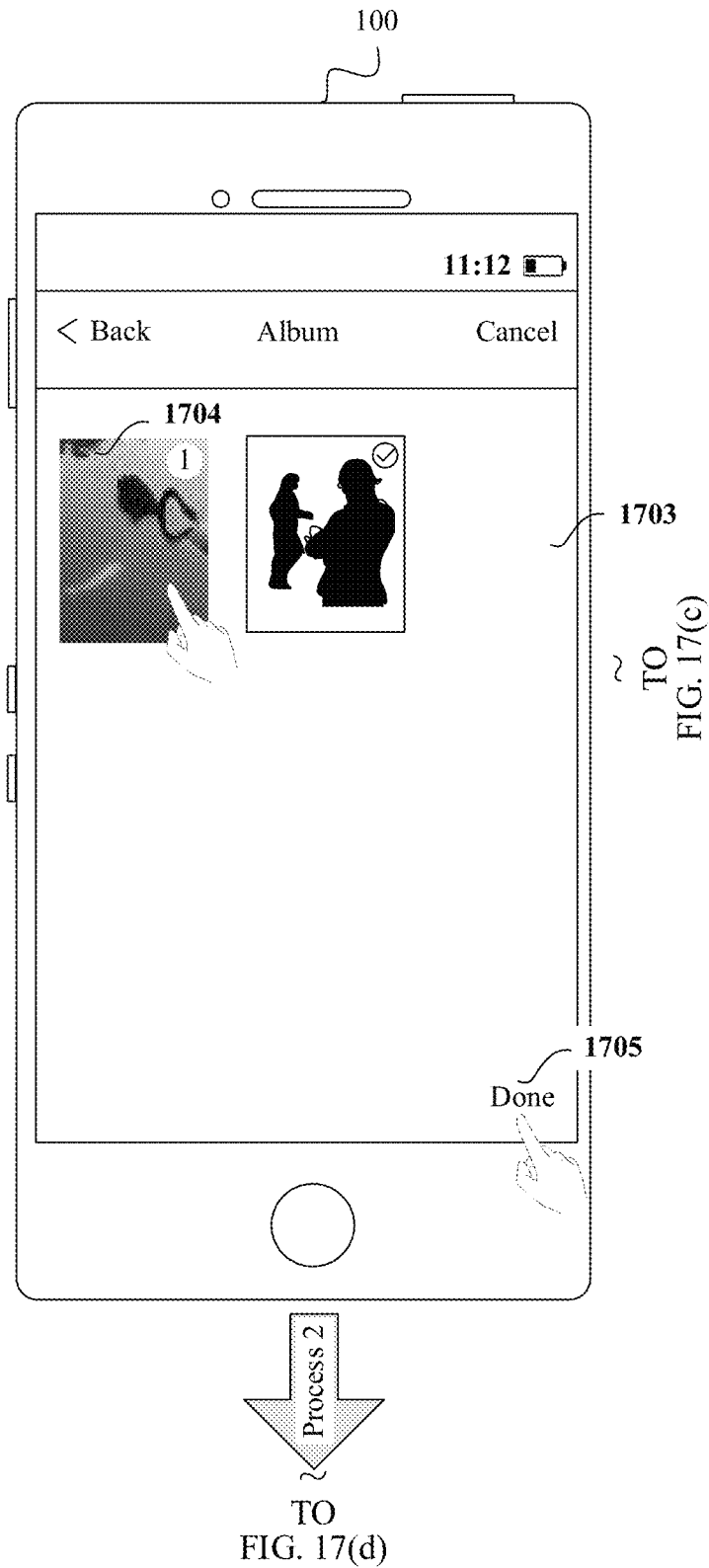
Figure 17C:
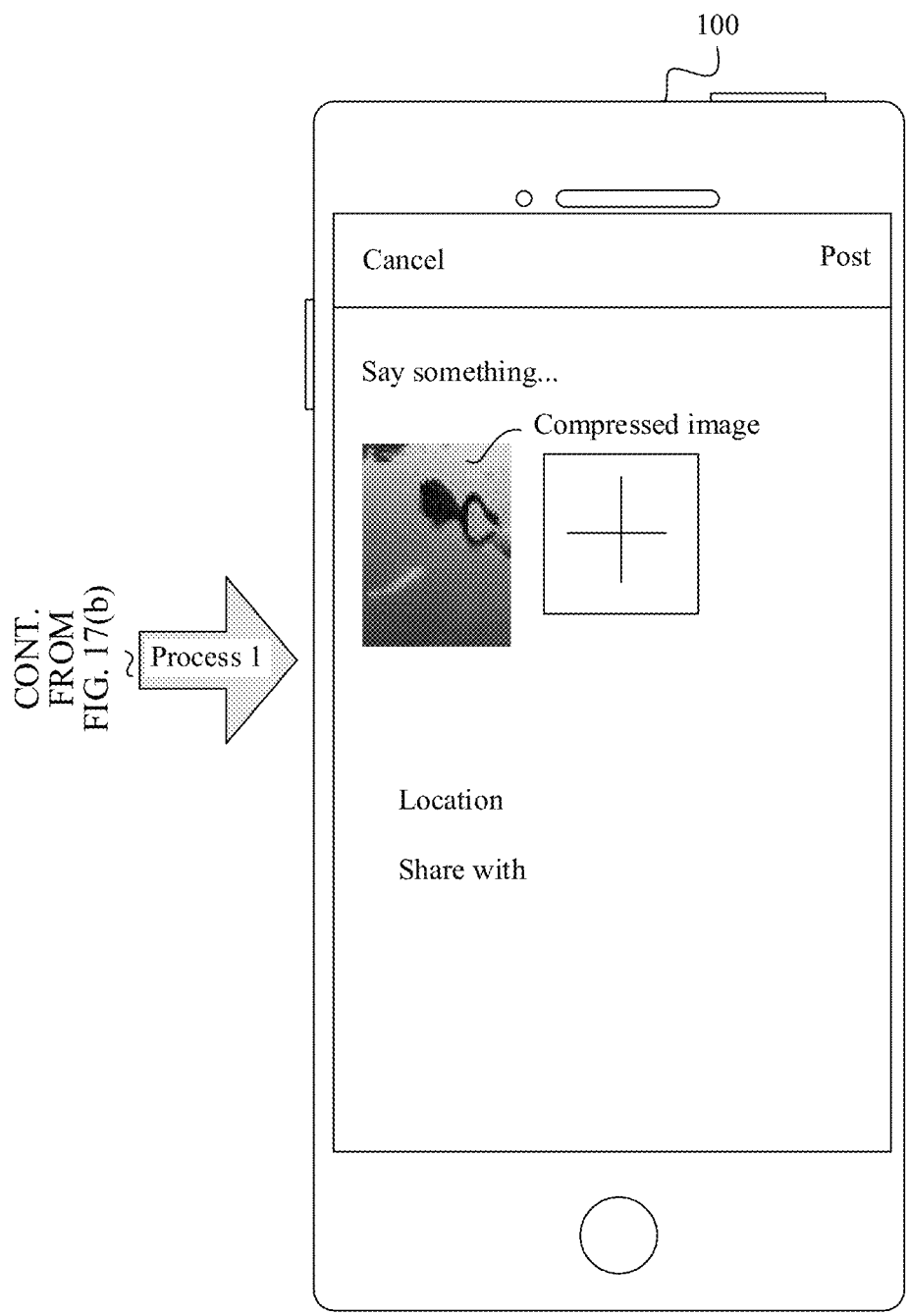
Figure 17D:
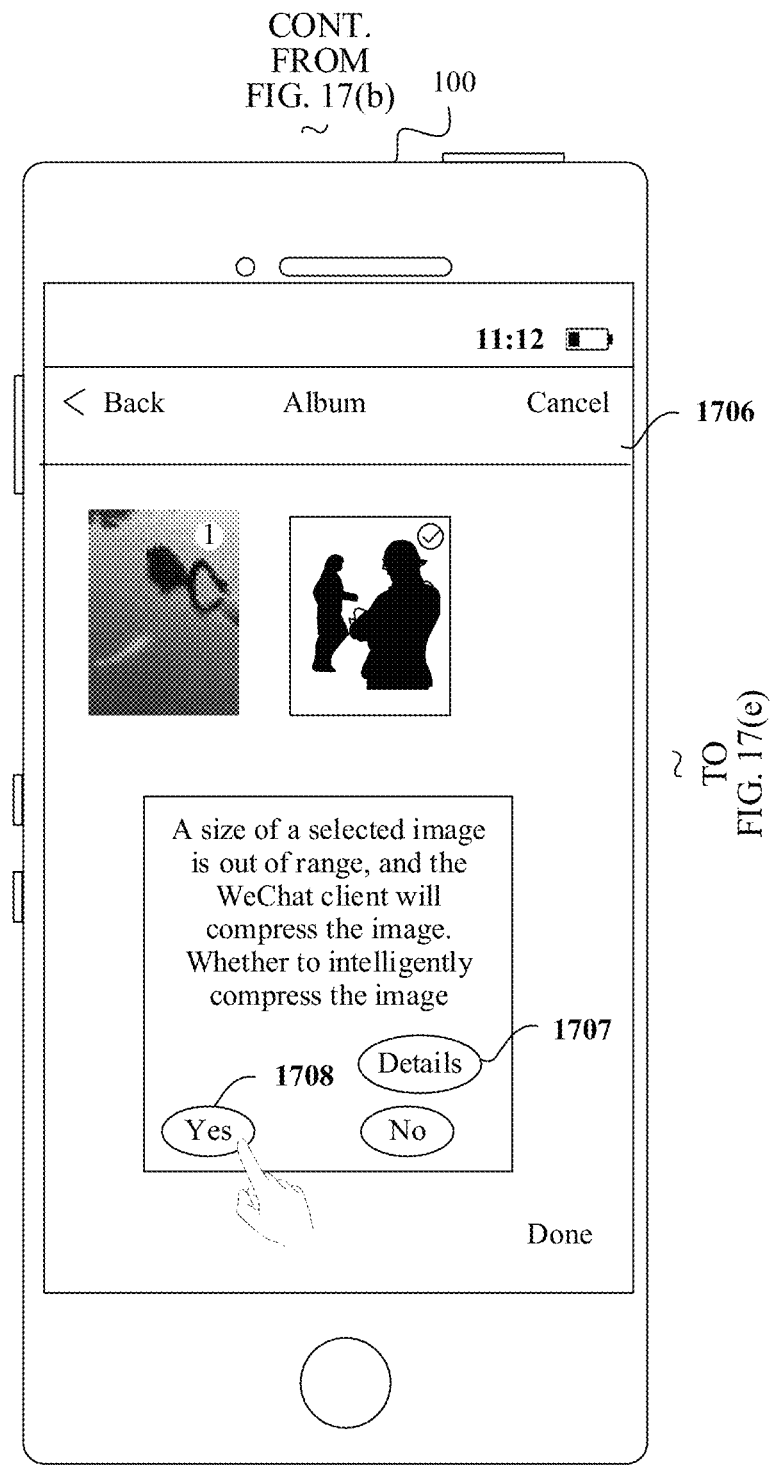
Figure 17E:
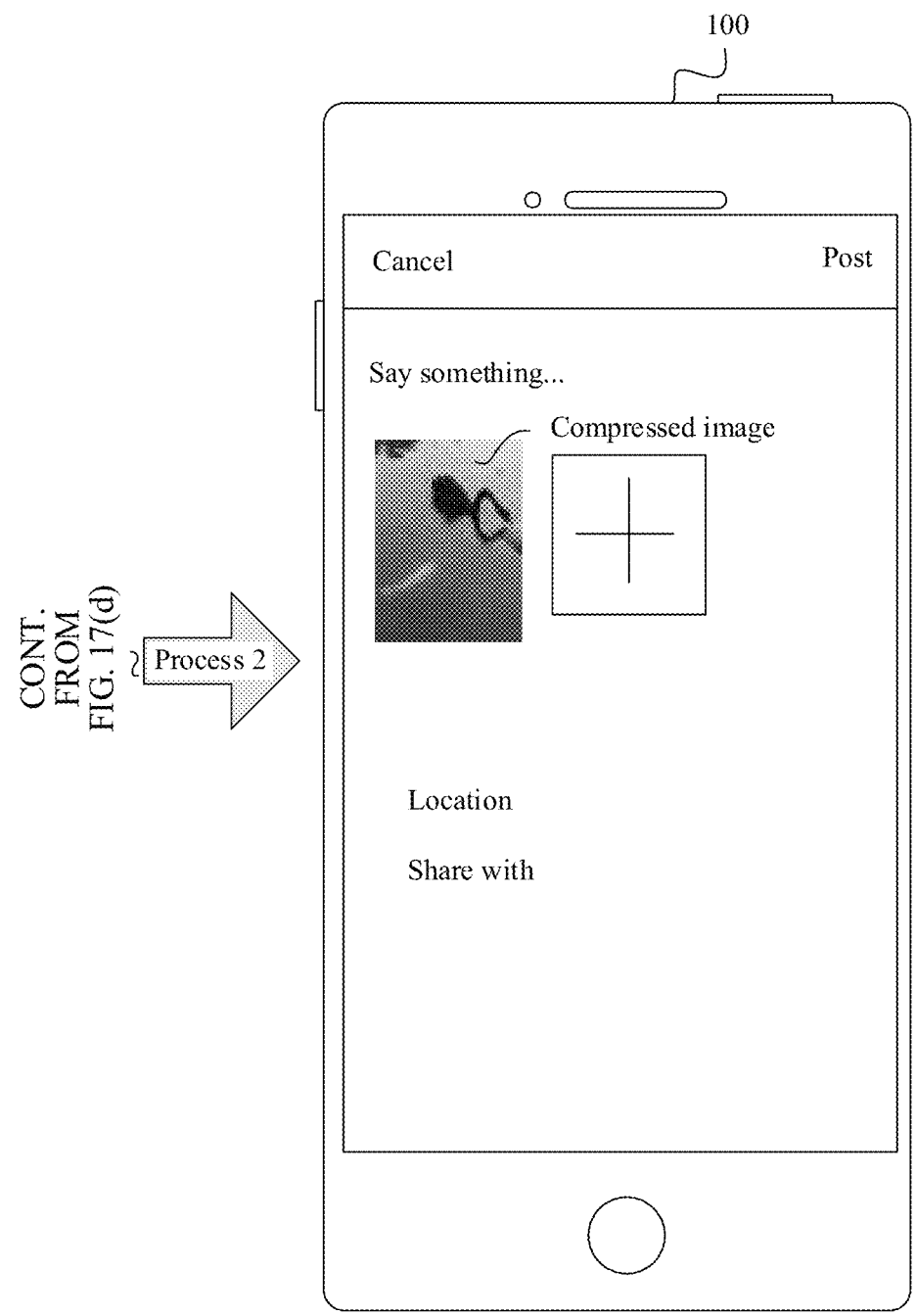

In some still other embodiments, still referring to FIG. 17(b), when detecting an operation that a user selects an image 1704, the mobile phone 100 displays an interface shown in FIG. 17(d). When detecting an operation that the user triggers a "yes" control 1708, the mobile phone 100 automatically identifies a target object, and then performs differential compression on the target object and the background. Therefore, an image shown in FIG. 17(e) is a compressed image.

The target object mentioned in the embodiment may be an area in which the target object is located, for example, an area occupied by the target object, namely, an area enclosed by an edge contour of the target object. Certainly, the area in which the target object is located may also include an area enclosed by a closed boundary of the target object, for example, the area enclosed by the closed boundary is greater than the area occupied by the target object. The closed boundary may be a rectangle, a circle, a square, an ellipse, an irregular pattern, or the like. Therefore, the differential compression performed by the mobile phone 100 on the target object and another object (an object other than the target object) may be differential compression performed on the area in which the target object is located and another area. The other area is an area other than the area in which the target object is located.

In the embodiments shown in FIG. 15(a) to FIG. 15(f) and FIG. 16(a) to FIG. 16(e), WeChat Moments is used as an example. Actually, the image sharing method provided in the embodiments of this application may be further applied to other social media platforms, such as Facebook, Weibo, Zhihu, Qzone, and Twitter.

The implementations of this application may be randomly combined to achieve different technical effects.

Figure 18:
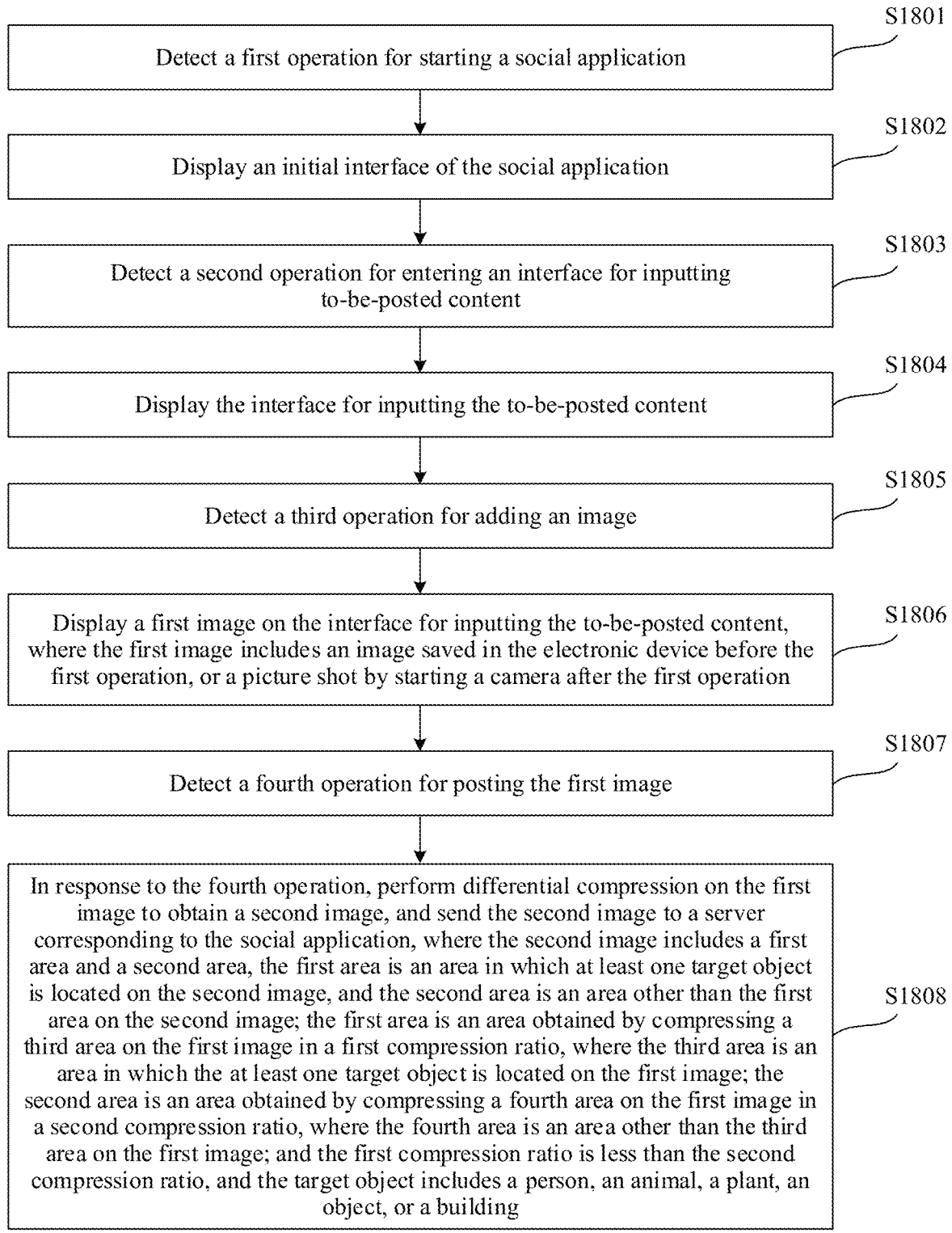
FIG. 18 is a schematic flowchart of an image sharing method according to an embodiment of this application.

With reference to the foregoing embodiments and related accompanying drawings, an embodiment of this application provides an image sharing method. The method may be implemented in an electronic device (for example, a mobile phone or a tablet computer) that includes a display and on which a social application is installed. For example, a structure of the electronic device may be shown in FIG. 1. As shown in FIG. 18, the method may include the following steps.

S1801: Detect a first operation for starting the social media application.

For example, if the social media application is a WeChat application, the first operation may be an operation that a user taps on a WeChat icon in FIG. 10(a).

S1802: Display an initial interface of the social application.

For example, if the social application is the WeChat application, the initial interface may be an interface displayed after the WeChat application is opened, for example, an address book interface or a chat interface of the WeChat application.

S1803: Detect a second operation for entering an interface for inputting a to-be-posted content.

For example, the second operation may include one or more operations. For example, the second operation may be an operation of tapping the icon 1502 in FIG. 15(*a*).

S1804: Display the interface for inputting the to-be-posted content.

For example, the interface for inputting the to-be-posted content may be the interface shown in FIG. 15(*b*).

S1805: Detect a third operation for adding an image.

For example, the third operation may be an operation of tapping a "choose from album" control 1504 in the interface shown in FIG. 15(*b*).

S1806: Display a first image on the interface for inputting the to-be-posted content, where the first image includes an image saved in the electronic device before the first operation, or an image shot by starting a camera after the first operation.

For example, the first image may be the first image in FIG. 15(*d*), and the image is an image that is selected by the user and that is to be added.

The first image may be an image locally stored in the electronic device (for example, a received image sent by another device, an image downloaded from the internet, or an image shot by using a photographing application). Alternatively, the first image may be an image shot by starting a camera when the electronic device runs a social platform. For example, referring to the interface shown in FIG. 17(*a*), when detecting an operation that a user triggers a "camera" control, the mobile phone 100 starts the camera to shoot the first image.

S1807: Detect a fourth operation for posting the first image.

For example, the fourth operation may be an operation of tapping a "post" control in the interface shown in FIG. 15(*f*).

S1808: In response to the fourth operation, perform differential compression on the first image to obtain a second image, and send the second image to a server corresponding to the social application, where the second image includes a first area and a second area, the first area is an area in which at least one target object is located on the second image, and the second area is an area other than the first area on the second image; the first area is an area obtained by compressing a third area on the first image in a first compression ratio, where the third area is an area in which the at least one target object is located on the first image; the second area is an area obtained by compressing a fourth area on the first image in a second compression ratio, where the fourth area is an area other than the third area on the first image; and the first compression ratio is less than the second compression ratio, and the target object includes a person, an animal, a plant, an object, or a building.

For example, in the embodiment shown in FIG. 18, when detecting an operation of posting the image, the electronic device performs the differential compression on the to-be-posted image, and then sends a differentially compressed image to the server corresponding to the social platform.

For example, FIG. 5(*a*) and FIG. 5(*b*) are used as an example. The third area in the step S1808 may be an area inside the selection box, and the third area is compressed in the first compression ratio. The fourth area may be an area outside the selection box, and the fourth area is compressed in the second compression ratio. Finally, an obtained compressed image includes two areas: a first area and a second area. The first area is an area obtained after the third area is compressed, and the second area is an area obtained after the fourth area is compressed.

Figure 19:
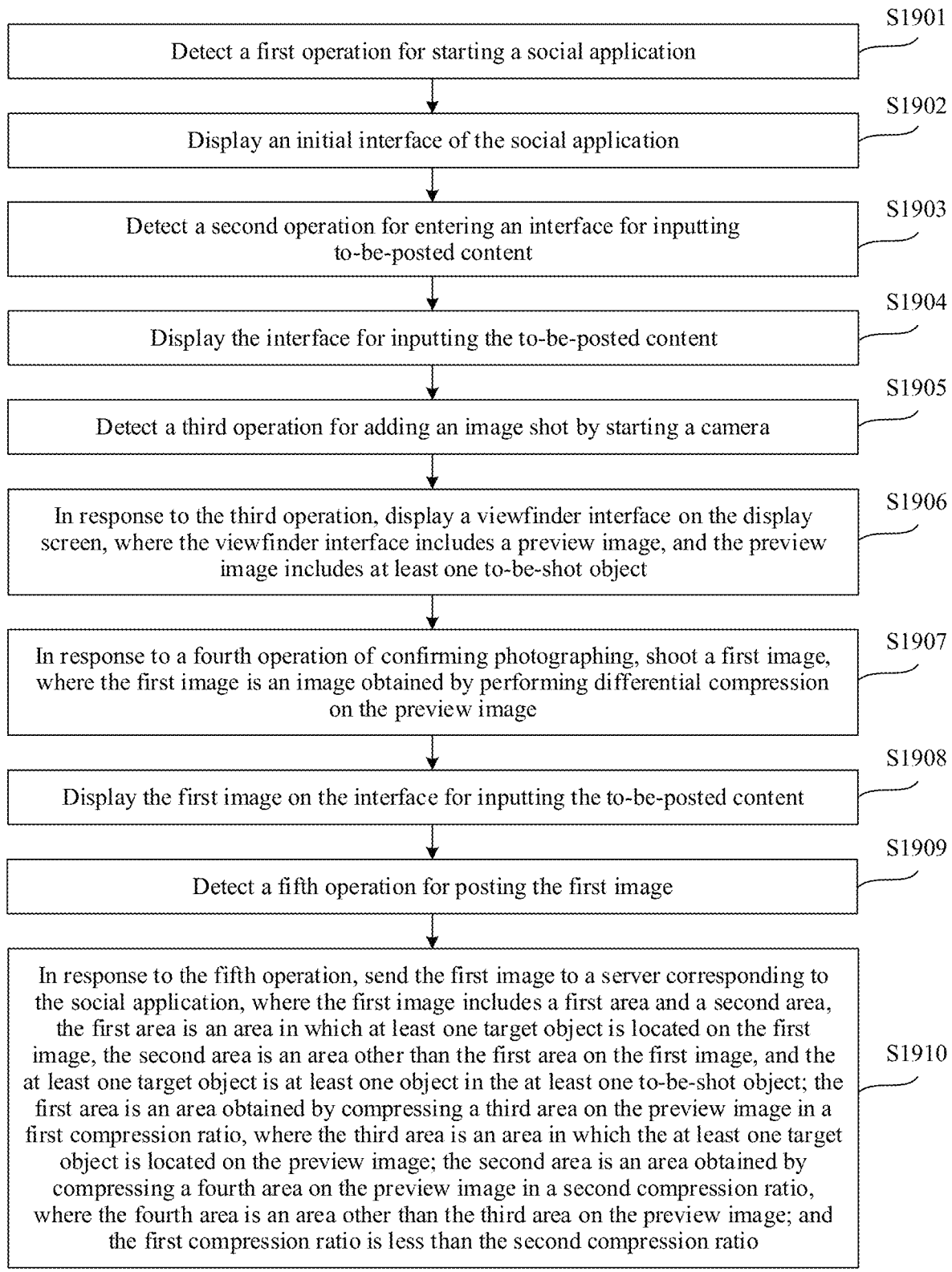
FIG. 19 is a schematic flowchart of another image sharing method according to an embodiment of this application.

With reference to the foregoing embodiments and related accompanying drawings, an embodiment of this application provides an image sharing method. The method may be implemented in an electronic device (for example, a mobile phone or a tablet computer) that includes a display, a camera, and on which a social application is installed. For example, a structure of the electronic device may be shown in FIG. 1. As shown in FIG. 19, the method may include the following steps.

S1901: Detect a first operation for starting the social media application.

For example, if the social media application is a WeChat application, the first operation may be an operation that a user taps a WeChat icon in FIG. 10(*a*).

S1902: Display an initial interface of the social media application.

For example, if the social media application is the WeChat application, the initial interface may be an interface displayed after the WeChat application is opened, for example, an address book interface or a chat interface of the WeChat application.

S1903: Detect a second operation for entering an interface for inputting a to-be-posted content.

For example, the second operation may include one or more operations. For example, the second operation may include an operation of tapping the icon 1502 in FIG. 15(*a*). Certainly, a process from the initial interface to the interface shown in FIG. 15(*a*) may further include another operation. Therefore, the second operation may be a combination of the other operation and an operation of tapping the icon 1502 in FIG. 15(*a*).

S1904: Display the interface for inputting the to-be-posted content.

For example, the interface for inputting the to-be-posted content may be the interface shown in FIG. 15(*b*).

S1905: Detect a third operation for adding a shot image by starting the camera.

For example, the third operation may be an operation of tapping a "camera" control in the interface shown in FIG. 15(*b*).

S1906: In response to the third operation, display a viewfinder interface on the display, where the viewfinder interface includes a preview image, and the preview image includes at least one object.

For example, the viewfinder interface may be an interface shown in FIG. 13(*a*), FIG. 13(*b*), or FIG. 13(*c*).

S1907: In response to a fourth operation of confirming photographing, shoot a first image, where the first image is an image obtained by performing differential compression on the preview image. It should be understood that, for details about the differential compression, refer to the foregoing two differential compression manners.

For example, the fourth operation may be the shooting control in the interface shown in FIG. 13(*a*).

S1908: Display the first image on the interface for inputting the to-be-posted content.

For example, the first image may be the first image in FIG. 15(*d*), and the image is an image that is selected by the user and that is to be posted.

S1909: Detect a fifth operation for posting the first image.

For example, the fourth operation may be an operation of tapping a "post" control in the interface shown in FIG. 15(*f*).

S1910: In response to the fifth operation, send the first image to a server corresponding to the social application, where the first image includes a first area and a second area, the first area is an area in which at least one target object is located on the first image, the second area is an area other than the first area on the first image, and the at least one target object is at least one object in the at least one to-be-shot object; and the first area is an area obtained by compressing a third area on the preview image in a first compression ratio, where the third area is an area in which the at least one target object is located on the preview image; the second area is an area obtained by compressing a fourth area on the preview image in a second compression ratio, where the fourth area is an area other than the third area on the preview image; and the first compression ratio is less than the second compression ratio.

For example, in the embodiment shown in FIG. 19, when a user posts an image by using a social media platform, the social media platform may invoke a camera to shoot the image. The shot image is an image obtained after differential compression. The electronic device sends the image to a server corresponding to the social media platform.

In the embodiments provided in this application, the method provided in the embodiments of this application is described from a perspective in which the mobile device (the mobile phone 100) is used as an execution body. To implement functions in the method provided in the embodiments of this application, the mobile device may include a hardware structure and/or a software module, and implement the functions in a form of the hardware structure, the software module, or a combination of the hardware structure and the software module. Whether a function in the foregoing functions is performed in a form of a hardware structure, a software module, or both a hardware structure and a software module depends on a specific application and design constraint conditions of the technical solutions.

Figure 20:
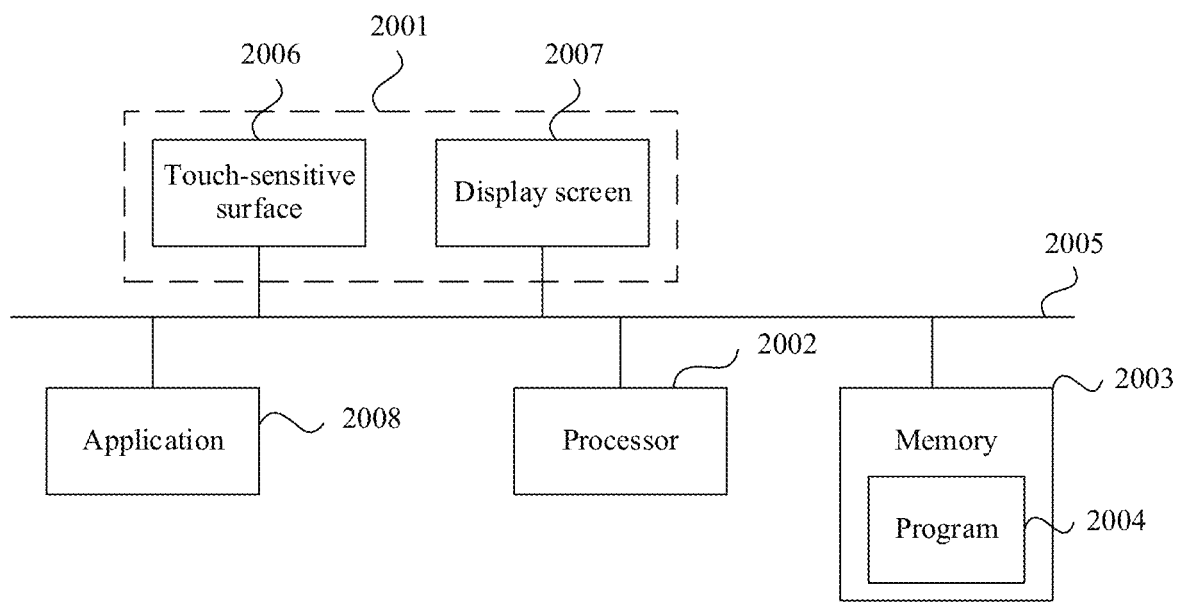
FIG. 20 is a schematic diagram of a structure of a mobile terminal according to an embodiment of this application.

As shown in FIG. 20, some embodiments of this application disclose an electronic device. The electronic device is, for example, a mobile phone or an iPad. The electronic device may include: a touchscreen 2001; where the touchscreen 2001 includes a touch-sensitive surface 2006 and a display 2007; an application 2008; one or more processors 2002; one or more memories 2003 configured to store one or more programs 2004. The foregoing components may be connected with each other by using one or more communications buses 2005. The display 2007 may be configured to display a display interface of an application in the electronic device. The display 2007 may be further configured to display a desktop of the electronic device. Alternatively, the display 2007 may be configured to display an image, or the like.

When the one or more programs 2004 stored in the memory 2003 are executed by the one or more processors 2002, the electronic device may be configured to perform the steps in FIG. 18 or FIG. 19 and the corresponding embodiments.

It should be noted that, in the embodiments of this application, division into the units is an example, and is merely a logical function division. In an actual implementation, another division manner may be used. Functional units in the embodiments of the present invention may be integrated into one processing unit, or each of the units may exist alone physically, or two or more units are integrated into one unit. For example, in the foregoing embodiments, the first obtaining unit and the second obtaining unit may be the same or different. The integrated unit may be implemented in a form of hardware, or may be implemented in a form of a software functional unit.

According to the context, the term "when" used in the foregoing embodiments may be interpreted as a meaning of "if" or "after" or "in response to determining" or "in response to detecting". Likewise, according to the context, the phrase "when it is determined that" or "if (a stated condition or event) is detected" may be interpreted as a meaning of "when it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement the embodiments, all or some of the embodiments may be implemented in a form of a program product. The program product includes one or more computer instructions. When the program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing description is described with reference to a specific embodiment. However, the foregoing example discussion is not intended to be detailed, and is not intended to limit this application to a disclosed precise form. According to the foregoing teaching content, many modification forms and variation forms are possible. Embodiments are selected and described to fully illustrate the principles of this application and practical application of the principles, so that another person skilled in the art can make full use of this application and various embodiments that have various modifications applicable to conceived specific usage.

In the embodiments provided in this application, the method provided in the embodiments of this application is described from a perspective in which the terminal device is used as an execution body. To implement functions in the method provided in the embodiments of this application, the terminal device may include a hardware structure and/or a software module, and implement the functions in a form of the hardware structure, the software module, or a combination of the hardware structure and the software module. Whether a function in the foregoing functions is performed in a form of a hardware structure, a software module, or both a hardware structure and a software module depends on a specific application and design constraint conditions of the technical solutions.

What is claimed is:

1. An image sharing method implemented on an electronic device that includes a display and on which a social application is installed, wherein the method comprises:
   detecting a first operation for starting the social application;
   displaying an initial interface of the social application;

detecting a second operation for entering an interface for inputting a to-be-posted content;

displaying the interface for inputting the to-be-posted content;

detecting a third operation for adding an image;

displaying a first image on the interface for inputting the to-be-posted content, wherein the first image comprises an image saved in the electronic device before the first operation, or a picture shot by a camera after the first operation;

detecting a fourth operation for posting the first image in the social application; and in response to the fourth operation, performing differential compression on the first image to obtain a second image, and sending the second image to a server corresponding to the social application, wherein the second image comprises a first area and a second area;

the first area is an area obtained by compressing a third area on the first image in a first compression ratio, wherein the third area is an area on the first image in which at least one target object is located; the second area is an area obtained by compressing a fourth area on the first image in a second compression ratio, wherein the fourth area is an area on the first image other than the third area; and the first compression ratio is less than the second compression ratio, and the at least one target object comprises a person, an animal, a plant, an object, or a building.

2. The method according to claim 1, wherein the at least one target object is a preset object, the at least one target object is an object automatically determined by the electronic device based on a plurality of objects on the first image, or the at least one target object is a target object determined by the electronic device based on a selection operation performed by a user on the first image.

3. The method according to claim 1, wherein before the detecting a fourth operation for posting the first image, the method further comprises:

outputting first prompt information, wherein the first prompt information is used to prompt the user to specify the at least one target object on the first image.

4. The method according to claim 2, wherein before the detecting a fourth operation for posting the first image, the method further comprises:

outputting first prompt information, wherein the first prompt information is used to prompt the user to specify the at least one target object on the first image.

5. The method according to claim 1, wherein before the detecting a fourth operation for posting the first image, the method further comprises:

detecting a tap operation performed on the first image, and determining an object corresponding to a position coordinate of the tap operation as the at least one target object;

detecting a circle selection operation performed on the first image, and determining that an object comprised in an area enclosed in the circle selection operation is the at least one target object;

when a specific operation is detected, displaying a selection box on the first image, and determining that an object comprised in the selection box is the at least one target object; or when a specific operation is detected, displaying a number for each object on the first image, and when at least one number is selected, determining an object corresponding to the selected at least one number as the at least one target object.

6. The method according to claim 1, wherein the method further comprises:

saving the second image, and displaying an identifier on the second image, wherein the identifier is used to indicate that the second image is an image obtained by compressing the first image.

7. The method according to claim 3, wherein the method further comprises:

saving the second image, and displaying an identifier on the second image, wherein the identifier is used to indicate that the second image is an image obtained by compressing the first image.

8. A mobile device, comprising: a display, one or more processors, a memory, one or more applications, and one or more programs, wherein the one or more programs are stored in the memory, the one or more programs comprise an instruction, and when the instruction is executed by the mobile device, the mobile device is enabled to perform the following steps:

detecting a first operation for starting a social application;

displaying an initial interface of the social application;

detecting a second operation for entering an interface for inputting to-be-posted content;

displaying the interface for inputting the to-be-posted content;

detecting a third operation for adding an image;

displaying a first image on the interface for inputting the to-be-posted content, wherein the first image comprises an image saved in the mobile device before the first operation, or a picture shot by starting a camera after the first operation;

detecting a fourth operation for posting the first image in the social application; and in response to the fourth operation, performing differential compression on the first image to obtain a second image, and sending the second image to a server corresponding to the social application, wherein the second image comprises a first area and a second area;

the first area is an area obtained by compressing a third area on the first image in a first compression ratio, wherein the third area is an area on the first image in which at least one target object is located; the second area is an area obtained by compressing a fourth area on the first image in a second compression ratio, wherein the fourth area is an area on the first image other than the third area; and the first compression ratio is less than the second compression ratio, and the at least one target object comprises a person, an animal, a plant, an object, or a building.

9. The mobile device according to claim 8, wherein the at least one target object is a preset object, the at least one target object is an object automatically determined by the electronic device based on a plurality of objects on the first image, or the at least one target object is a target object determined by the electronic device based on a selection operation performed by a user on the first image.

10. The mobile device according to claim 8, wherein when the instruction is executed by the mobile device, the mobile device is enabled to perform the following steps:

outputting first prompt information, wherein the first prompt information is used to prompt the user to specify the at least one target object on the first image.

11. The mobile device according to claim 9, wherein when the instruction is executed by the mobile device, the mobile device is enabled to perform the following steps:

outputting first prompt information, wherein the first prompt information is used to prompt the user to specify the at least one target object on the first image.

12. The mobile device according to claim 8, wherein when the instruction is executed by the mobile device, the mobile device is enabled to perform the following steps:

detecting a tap operation performed on the first image, and determining an object corresponding to a position coordinate of the tap operation as the at least one target object;

detecting a circle selection operation performed on the first image, and determining that an object comprised in an area enclosed in the circle selection operation is the at least one target object;

when a specific operation is detected, displaying a selection box on the first image, and determining that an object comprised in the selection box is the at least one target object; or when a specific operation is detected, displaying a number for each object on the first image, and when at least one number is selected, determining an object corresponding to the selected at least one number as the at least one target object.

13. The mobile device according to claim 10, wherein when the instruction is executed by the mobile device, the mobile device is enabled to perform the following steps:

saving the second image, and displaying an identifier on the second image, wherein the identifier is used to indicate that the second image is an image obtained by compressing the first image.

14. A mobile device, comprising: a display, a camera, one or more processors, a memory, one or more applications, and one or more programs, wherein the one or more programs are stored in the memory, the one or more programs comprise an instruction, and when the instruction is executed by the mobile device, the mobile device is enabled to perform the following steps:

detecting a first operation for starting a social application;
displaying an initial interface of the social application;
detecting a second operation for entering an interface for inputting a to-be-posted content;
displaying the interface for inputting the to-be-posted content;
detecting a third operation for adding an image obtained by starting a photographing application;
in response to the third operation, displaying a viewfinder interface on the display, wherein the viewfinder interface comprises a preview image, and the preview image comprises at least one to-be-shot object;
in response to a fourth operation of confirming photographing, shooting a first image, wherein the first image is an image obtained by performing differential compression on the preview image;
displaying the first image on the interface for inputting the to-be-posted content;
detecting a fifth operation for posting the first image; and
in response to the fifth operation, sending the first image to a server corresponding to the social application, wherein the first image comprises a first area and a second area, and the at least one target object is at least one object in the at least one to-be-shot object; and the first area is an area obtained by compressing a third area on the preview image in a first compression ratio, wherein the third area is an area on the preview image in which the at least one target object is located; the second area is an area obtained by compressing a fourth area on the preview image in a second compression ratio, wherein the fourth area is an area on the preview image other than the third area; and the first compression ratio is less than the second compression ratio.

15. The mobile device according to claim 14, wherein target object is a preset object, the target object is an object automatically determined by the mobile device based on a plurality of objects on the preview image, or the target object is an object determined by the mobile device based on a selection operation performed by a user on the preview image.

16. The mobile device according to claim 14, wherein when the instruction is executed by the mobile device, the mobile device is enabled to perform the following steps:

outputting first prompt information, wherein the first prompt information is used to prompt the user to specify the target object on the preview image.

17. The mobile device according to claim 15, wherein when the instruction is executed by the mobile device, the mobile device is enabled to perform the following steps:

outputting first prompt information, wherein the first prompt information is used to prompt the user to specify the target object on the preview image.

18. The mobile device according to claim 14, wherein when the instruction is executed by the mobile device, the mobile device is enabled to perform the following steps:

detecting a tap operation performed on the preview image, and determining an object corresponding to a position coordinate of the tap operation as the at least one target object;

detecting a circle selection operation performed on the preview image, and determining that an object comprised in an area enclosed in the circle selection operation is the at least one target object;

when a specific operation is detected, displaying a selection box on the preview image, and determining that an object comprised in the selection box is the target object; or when a specific operation is detected, displaying a number for each object on the preview image, and when at least one number is selected, determining an object corresponding to the selected at least one number as the at least one target object.

19. The mobile device according to claim 14, wherein when the instruction is executed by the mobile device, the mobile device is enabled to perform the following steps:

saving the first image and a second image, wherein the second image is an uncompressed image obtained by shooting the preview image.

20. The mobile device according to claim 16, wherein when the instruction is executed by the mobile device, the mobile device is enabled to perform the following steps:

saving the first image and a second image, wherein the second image is an uncompressed image obtained by shooting the preview image.

* * * * *

UNITED STATES PATENT AND TRADEMARK OFFICE
CERTIFICATE OF CORRECTION

PATENT NO. : 11,695,726 B2
APPLICATION NO. : 17/423540
DATED : July 4, 2023
INVENTOR(S) : Jingguo Xu It is certified that error appears in the above-identified patent and that said Letters Patent is hereby corrected as shown below:

In the Claims

In Column 34, Line 2, in Claim 14, after "and" delete "the".

Signed and Sealed this
Fifth Day of September, 2023

Katherine Kelly Vidal
*Director of the United States Patent and Trademark Office*